(12) United States Patent
Akisada et al.

(10) Patent No.: US 8,437,508 B2
(45) Date of Patent: May 7, 2013

(54) INFORMATION PROCESSING APPARATUS AND INFORMATION PROCESSING METHOD

(75) Inventors: Hirokazu Akisada, Tokyo (JP); Yosuke Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 12/127,194

(22) Filed: May 27, 2008

(65) Prior Publication Data
US 2008/0304706 A1 Dec. 11, 2008

(30) Foreign Application Priority Data
Jun. 8, 2007 (JP) ................. 2007-153391

(51) Int. Cl.
*G06K 9/00* (2006.01)
(52) U.S. Cl.
USPC ............................................ 382/107
(58) Field of Classification Search .................. None
See application file for complete search history.

(56) References Cited

U.S. PATENT DOCUMENTS

| 2006/0288288 | A1* | 12/2006 | Girgensohn et al. | 715/716 |
| 2008/0316311 | A1* | 12/2008 | Albers et al. | 348/143 |

FOREIGN PATENT DOCUMENTS

| JP | 07-160856 | 6/1995 |
| JP | 2000-224457 A | 8/2000 |
| JP | 2003-158710 | 5/2003 |
| JP | 2005-218014 | 8/2005 |
| JP | 2006-074822 | 3/2006 |

OTHER PUBLICATIONS

Nintendo, "The Legend of Zelda: Twilight Princess"[online], Nov. 2006 [retreived on Jun. 7, 2011] Retrieved from the Internet :<URL:http://www.nintendo.com/games/detail/uzm6DQbya7_9uLUBz0Foxg1WFZfgV-en>.*
Image,"The Legend of Zelda: Twilight Princess"[online], [retreived on] Jun. 7, 2011 Retreived from the Internet : < URL: http://guidesmedia.ign.com/guides/748589/images/p19/136.jpg>.*

* cited by examiner

*Primary Examiner* — Claire X Wang
*Assistant Examiner* — Thomas A James
(74) *Attorney, Agent, or Firm* — Fitzpatrick, Cella, Harper & Scinto

(57) ABSTRACT

There is provided an information processing apparatus, comprising: an obtaining unit which obtains video data captured by an image capturing apparatus disposed in a monitored space, location information regarding a location of a moving object in the monitored space, and existence information regarding a capturing period of the moving object in the video data; and a display processing unit which processes a display of a trajectory of the moving object in the monitored space based on the location information, the display processing unit processing a display of the trajectory so that the portion of the trajectory that corresponds to the capturing period is distinguishable from the other portions of the trajectory, based on the existence information.

32 Claims, 54 Drawing Sheets

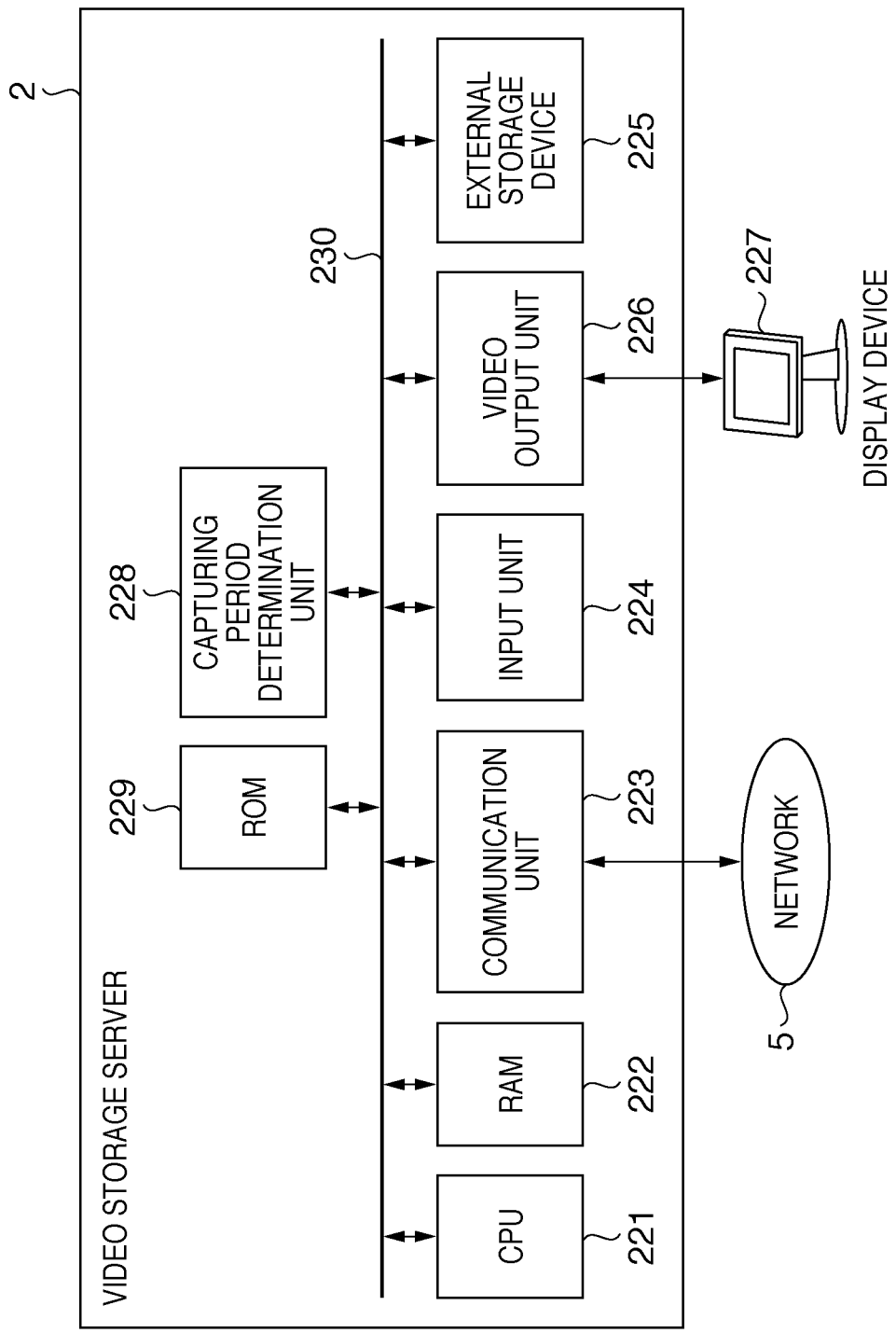

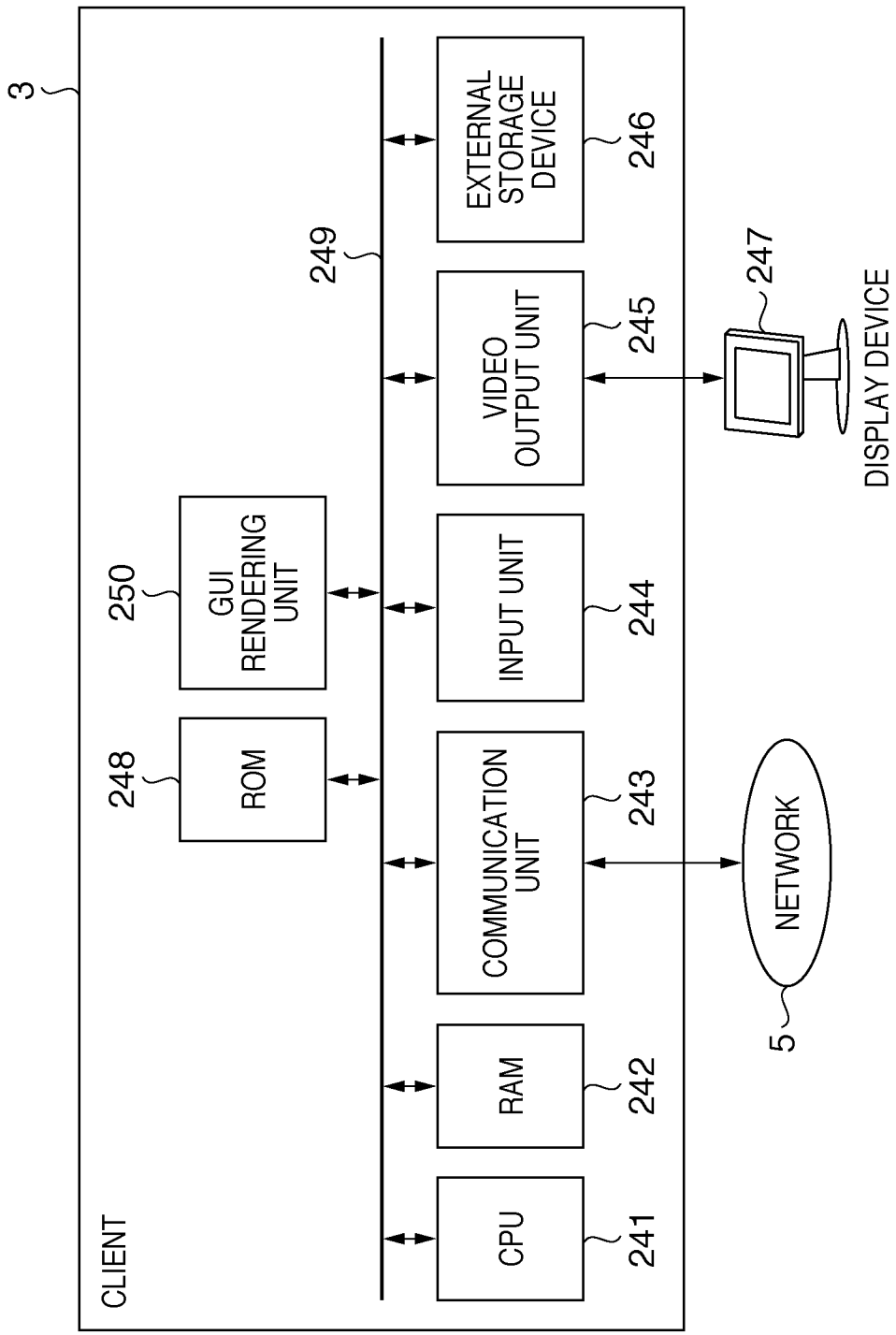

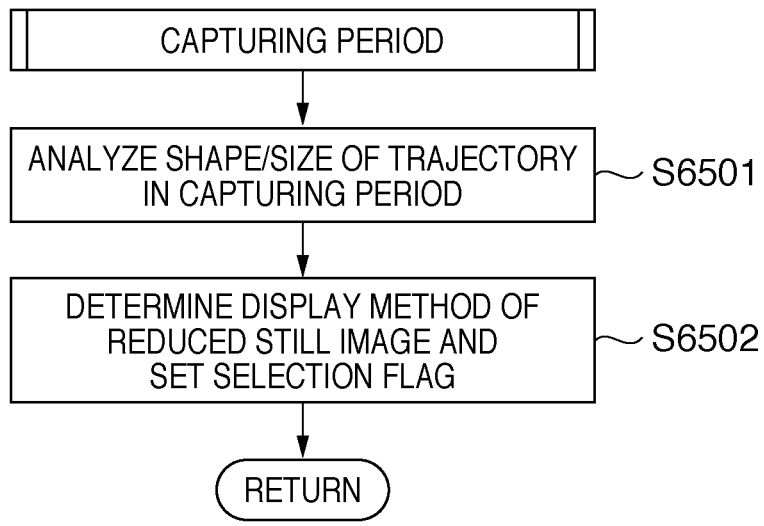
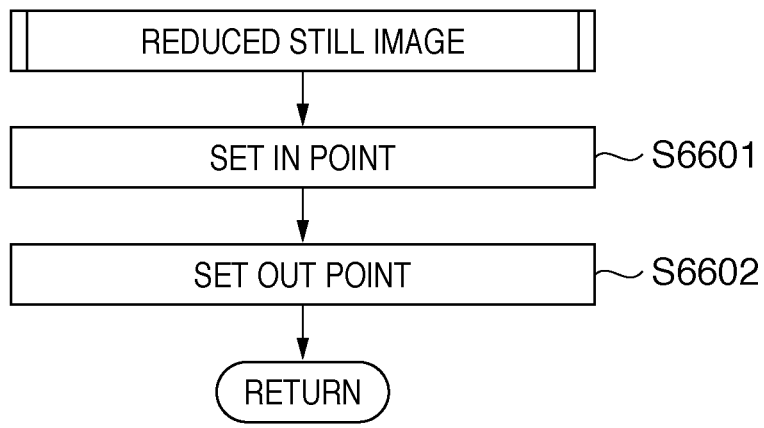

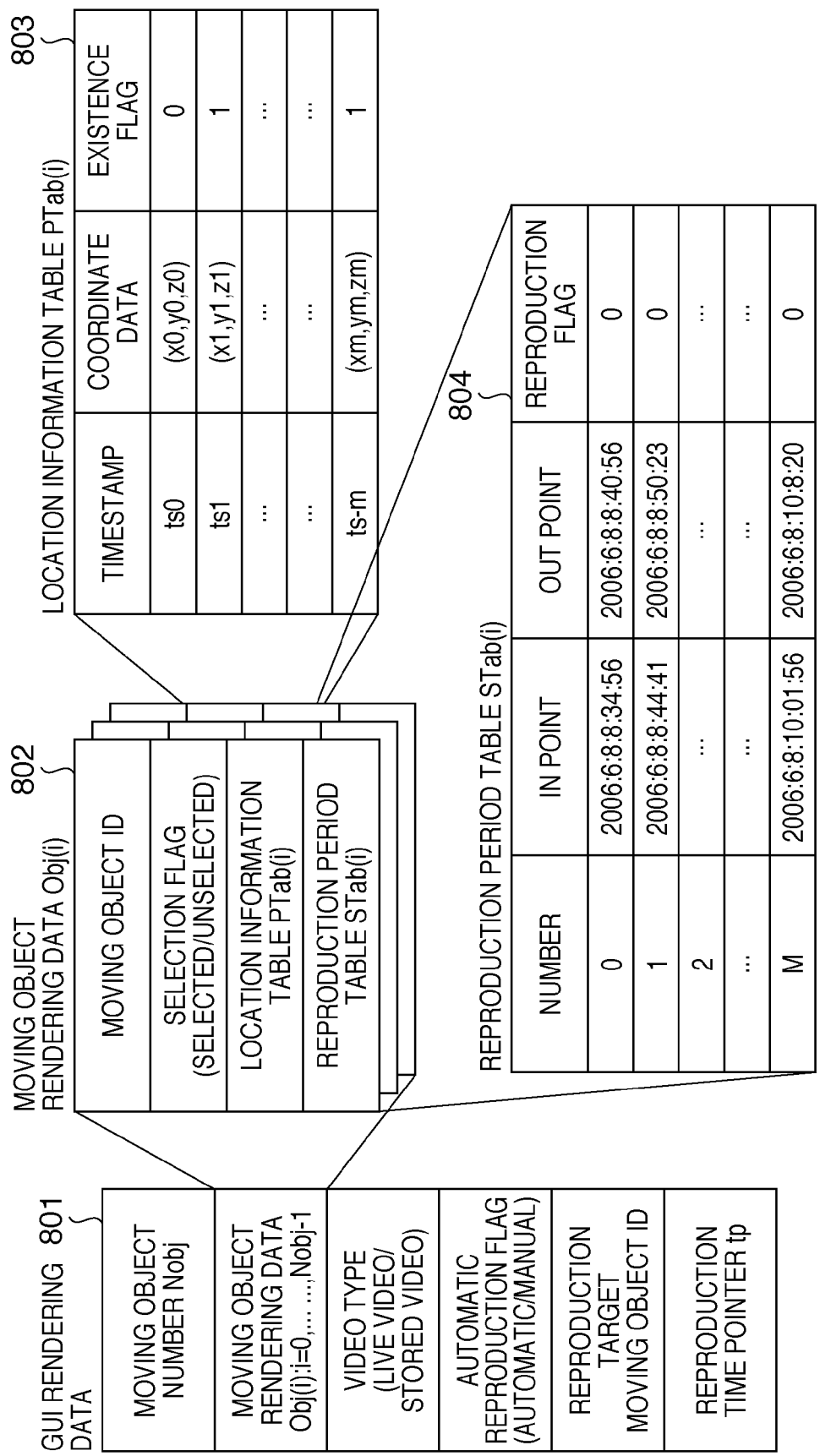

FIG. 8C

821 VIDEO-RELATED DATA

| VIDEO-RELATED DATA |
|---|
| VIDEO CHANNEL (C1/C2/S/E) |
| CURRENT TIME tc |
| PARTIAL AREA TABLE PL-S |
| REPRODUCTION POSITION POINTER tp_S |
| EDITED VIDEO TABLE PL-E |
| REPRODUCTION POSITION POINTER tp_E |

822

| NUMBER | CAMERA | IN POINT | OUT POINT |
|---|---|---|---|
| 0 | C1 | 2006:6:8:8:34:56 | 2006:6:8:8:40:56 |
| 1 | C2 | 2006:6:8:8:44:41 | 2006:6:8:8:50:23 |
| 2 | C2 | ... | ... |
| ... | ... | ... | ... |
| n | C1 | 2006:6:8:10:01:56 | 2006:6:8:10:8:20 |

823

| NUMBER | CAMERA | IN POINT | OUT POINT |
|---|---|---|---|
| 0 | C2 | 2006:6:8:8:34:56 | 2006:6:8:8:40:56 |
| 1 | C2 | 2006:6:8:8:44:41 | 2006:6:8:8:50:23 |
| 2 | C1 | ... | ... |
| ... | ... | ... | ... |
| m | C1 | 2006:6:8:10:01:56 | 2006:6:8:10:8:20 |

FIG. 19A

CAPTURING PERIOD TABLE ETab(i, cid)(i=0,...,Nobj-1)

| CAPTURING PERIOD NO. | IN POINT | OUT POINT |
|---|---|---|
| 0 | 2006:6:8:8:34:56 | 2006:6:8:8:40:56 |
| 1 | 2006:6:8:8:44:41 | 2006:6:8:8:50:23 |
| ... | ... | ... |
| ... | ... | ... |
| N | 2006:6:8:10:01:56 | 2006:6:8:10:8:20 |

FIG. 19B

CAPTURING PERIOD TABLE ETab(i, cid)(i＝0,...,Nobj-1, cid＝1, 2 )

| CAMERA 1 CAPTURING PERIOD NO. | IN POINT | OUT POINT |
|---|---|---|
| C1-0 | 2006:6:8:8:34:56 | 2006:6:8:8:40:56 |
| C1-1 | 2006:6:8:8:44:41 | 2006:6:8:8:50:23 |
| ... | ... | ... |
| ... | ... | ... |
| C1-N | 2006:6:8:10:01:56 | 2006:6:8:10:8:20 |

| CAMERA 2 CAPTURING PERIOD NO. | IN POINT | OUT POINT |
|---|---|---|
| C2-0 | 2006:6:8:8:12:01 | 2006:6:8:8:12:30 |
| C2-1 | 2006:6:8:8:54:41 | 2006:6:8:8:9:0:23 |
| ... | ... | ... |
| ... | ... | ... |
| C2-M | 2006:6:8:13:25:31 | 2006:6:8:13:45:45 |

INFORMATION PROCESSING APPARATUS AND INFORMATION PROCESSING METHOD

BACKGROUND OF THE INVENTION

1. Field of the Invention

The present invention relates to an information processing apparatus and an information processing method for reproducing video data.

2. Description of the Related Art

Monitoring systems, in which a camera installed at a location to be monitored (a monitored space) captures video data and the video data is recorded into a recording device such as a hard disk, are known. With such a monitoring system, a user can reproduce and browse portions of the recorded video data captured at any point in time.

However, it is difficult for the user to select and reproduce a desired portion of the video data when the amount (in other words, the recording time) of recorded video data is large. For example, when monitoring a specific moving object, such as a person, an animal, or the like, it is necessary for the user to search for the period of the video data in which that moving object has been captured (the range of time in which the object is present, or in other words, the times in the video data at which the moving object entered/exited (IN point/OUT point)). When the video data has a long recording time, however, an inordinate amount of labor is required in order to find the IN/OUT points of the specific moving object.

As a solution to this problem, for example, Japanese Patent Laid-Open No. 2005-218014 provides a monitoring system in which a moving body is recognized within a captured moving image of a monitored space, and the recognized moving body is then displayed in a map that indicates the monitored space. Japanese Patent Laid-Open No. 2005-218014 also discloses a method in which video that has been stored in the past is reproduced by clicking on the moving body. With regards to this system, a method is disclosed in which a location is specified as a range upon the map, and the stored video of a moving body that has entered that range is searched; moreover, a temporal distribution of the times at which the stored video was captured is displayed.

In addition, for example, Japanese Patent Laid-Open No. 2006-74822 provides a monitoring system in which labels including identification information are attached to a plurality of monitoring targets so as to identify them, and those monitoring targets are captured by a plurality of capturing apparatuses of monitoring devices. Japanese Patent Laid-Open No. 2006-74822 also discloses a method in which the monitoring targets are identified within captured images based on their labels, and are then broadcast to pre-assigned terminals. This system makes it possible to determine the general location of a monitoring target, even if there has been a period in which that monitoring target was not captured, by displaying the trajectory of the monitoring target based on the location information of the monitoring target detected using the label.

Furthermore, Japanese Patent Laid-Open No. H7-160856 discloses a method in which a trajectory acquisition apparatus detects and stores location information of a moving object upon capturing an image of that moving object, and when the stored video in which the moving object is present is reproduced, the trajectory of the moving object is also reproduced therewith.

Finally, Japanese Patent Laid-Open No. 2003-158710 discloses a method in which a timeline is displayed, visualizing, by way of a bar graph, whether or not each video object is present at each point in time within stored video, making it possible to efficiently search for and edit video in which a video object is present.

However, the monitoring system of Japanese Patent Laid-Open No. 2005-218014 is designed for searching for and playing back the stored video of a moving body that has entered a location specified as a range, and does not display the trajectory of a specific moving body within a monitored space. This system is thus problematic in that the capturing history (multiple past capturing periods) of a specific moving body cannot be confirmed in a visually accessible manner, and thus specifying a capturing period from among those multiple capturing periods and playing back video stored in the past is difficult.

Meanwhile, while the monitoring system of Japanese Patent Laid-Open No. 2006-74822 is designed to identify a monitoring target, detect its location, and broadcast the video captured when that monitoring target was captured, the system does not include a means for checking a list of capturing history of the monitoring target within the video captured during the monitoring. Furthermore, while this system displays the trajectory of a monitoring target based on location information if there has been a period in which that monitoring target was not captured, the trajectory is nothing more than auxiliary information. It is therefore impossible to check a list of capturing history based on information such as the present location and movement path of the monitoring target, specify a desired capturing period from such a list and reproduce the stored video therefrom, and so on with this system.

The trajectory acquisition apparatus of Japanese Patent Laid-Open No. H7-160856 does identify a monitoring target and detect its location, but does not take into account the capturing period of the monitoring target within the captured video in any way. For this reason, it is not possible to check or specify the period in which the moving object is present on a trajectory reproduced simultaneously with the video.

Furthermore, although the editing system of Japanese Patent Laid-Open No. 2003-158710 acquires the times at which each object is present in stored video, which can then be used to search through the video, the editing system does not take into account the location in which the object is present in any way.

As described thus far, conventional monitoring systems cannot display periods in which a specific moving object is present within stored video in a visually accessible manner based on the location of the moving object, the path the moving object has traveled, and so on. The conventional monitoring systems also do not provide GUIs (graphical user interfaces) through which desired capturing periods can be specified with ease. Above all, the conventional monitoring systems do not provide a GUI that a user can use intuitively, which not only displays the capturing period of a specific moving object upon the trajectory of that moving object in a visually accessible manner, but also through which a desired capturing period can be specified from among displayed capturing periods and the stored video reproduced and displayed with ease.

SUMMARY OF THE INVENTION

Having been conceived in light of such circumstances, it is a characteristic of the present invention to provide a technique that makes it possible for a user to easily understand the trajectory and capturing period of a moving object in video data, specify a desired capturing period, and reproduce the video of the specified capturing period.

According to an aspect of the present invention, there is provided an information processing apparatus, comprising: an obtaining unit which obtains video data captured by an image capturing apparatus disposed in a monitored space, location information regarding a location of a moving object in the monitored space, and existence information regarding a capturing period of the moving object in the video data; and a display processing unit which processes a display of a trajectory of the moving object in the monitored space based on the location information, the display processing unit processing a display of the trajectory so that the portion of the trajectory that corresponds to the capturing period is distinguishable from the other portions of the trajectory, based on the existence information.

According to another aspect of the present invention, there is provided an information processing method, comprising the steps of: obtaining video data captured by an image capturing apparatus disposed in a monitored space, location information regarding a location of a moving object in the monitored space, and existence information regarding a capturing period of the moving object in the video data; and displaying a trajectory of the moving object in the monitored space based on the location information, and displaying the trajectory so that the portion of the trajectory that corresponds to the capturing period is distinguishable from the other portions of the trajectory, based on the existence information.

Further features of the present invention will become apparent from the following description of exemplary embodiments with reference to the attached drawings.

BRIEF DESCRIPTION OF THE DRAWINGS

FIG. 2D is a function block diagram illustrating the configuration of a video storage server according to the first through the third embodiments of the present invention.

FIG. 2E is a function block diagram illustrating the configuration of a client according to the first through the third embodiments of the present invention.

FIG. 6E is a flowchart illustrating the flow of processing in a capturing period processing routine according to the second embodiment of the present invention.

FIG. 6F is a flowchart illustrating the flow of processing in a reduced still image processing routine according to the second embodiment of the present invention.

FIG. 8A is a diagram illustrating GUI rendering data used by the client in order to render a monitoring screen, according to the first embodiment of the present invention.

FIG. 8C is a diagram illustrating video-related data used by the client in order to render a monitoring screen, according to the second embodiment of the present invention.

FIG. 19A is a diagram illustrating an example of the configuration of a capturing period table according to the first embodiment of the present invention.

FIG. 19B is a diagram illustrating an example of the configuration of a capturing period table according to the second and third embodiments of the present invention.

DESCRIPTION OF THE EMBODIMENTS

Figure 1A:
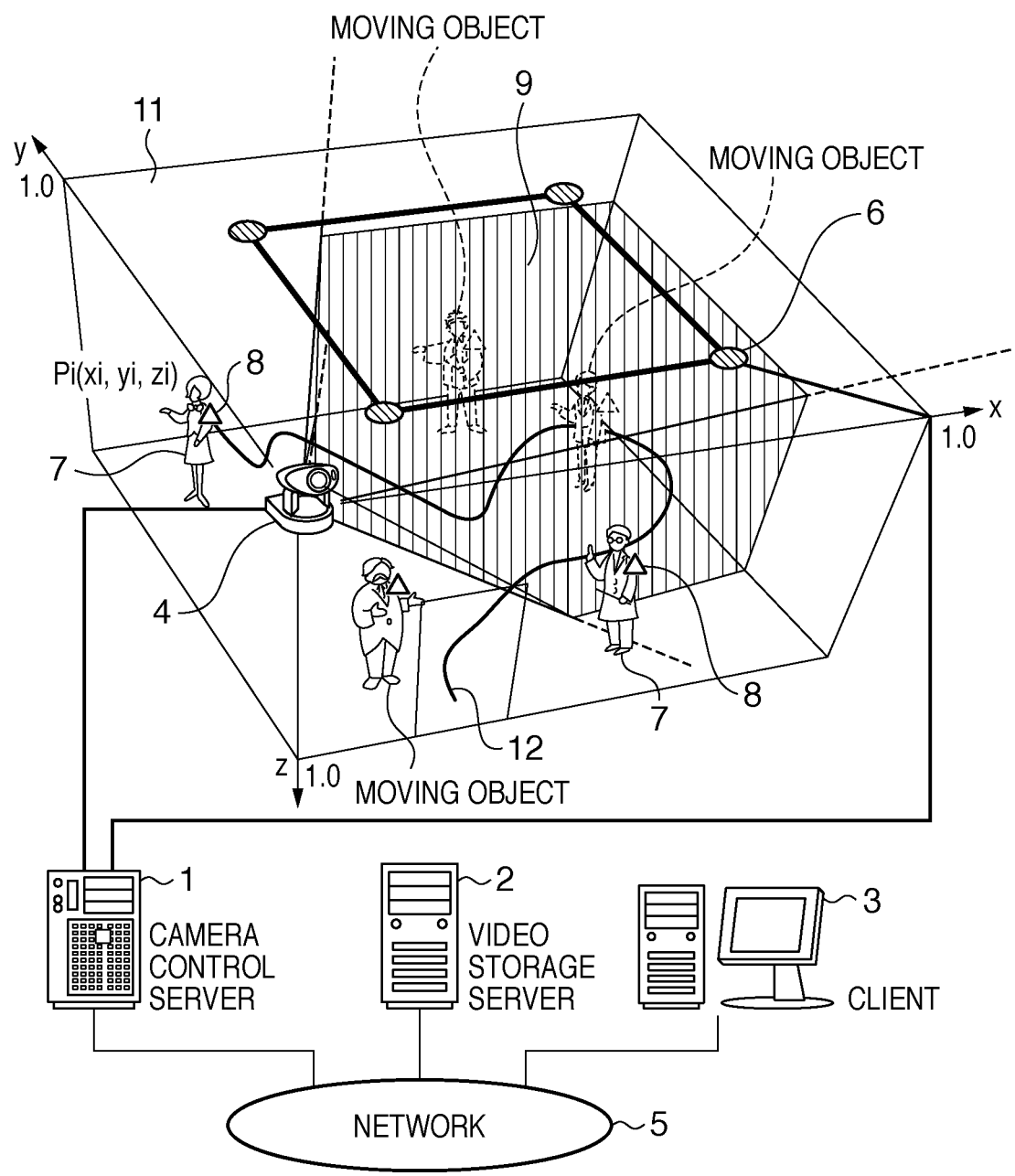
FIG. 1A is a schematic diagram illustrating one type of a monitoring system according to a first embodiment of the present invention.

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

Prior to describing the embodiments in detail, the concept of each embodiment shall be discussed briefly hereinafter. It should be noted, however, that the discussions provided here are merely intended to assist in the understanding of each of the embodiments, and the actual embodiments described thereafter are not limited to the details provided in these discussions.

Each of the following embodiments relates to a monitoring system that includes a camera control server, a video storage server, a client, and a monitored space. The client is one type of an information processing apparatus according to the present invention.

In the first embodiment, a single camera device is installed in the monitored space, and that camera device captures a video of the monitored space. An IC tag is attached to moving objects to be monitored (humans or animals, for example) and a location detection apparatus (an IC tag reader/writer) installed in the monitored space detects the location of the IC tags. The camera control server can therefore obtain video data of the monitored space and location information for each of the moving objects. The client displays a monitoring screen such as that shown in FIG. 10A, for example. A user can therefore easily understand the trajectory and capturing period of each moving object. Moreover, the user can easily select and reproduce/display a desired capturing period. While only a single camera device is described as being installed in the first embodiment, it should be noted that a plurality of camera devices may be installed as well.

In the second embodiment, two camera devices are installed in the monitored space, and these camera devices capture videos of the monitored space. It follows, therefore, that reading the second embodiment will further clarify the fact that a plurality of camera device may be installed in the first embodiment. The second embodiment aims to make it possible for a user to more easily edit video data that has been stored in the monitoring system. Therefore, in the second embodiment, an edited video playlist has been added to the monitoring screen, which can clearly be seen by comparing FIG. 10A, from the first embodiment, with FIG. 9B, from the second embodiment. Furthermore, a user can edit video data with ease by selecting a desired capturing period and inserting (registering) that capturing period in the edited video playlist, as can be understood from FIG. 11B. Moreover, in the second embodiment, a representative image extracted from the video data over a given interval is displayed in the vicinity of its capturing period. This makes it possible for a user to edit the video data after having obtained a general understanding of the content thereof. Furthermore, using an outgoing line to display the representative image makes it possible to suppress a drop in the visibility of the representative image, even when the capturing period is short.

In the third embodiment, the moving objects are not provided with items such as IC tags used for location detection, as is the case in the first embodiment. Instead, the camera devices can detect the location of each moving object from the video data by using, for example, an automatic focal point detection function.

Figure 10A:
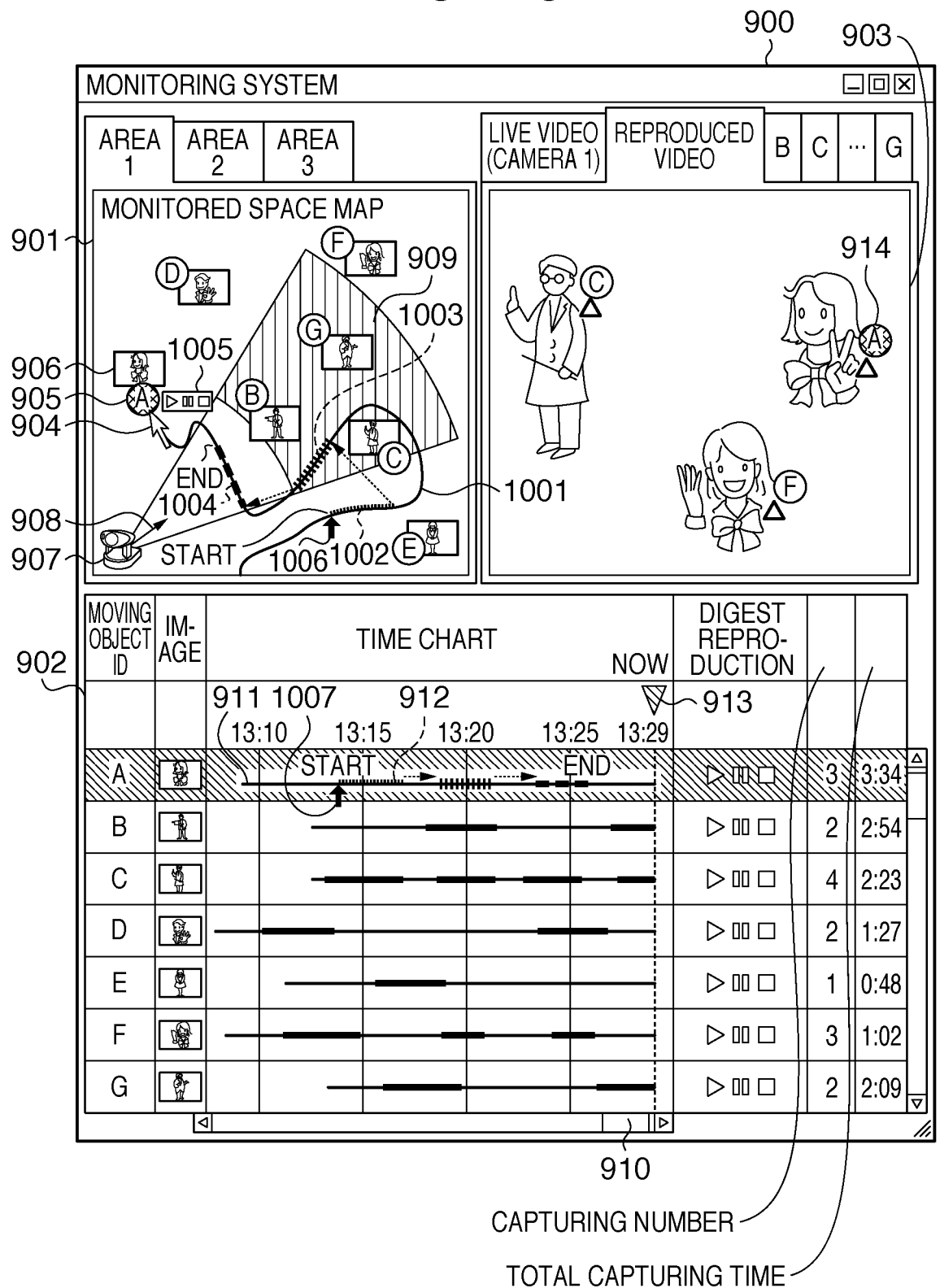
FIG. 10A shows an overview of a monitoring screen when a moving object icon has been selected, according to the first embodiment of the present invention.

While the following embodiments discuss a monitoring system, the same effects as described above (e.g., easily understanding the trajectory and capturing periods of each moving object) can be obtained even when focusing only a client and a monitoring screen presented by that client, for example (as shown in, for example, FIG. 10A). Accordingly, the client obtains, for example, various types of information acquired in the monitored space, such as video data, location information, and so on, and presents a monitoring screen based on this information to a user. How this video data, location information, and so on are obtained in the monitored space is of less importance when focusing solely on the client.

Acquisition of the video data, location information, and so on in the monitored space, the display of the monitoring screen by the client, and the like are implemented through hardware and software running cooperatively. The manner in which the hardware and software run cooperatively shall also be described in the following embodiments. Of course, those skilled in the art will be able to understand with ease that, for example, a screen can be displayed in a display device as a result of a CPU of the client shown in FIG. 2E executing an application program stored in an external storage device, even if explicit descriptions of such a process are not provided. The essential point of the present invention is not simply that a screen is displayed in a display device, but rather what sort of screen (monitoring screen) is to be displayed in order to achieve the above-mentioned effects. The following embodiments therefore describe, in detail, the configuration of the monitoring screen.

(First Embodiment)

<Monitoring System 10*a*>

FIG. 1A is a schematic diagram illustrating one type of a monitoring system 10*a* according to a first embodiment of the present invention. With the monitoring system 10*a*, a single camera device 4 captures a plurality of moving objects 7 (subjects that are to be monitored).

Numeral 1 indicates a camera control server, which transmits, to a video storage server 2, video data and control information (information relating to the orientation and so on of the camera) output by the camera device 4, as well as location information of each of the moving objects 7 output by a moving object location detection apparatus 6. Data that includes the aforementioned video data, control information, and location information shall be referred to as "monitoring data" hereinafter. Note that although the camera device 4 is an external device that is connected to the camera control server 1 in the example shown in FIG. 1A, these two devices may be configured as a single integrated unit.

Numeral 2 indicates the video storage server, which stores the monitoring data received from the camera control server 1. The video storage server 2 also sequentially determines whether or not each of the moving objects 7 is present within a visual range 9 of the camera device 4 based on the control information and the location information. The video storage server 2 then finds the capturing period of each of the moving objects 7 (in other words, the range of time in which the object is present) in the image data, and adds this information regarding the capturing period (called "existence information" hereinafter) to the monitoring data.

Figure 17:
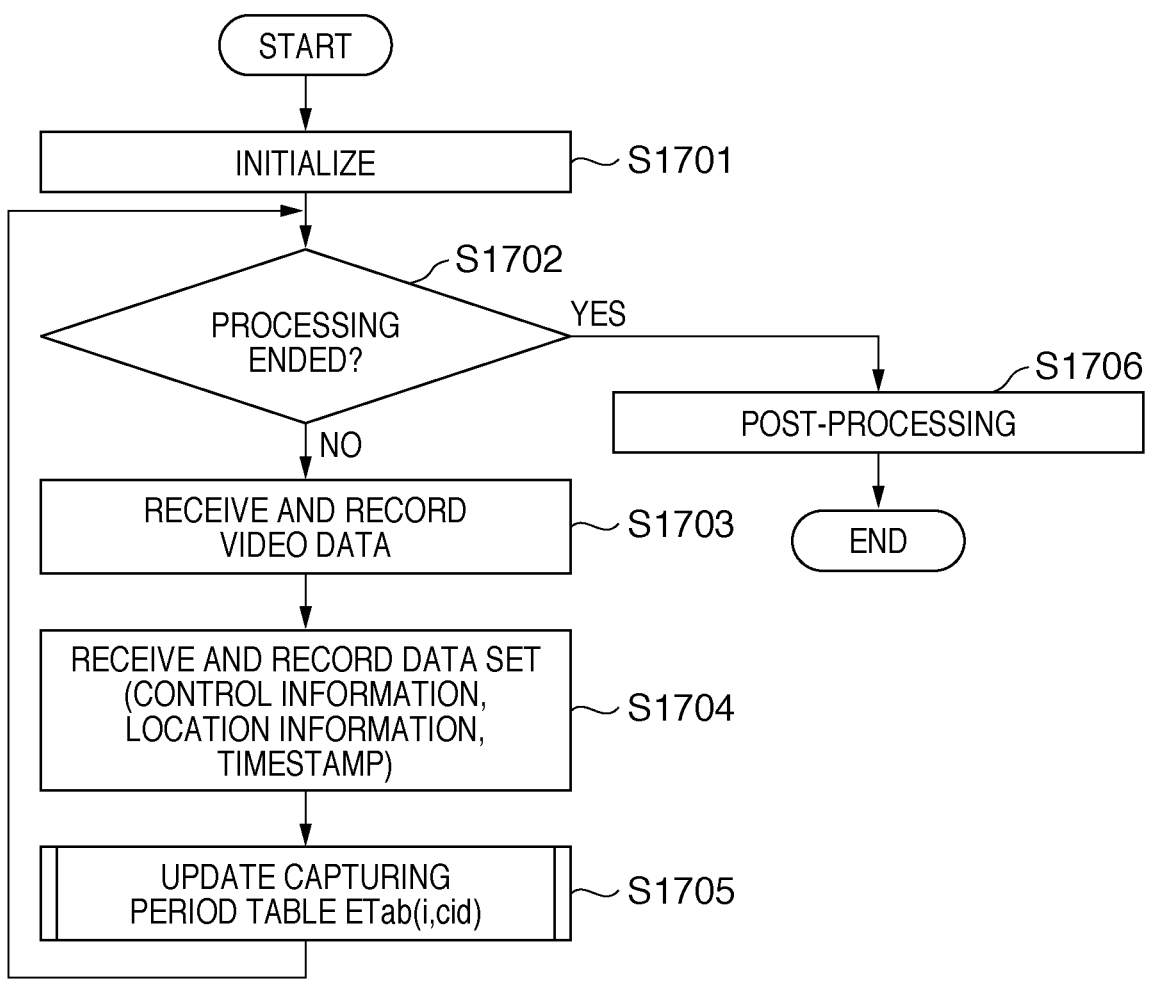
FIG. 17 is a flowchart illustrating the flow of processing performed by the video storage server.

Note that the algorithm used in the process for determining the visual range 9 and the existence information shall be discussed later with reference to the flowchart that illustrates the processing executed by the video storage server 2 (FIG. 17). This determination process may be executed by the camera control server 1, rather than the video storage server 2.

Numeral 3 indicates a client, which displays a monitoring screen including trajectories 12, the capturing periods, and so on of each of the moving objects 7 in a display device 247 (see FIG. 2E), based on the monitoring data acquired from the video storage server 2. If one of the capturing periods displayed in the monitoring screen has been selected, the client 3 also acquires the video data corresponding to the selected capturing period from the video storage server 2, and reproduces/displays that video data.

Numeral 4 indicates a camera device, which captures video of a monitored space 11, and transmits the resulting video data to the camera control server 1. Although the camera device 4 described in the present embodiment is a pan/tilt/zoom camera, the direction of the visual axis, zoom, and the like of which can be controlled, the camera device 4 is not intended to be limited to this type of camera. For example, a camera with a fixed zoom may be used instead.

Numeral 6 indicates a location detection apparatus, which detects a tag (for example, an IC tag 8) attached to at least one (this number is indicated by "Nobj") monitoring target (i.e., moving object 7) in the monitored space 11. The location detection apparatus 6 acquires the spatial location coordinates of the IC tag 8, or $Pi(xi,yi,zi)$ (where $i=0, \ldots, Nobj-1$), as the location information. The acquired location information is then transmitted to the camera control server 1. A non-contact type IC tag reader/writer, for example, can be used as the location detection apparatus 6. Note that the individual elements of $Pi(xi,yi,zi)$, or x, y, and z, can be determined, for example, in the following manner. For example, a coordinate system (having xyz coordinate axes) that takes the location of the camera device 4 in the monitored space 11 shown in FIG. 1A as its point of origin can be considered. x, y, and z are then expressed by a ratio (a numerical value in the range of 0 to 1.0) found when each of the (planar) horizontal length, vertical length, and height of the monitored space 11 are taken as 1.

It should be noted that although an active- or passive-type IC tag is used to detect the locations of the moving objects 7 in the present embodiment, PHS, GPS, or other such systems may be used as well. Furthermore, the locations of the moving objects 7 may be detected using an image recognition process that recognizes the moving objects 7 within the video data.

Numeral 5 indicates a network, which is, in the present embodiment, a TCP/IP network. The network 5 is a network such as the Internet, an intranet, or the like. The communication protocol, meanwhile, is not intended to be limited to TCP/IP, and a protocol such as IPX/ISX, AppleTalk®, or the like may be used instead. Furthermore, any medium, such as a wired LAN, a wireless LAN, or the like may be used for transporting the data, as long as that medium is compliant with the protocol that is to be used.

<Camera Control Server 1>

Figure 2A:
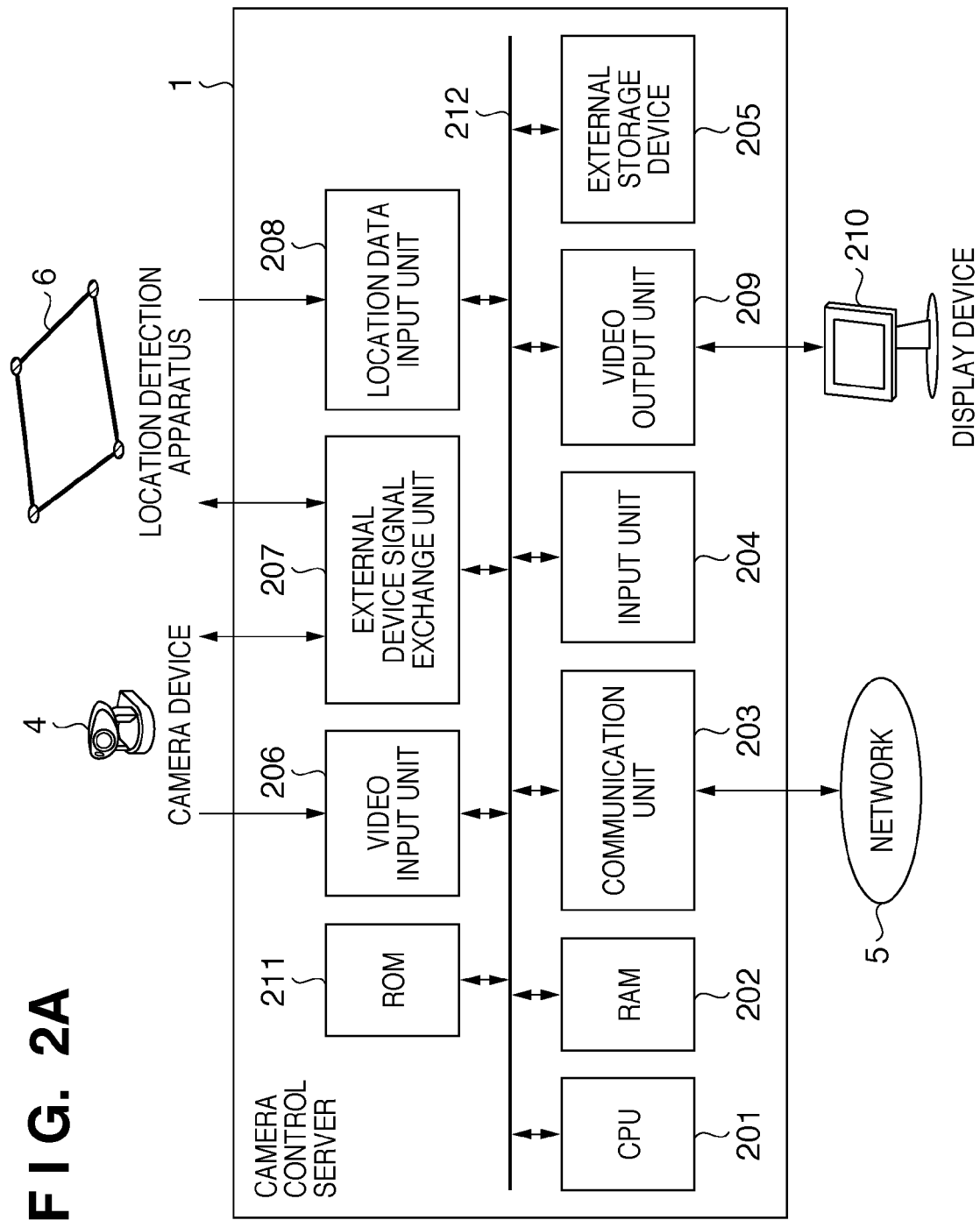
FIG. 2A is a function block diagram illustrating the configuration of a camera control server according to the first embodiment of the present invention.

FIG. 2A is a function block diagram illustrating the configuration of the camera control server 1 according to the first embodiment of the present invention. The camera control server 1 includes a CPU 201, a RAM 202, a ROM 211, and a communication unit 203. The camera control server 1 also includes an input unit 204, used to input data necessary for the camera control server 1 to operate, as well as an external storage device 205, for storing data necessary for processing. The camera control server 1 also includes a video input unit 206, used to input video data captured by the camera device 4, and an external device signal exchange unit 207, for sending/receiving control signals and the like to/from an external device (such as, for example, the camera device 4 and the location detection apparatus 6). Furthermore, the camera control server 1 includes a location data input unit 208, used to input location coordinate data output by the location detection apparatus 6, and a video output unit 209, which outputs video to a display device 210. Finally, the camera control server 1 includes a bus 212, for connecting the stated constituent elements to one another.

The RAM 202 is a semiconductor memory capable of specifying and reading from/writing to a random address. Application programs used by the camera control server 1 are loaded thereinto. The RAM 202 also temporarily stores data and so on necessary for processes executed by the CPU 201, and outputs this data to the bus 212 as necessary.

The ROM 211 is a read-only memory that stores control programs necessary for processing performed by the CPU 201. The necessary control program is output to the bus 212 at a predetermined timing.

The CPU 201 controls the entire camera control server 1 by executing application programs loaded into the RAM 202, control programs stored in the ROM 211, and so on.

The communication unit 203 carries out protocol conversion and so on data output from the camera control server 1 and data input to the camera control server 1. This makes it possible for the camera control server 1 to carry out data communication with the video storage server 2 and the client 3 via the network 5.

The input unit 204 includes a keyboard, a mouse, and so on. Data input by a user of the camera control server 1 operating the input unit 204 is output to the CPU 201 or the like via the bus 212.

The external storage device 205 stores data necessary for processing performed by the CPU 201.

The video input unit 206 is input with digital video data in, for example, MPEG format, analog video data compliant with, for example, the NTSC or PAL standards, and so on, which has been captured and generated by the camera device 4.

The external device signal exchange unit 207 exchanges information regarding the pan, tilt, and zoom of the camera device 4, information regarding the focus and aperture of the camera device 4, and so on, with the camera device 4, location detection apparatus 6, and other such external devices. The external device signal exchange unit 207 also exchanges settings information such as the location detection interval, control information including various types of status information, and so on.

The location data input unit 208 is input with the location information of each of the moving objects 7 (three-dimensional data Pi(xi,yi,zi), where i=0, . . . , Nobj−1), output by the location detection apparatus 6 at a certain constant timing.

Finally, the video output unit 209 outputs data for displaying an operational screen of the camera control server 1 and so on in the display device 210, which is configured of a liquid-crystal display or the like.

<Video Storage Server 2>

FIG. 2D is a function block diagram illustrating the configuration of the video storage server 2 according to the first embodiment of the present invention. The video storage server 2 shown in FIG. 2D includes a CPU 221, a RAM 222, a ROM 229, and a communication unit 223. The video storage server 2 also includes an input unit 224, used to input data necessary for the video storage server 2 to operate, as well as an external storage device 225, for storing data necessary for processing. The video storage server 2 also includes a capturing period determination unit 228, for determining the capturing period of each of the moving objects 7, and a video output unit 226, which outputs video to a display device 227. Finally, the video storage server 2 includes a bus 230, for connecting the stated constituent elements to one another.

The RAM 222 is a semiconductor memory capable of specifying and reading from/writing to a random address. Application programs used by the video storage server 2 are loaded thereinto. The RAM 222 also temporarily stores data and so on necessary for processes executed by the CPU 221, and outputs this data to the bus 230 as necessary.

The ROM 229 is a read-only memory that stores control programs necessary for processing performed by the CPU 221. The necessary control program is output to the bus 230 at a predetermined timing.

The CPU 221 controls the entire video storage server 2 by executing application programs loaded into the RAM 222, control programs stored in the ROM 229, and so on.

The communication unit 223 carries out protocol conversion and so on data output from the video storage server 2 and data input to the video storage server 2. This makes it possible for the video storage server 2 to carry out data communication with the camera control server 1 and the client 3 via the network 5.

The input unit 224 includes a keyboard, a mouse, and so on. Data input by a user of the video storage server 2 operating the input unit 224 is output to the CPU 221 or the like via the bus 230.

The external storage device 225 stores data necessary for processing performed by the CPU 221.

The video output unit 226 outputs data for displaying an operational screen of the video storage server 2 and so on in the display device 227, which is configured of a liquid-crystal display or the like.

Finally, the capturing period determination unit 228 finds the capturing periods (ranges of time in which the objects are present) of each of the moving objects 7 in the video data captured by the camera device 4, based on the control information of the camera device 4 and the location information of the moving objects 7.

<Client 3>

FIG. 2E is a function block diagram illustrating the configuration of the client 3 according to the first embodiment of the present invention. The client 3 includes a CPU 241, a RAM 242, a ROM 248, and a communication unit 243. The client 3 also includes an input unit 244, an external storage device 246, a video output unit 245, a GUI rendering unit 250, and a bus 249, for connecting these constituent elements to one another.

The RAM 242 is a semiconductor memory capable of specifying and reading from/writing to a random address. Application programs used by the client 3 are loaded thereinto. The RAM 242 also temporarily stores data and so on necessary for processes executed by the CPU 241, and outputs this data to the bus 249 as necessary.

The ROM 248 is a read-only memory that stores control programs necessary for processing performed by the CPU 241. The necessary control program is output to the bus 249 at a predetermined timing.

The CPU 241 controls the entire client 3 by executing application programs loaded into the RAM 242, control programs stored in the ROM 248, and so on.

The communication unit 243 carries out protocol conversion and so on data output from the client 3 and data input to the client 3. This makes it possible for the client 3 to carry out data communication with the camera control server 1 and the video storage server 2 via the network 5.

The input unit 244 includes a keyboard, a mouse, and so on. Data input by a user of the client 3 operating the input unit 244 is output to the CPU 241 or the like via the bus 249.

The external storage device 246 stores data necessary for processing performed by the CPU 241.

The video output unit 245 outputs data for displaying an operational screen of the client 3 (including the monitoring screen) and so on in the display device 247, which is configured of a liquid-crystal display or the like.

Finally, the GUI rendering unit 250 executes various processes for displaying a GUI such as the monitoring screen, which the user uses for monitoring through the monitoring system 10a.

<Processing of Camera Control Server 1>

Figure 16:
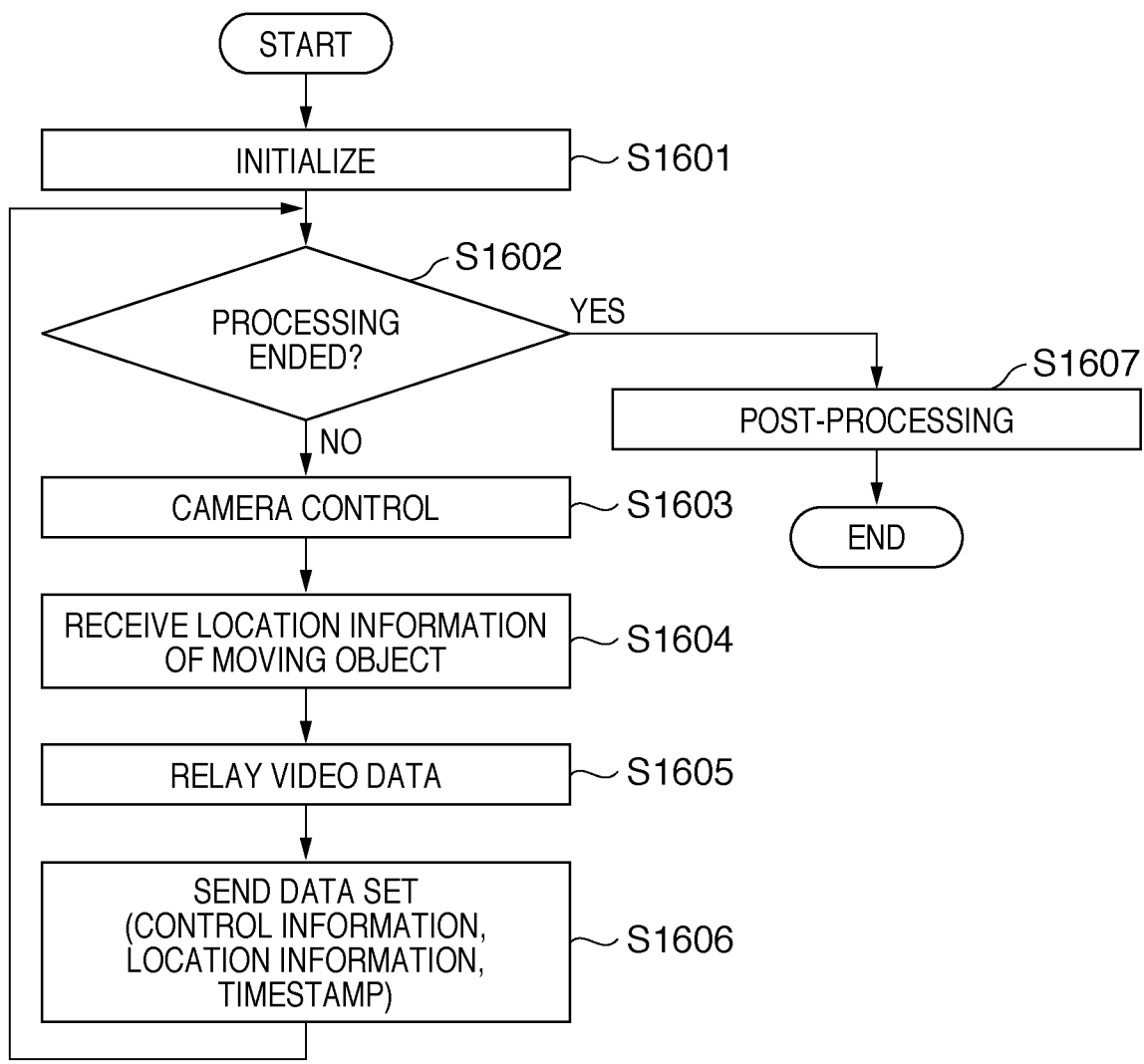
FIG. 16 is a flowchart illustrating the flow of processing performed by the camera control server.

FIG. 16 is a flowchart illustrating the flow of processing performed by the camera control server 1. The various processes indicated in this flowchart are executed by the function blocks illustrated in FIG. 2A, and the overall processing of this flowchart is commenced upon a user inputting a command for the processing to be commenced via the communication unit 203, the input unit 204, or the like.

In S1601, the CPU 201 executes various initialization processes. Specifically, the CPU 201 loads, for example, an application program for the camera control server 1 into the RAM 202. The CPU 201 then initializes variables within the program, the communication path, the camera device 4, the location detection apparatus 6, and so on. At this point in time, a path for communication with the video storage server 2, the client 3, and so on is established, and operational preparations for the various devices are completed.

In S1602, the CPU 201 determines whether or not the processing of the camera control server 1 is to be ended. "The processing ending" refers to, for example, a situation where the user has input a command to end the processing via the communication unit 203, input unit 204, or the like. If the processing is to be ended, the procedure moves to S1607, whereas if the processing is not to be ended (i.e., is to continue), the procedure moves to S1603.

In step S1603, if a camera control command has been received from the input unit 204, the client 3 (via the communication unit 203), or the like, the CPU 201 controls the camera device 4 via the external device signal exchange unit 207 in accordance with the received camera control command. The following are examples of the camera control command:
 a pan, tilt, zoom command; and
 a focus/aperture adjustment command.

In S1604, the CPU 201 receives location information of the moving objects 7 from the location detection apparatus 6. This process shall be described in detail hereinafter. First, the location detection apparatus 6 detects, at a constant interval, the spatial location coordinates Pi(xi,yi,zi) (where i=0, ..., Nobj) of the IC tags 8 held by the Nobj number of moving objects 7 located in the monitored space 11. The location detection apparatus 6 then outputs the detected coordinates Pi(xi,yi,zi) to the camera control server 1. The CPU 201 receives these coordinates via the location data input unit 208 and stores them in the RAM 202.

In S1605, the CPU 201 receives the video data output by the camera device 4 via the video input unit 206, adds to it a timestamp ts generated by a time generation unit (not shown), and transmits the video data to the video storage server 2.

In S1606, the CPU 201 transmits a data set consisting of the current control information of the camera device 4, the location information received in S1604, and the timestamp ts, to the video storage server 2. Here, the control information includes the following:
 pan, tilt, and zoom information; and
 focus/aperture information.

Furthermore, the data set is expressed, for example, as follows:
 [(Pan,Tilt,Zoom Information), (Focus/Aperture Information), Pi(xi,yi,zi), ts] (i=0, ..., Nobj−1)

The procedure then returns to S1602, and the same process is repeated until it is determined that the process is to end. If it has been determined, in S1602, that the process is to end, the procedure moves to S1607, where the CPU 201 executes post-processing such as disconnecting the path of communication with the video storage server 2, the client 3, and so on. After this, the process ends.

Figure 7:
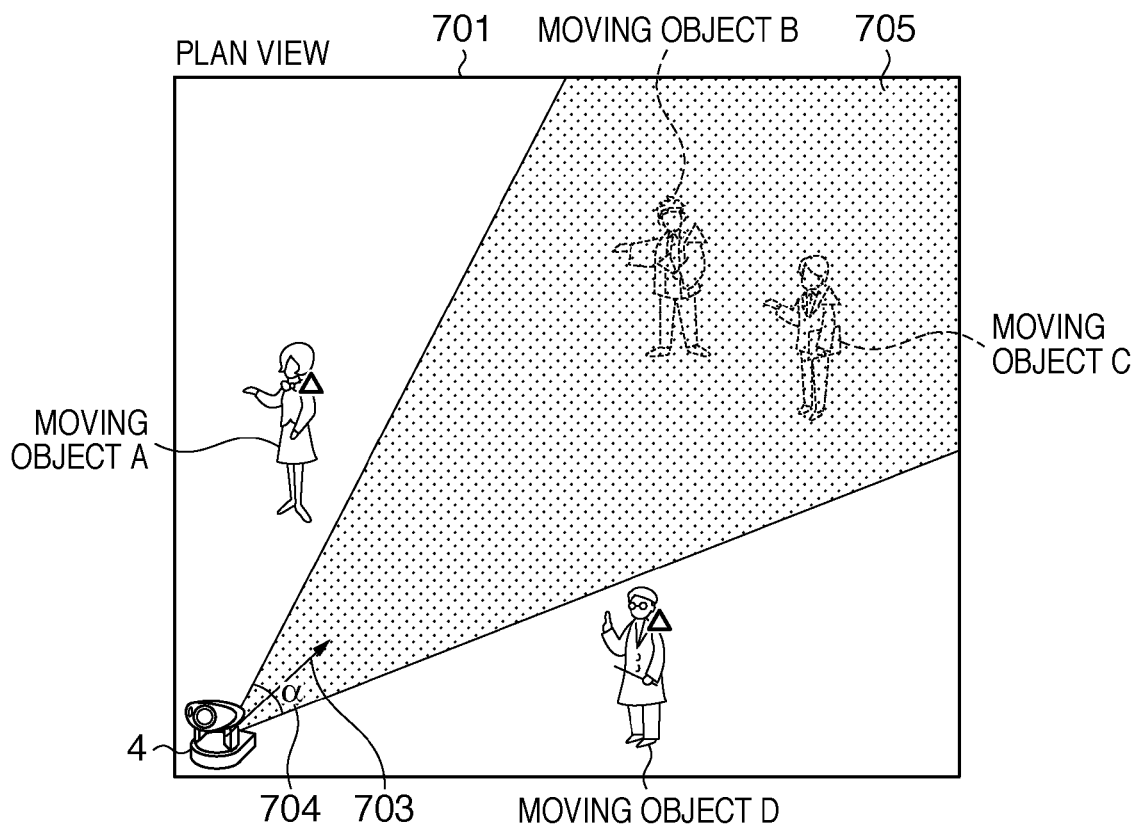
FIG. 7 is a diagram illustrating the relationship between the direction and view angle of a camera device and its visual range, using a plan view and a side view of a monitored space.
Figure 7:
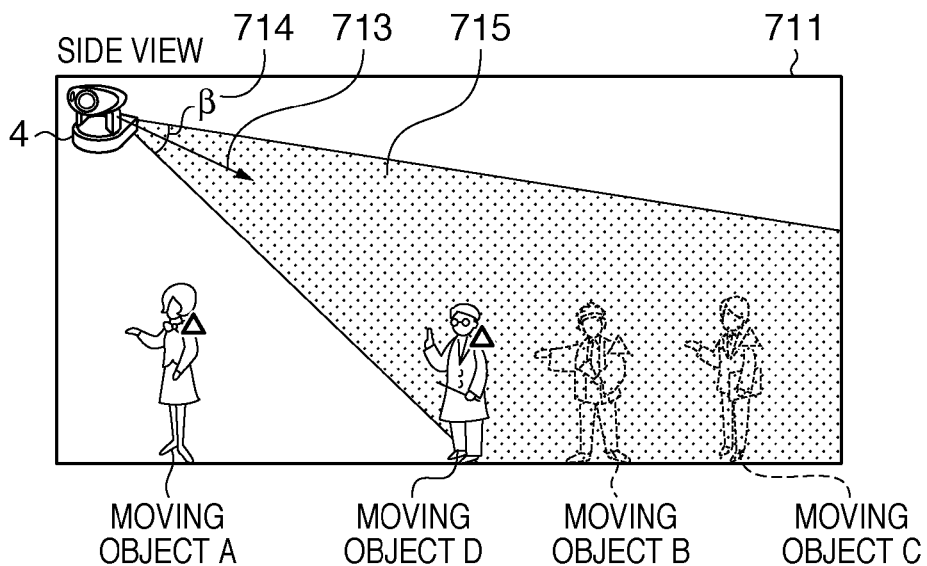

Next, the pan, tilt, and zoom information shall be described in detail with reference to FIG. 7. FIG. 7 is a diagram illustrating the relationship between the direction and view angle of the camera device 4 and its visual range, using a plan view 701 and a side view 711 of the monitored space 11.

Information regarding pan and tilt corresponds to the direction vectors indicated by reference numerals 703 and 713, respectively. Meanwhile, information regarding zoom corresponds to the view angle $\alpha$ in the horizontal direction and the view angle $\beta$ in the vertical direction, which are indicated by reference numerals 704 and 714, respectively. The visual range 9 of the camera device 4 is therefore the space indicated by reference numerals 705 and 715. In the example shown in FIG. 7, of the four moving objects 7 present in the monitored space 11, moving objects B and C are within the visual range 9 of the camera device 4, whereas moving objects A and D are outside of the visual range 9 of the camera device 4.

It should also be noted that, although not shown in FIG. 7, the information regarding zoom also indicates the relationship between the distance from the camera device 4 and the visual range 9. For example, when the information regarding zoom indicates that the camera device 4 is zooming in on a remote object, items that are close to the camera device 4 will fall outside of the visual range 9 even if those items are within the space indicated by reference numerals 705 and 715.

<Information Stored by Video Storage Server 2>

Figure 3A:
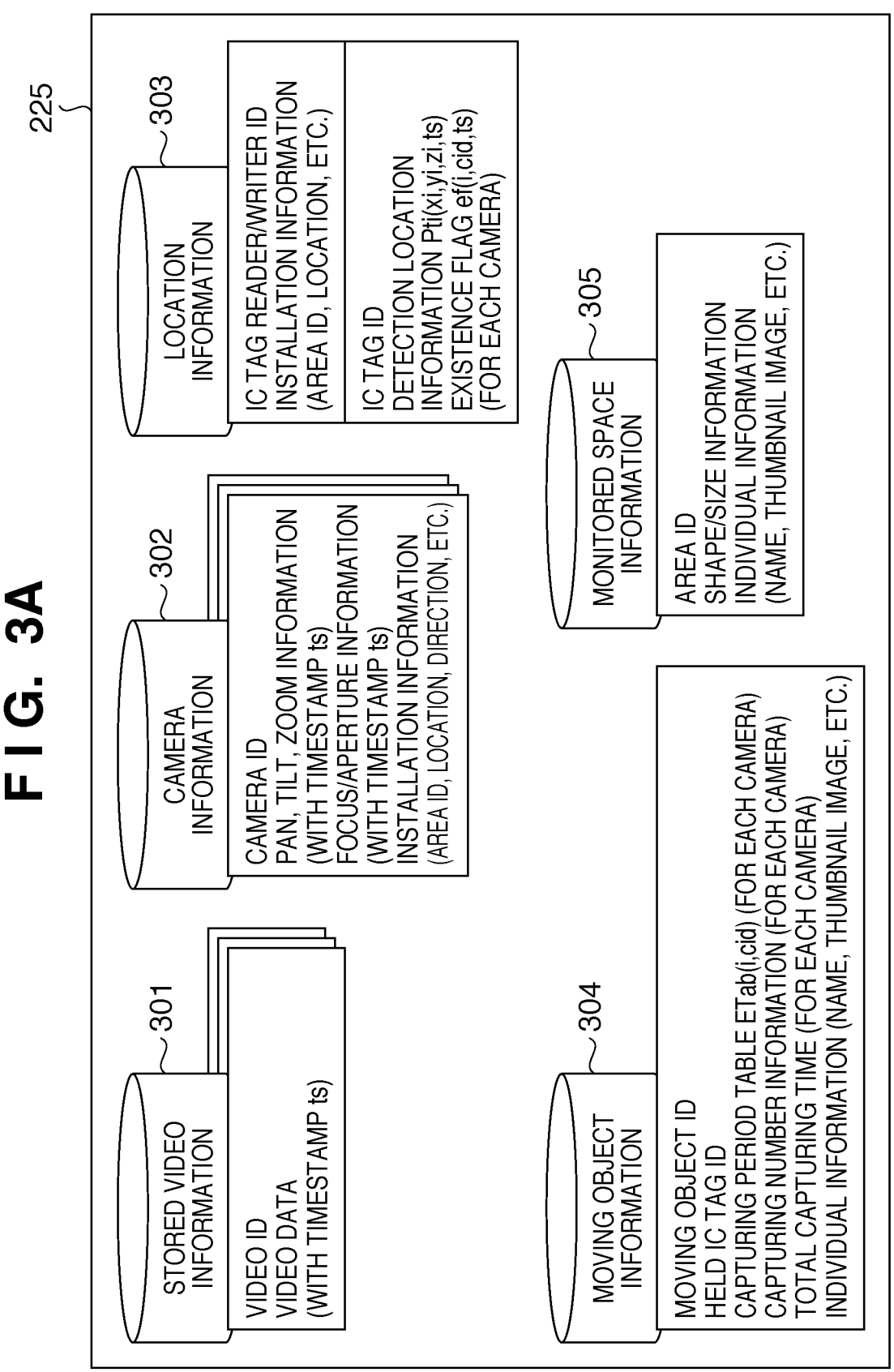
FIG. 3A is a diagram illustrating information stored in an external storage device by the video storage server according to the first and second embodiments of the present invention.

FIG. 3A is a diagram illustrating information stored in the external storage device 225 by the video storage server 2 according to the first embodiment of the present invention.

The following information is stored in the external storage device 225 as stored video information 301:
 a video ID (an ID identical to a camera ID, described later, can be used. This is also referred to as "cid" hereinafter); and
 video data (actual digital video data, including the timestamp ts (time information)).

While only one camera device 4 is used in the present embodiment, in a case where multiple camera devices 4 are used, the stated information is recorded for each of the camera devices.

The following information is recorded in the external storage device 225 as camera information 302:
 the camera ID;
 pan, tilt, and zoom information (time series information including the timestamp ts);
 focus/aperture information (time series information including the timestamp ts); and
 location information (area number, installation location/direction, etc.).

While only one camera device 4 is used in the present embodiment, in a case where multiple camera devices 4 are used, the stated information is recorded for each of the camera devices.

The following information is recorded in the external storage device 225 as location information 303:
- an IC tag reader/writer ID (it is assumed in the present embodiment that there is a single IC tag reader/writer);
- location information (area number, installation location/direction, etc.);
- IC tag IDs (0 to Nobj-1);
- detection location information $Pti(xi,yi,zi,ts)$ (three-dimensional location coordinates for each IC tag 8 output by the location detection apparatus 6. Time-series information that includes the timestamp ts); and
- existence flags $ef(i,cid,ts)$ (for each camera) (flags indicating whether or not the coordinates Pti are within the visual range of the camera device. Time-series information that includes the timestamp ts.)

In the present embodiment, only a single camera device 4 is used, and thus the existence flag $ef(i,cid,ts)$ is recorded for only the single camera device 4. However, if multiple camera devices are used, the existence flag $ef(i,cid,ts)$ is recorded for each of the camera devices. In the present embodiment, only a single camera device 4 is used, and thus the existence flag need not include the cid, and can instead be simply $ef(i,ts)$. The same applies to a capturing period table $ETab(i,cid)$ and the like described below as well.

The following information is recorded in the external storage device 225 as moving object information 304:
- a moving object ID;
- a carried IC tag ID;
- the capturing period table $ETab(i,cid)$ (for each camera);
- capturing number information (for each camera);
- total capturing time (for each camera); and
- individual information (a name, thumbnail image, or the like).

In the present embodiment, only a single camera device 4 is used, and thus the capturing period table $ETab(i,cid)$, capturing number information, and total capturing time are each recorded for only the single camera device 4. However, if multiple camera devices are used, these pieces of information are recorded for each of the camera devices.

The following information is recorded in the external storage device 225 as monitored space information 305:
- an area ID;
- shape/size information (three-dimensional shape data and size information of the monitored space 11); and
- individual information (a name, thumbnail image, or the like).

<Processing Performed by Video Storage Server 2>

FIG. 17 is a flowchart illustrating the flow of processing performed by the video storage server 2. The various processes indicated in this flowchart are executed by the function blocks illustrated in FIG. 2D. The processing illustrated in the flowchart of FIG. 17 commences upon the user inputting a command to commence the processing via the communication unit 223, the input unit 224, or the like.

In S1701, the CPU 221 executes various initialization processes. Specifically, the CPU 221 loads, for example, an application program for the video storage server 2 into the RAM 222. The CPU 221 then initializes variables within the program, the communication path, and so on. At this point in time, a path for communication with the camera control server 1, the client 3, and so on is established. Note that when the variables are initialized, the variable PreExist(i) (where i=0, . . . , Nobj-1), which is the variable substituted for the existence flag of the previous time for each moving object 7, is initialized to 0 (false).

In S1702, the CPU 221 determines whether or not the processing performed by the video storage server 2 is to be ended. "The processing ending" refers to, for example, a situation where the user has input a command to end the processing via the communication unit 223, input unit 224, or the like. If the processing is to be ended, the procedure moves to S1706, whereas if the processing is not to be ended (i.e., is to continue), the procedure moves to S1703.

In S1703, the CPU 221 receives the video data (including the timestamp ts) sent by the camera control server 1 via the communication unit 223, and records the video data as the stored video information 301 in a predetermined location in the external storage device 225.

In S1704, the CPU 221 receives the data set sent by the camera control server 1 (see S1606 in FIG. 16) via the communication unit 223 and stores the data set in the RAM 222. The CPU 221 then records the pan, tilt, and zoom information, focus/aperture information, and timestamp ts included in the data set as the camera information 302 in a predetermined location in the external storage device 225. Similarly, $Pti(xi,yi,zi,ts)$, or the pair of the spatial location coordinates $Pi(xi,yi,zi)$ and the timestamp ts, is stored as the location information 303 in a predetermined location in the external storage device 225. Here, once again, i=0, . . . , Nobj-1.

In S1705, the CPU 221 updates the capturing period table $ETab(i,cid)$ of each moving object 7, using the pan, tilt, and zoom information (including the timestamp ts) in the RAM 222 and $Pti(xi,yi,zi,ts)$. Here, i=0, . . . , Nobj-1. The capturing period table $ETab(i,cid)$ stores the capturing period of each moving object 7 in the video data. An IN point (capturing start time) and an OUT point (capturing end time) in each line indicate a capturing period, an example of which is indicated in FIG. 19A.

The procedure then returns to S1702, and the same process is repeated until it is determined that the process is to end. If it has been determined, in S1702, that the process is to end, the procedure moves to S1706, where the CPU 221 executes post-processing such as disconnecting the path of communication with the camera control server 1, the client 3, and so on. After this, the process ends.

Figure 18A:
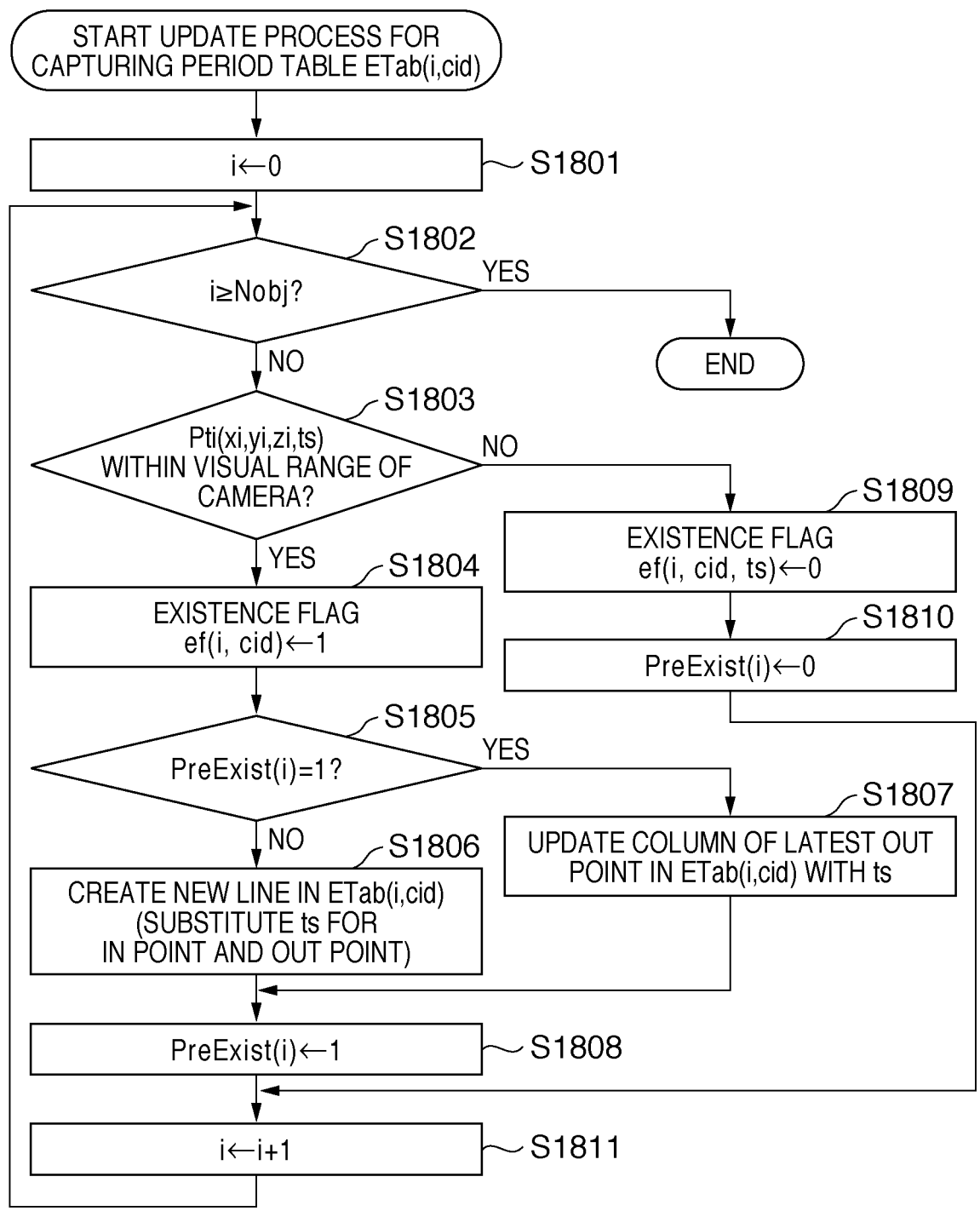
FIG. 18A is a flowchart illustrating the details of the flow of processing for updating a capturing period table, according to the first embodiment of the present invention.

The process for updating the capturing period table ETab (i,cid) shall be described in detail with reference to FIGS. 18A and 7. FIG. 18A is a flowchart illustrating the details of the flow of processing for updating the capturing period table $ETab(i,cid)$, according to the first embodiment of the present invention. Each process found in this flowchart is executed by the capturing period determination unit 228 in accordance with instructions from the CPU 221.

In S1801, the capturing period determination unit 228 substitutes "0" for the variable i.

In S1802, the capturing period determination unit 228 determines whether or not the variable i is greater than or equal to Nobj. The process ends if the results of the determination are "true". However, the process moves to S1803 if the results of the determination are "false".

In S1803, the capturing period determination unit 228 determines whether or not the location $Pti(xi,yi,zi,ts)$ of the $i^{th}$ moving object falls within the visual range of the camera device 4 (see FIG. 7) found based on the pan, tilt, and zoom information in the same time ts. If the location falls within this visual range, the procedure moves to S1804, whereas if the location does not fall within this visual range, the procedure moves to S1809.

In S1804, the capturing period determination unit 228 substitutes a value 1 (true), indicating that a moving object is present within the visual range, for the existence flag ef(i,ts).

In S1805, the capturing period determination unit 228 determines whether or not PreExist(i)=1 (that is, whether or not PreExist(i) is true). The procedure moves to S1807 if PreExist(i) is true, and moves to S1806 if PreExist(i) is false.

In S1806, the capturing period determination unit 228 creates a new line in the capturing period table ETab(i,cid) of the $i^{th}$ moving object, and adds timestamp ts values to the IN point and OUT point columns of that line.

However, in S1807, the capturing period determination unit 228 substitutes a timestamp ts value in the OUT point column of the line that indicates the newest capturing period in the capturing period table ETab(i,cid) of the $i^{th}$ moving object (that is, overwrites and updates the value).

In S1808, the capturing period determination unit 228 substitutes 1 (true) for PreExist(i).

If the results of the determination in S1803 are false, in S1809, the capturing period determination unit 228 substitutes a value 0 (false), indicating that a moving object is not present within the visual range, for the existence flag ef(i,ts).

Then, in S1810, the capturing period determination unit 228 substitutes 0 (false) for PreExist(i).

In S1811, the capturing period determination unit 228 increments the value of i by 1.

The procedure then returns to S1802, and the same process is repeated until it is determined that the variable i is greater than or equal to Nobj.

<Monitoring Screen>

A monitoring screen for the monitored space 11, displayed in the display device 247 of the client 3, shall be described hereinafter with reference to FIGS. 9A to 14A.

In the following descriptions, it is assumed that the camera device 4 continues capturing video (that is, the camera control server 1 continuously acquires monitoring data and transmits it to the client 3 via the video storage server 2) when the user is browsing the monitoring screen (when monitoring is being carried out). However, according to the present embodiment, the configuration of the monitoring screen and its rendering technique can be employed by the user to confirm monitoring data already stored in the video storage server 2, even after the camera device 4 has stopped capturing video.

Immediately Following Startup

Figure 9A:
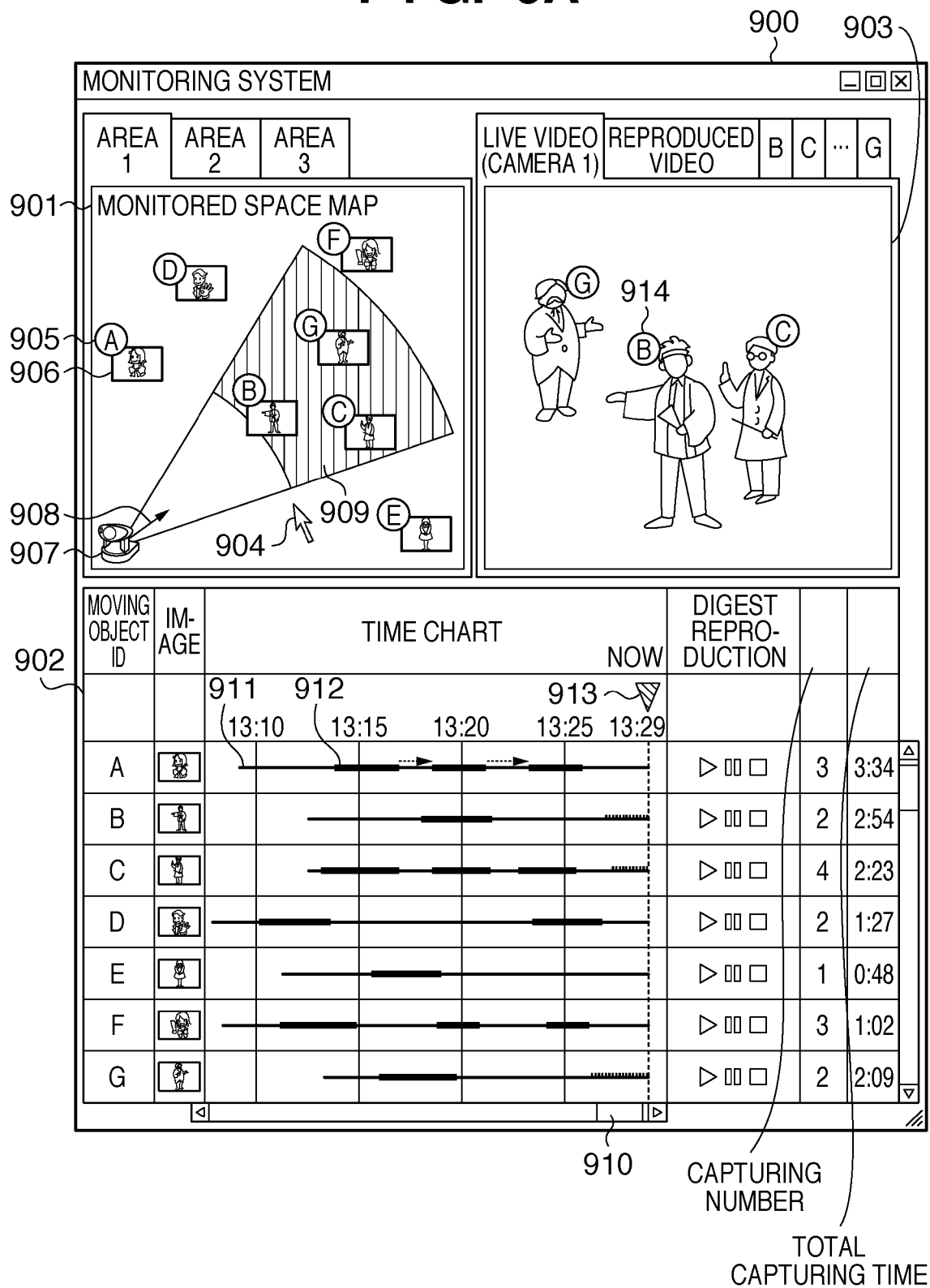
FIG. 9A shows an overview of a monitoring screen displayed in a display device immediately after the client starts an application program for displaying the monitoring screen, according to the first embodiment of the present invention.

FIG. 9A shows an overview of a monitoring screen 900 displayed in the display device 247 immediately after the client 3 starts an application program for displaying the monitoring screen.

The monitoring screen 900 includes a monitored space map 901, a time chart 902, and a reproduction window 903. Furthermore, a mouse pointer 904 is displayed in the display device 247, which the user can use to provide various instructions to the monitoring screen 900. In other words, the client 3 is provided with a monitored space display unit that displays a plan view (not limited, of course, to a plan view, as shall be described later) of the monitored space 11 based on the monitored space information.

The monitored space map 901 is a map that surveys the entirety (or a portion) of the monitored space 11. In the present embodiment, the monitored space map 901 shows a plan view, viewing the monitored space 11 from above.

Numeral 905 is a moving object icon that indicates the location of a moving object 7, which is a person, an animal, or an object, that is present in the monitored space 11. Each moving object 7 can be identified by a moving object ID (for example, "A", "B", and so on) included in the center of the icon. In FIG. 9A, seven moving object icons 905 are displayed. Furthermore, a thumbnail image 906, expressing a characteristic of each of the moving objects 7, is displayed adjacent to each of the moving object icons 905. The thumbnail image 906 can be obtained by, for example, the GUI rendering unit 250 extracting a certain frame from the video data and generating a reduced-size image of the moving object 7 included in that frame. Each moving object icon 905 and thumbnail image 906 move through the monitored space 11 in tandem with their moving object 7.

Numeral 907 indicates a camera icon corresponding to the camera device 4, 908 indicates the direction of the camera device 4, and 909 indicates the visual range of the camera device 4. If the pan, tilt, or zoom of the camera device 4 is altered, the direction 908 and visual range 909 change in accordance therewith.

The time chart 902 displays the capturing periods for each moving object 7 upon a time axis. The past capturing periods of each moving object 7 present in the monitored space 11 are displayed on separate lines in the time chart 902. Furthermore, a scroll bar 910 is provided at the bottom of the time chart 902. The scroll bar 910 automatically scrolls in the left direction in accordance with the passage of time, and is slid in order to enable browsing of regions that do not fit within the screen. In other words, the client 3 includes a time axis display unit.

Numeral 911 indicates an existence line that indicates the time in which a moving object 7 is present within the monitored space 11 (this is the thin black line in the diagram).

Meanwhile, numeral 912 indicates a bold line which overlaps the existence line 911, indicating the capturing period of the moving object 7. Numeral 913 indicates the current time. The capturing period at the current time 913 is displayed in a manner that makes it distinguishable from past capturing periods by changing, for example, the color of the line (in FIG. 9A, moving objects B, C, and G are being captured at the current time 913).

The moving object ID, thumbnail image, digest reproduction buttons (discussed later), capturing number, total capturing time, and the like are also displayed in the time chart 902 for each of the moving objects 7 and the like.

A past video that is stored in the video storage server 2, or a live video (a video from the current time), is displayed in the reproduction window 903 (in FIG. 9A, a live video is being displayed). At the current time, moving objects B, C, and G are present in the live video, and moving object IDs 914 are displayed in the vicinity of each moving object (for example, in the vicinity of the IC tags attached to each moving object).

In this manner, various information is displayed in the monitoring screen 900, and the user can use this monitoring screen 900 to confirm, with ease, the movement of each moving object 7 present in the monitored space 11, the current live video, and a list of the capturing periods of each moving object 7.

When Moving Object Icon is Selected

FIG. 10A shows an overview of the monitoring screen 900 when a moving object icon has been selected. In FIG. 10A, elements identical to those in FIG. 9A are given identical reference numerals, and descriptions thereof shall be omitted herein.

Here, it is assumed that the moving object icon 905 of a particular moving object (the moving object A, in FIG. 10A) is selected using the mouse pointer 904 (of course, the selection of multiple moving objects is also possible).

Numeral 1001 indicates a trajectory of the location of the moving object corresponding to the selected moving object icon 905. When the trajectory 1001 is displayed, it gradually grows in length as the position of the corresponding moving object icon 905 changes over time, tracing the location of that moving object icon 905. In other words, the client 3 includes a moving object selection unit and a trajectory display unit. The trajectory is displayed upon, for example, the plane view of the monitored space (corresponding to the monitored space map 901).

Numerals 1002, 1003, and 1004 indicate capturing period lines for the moving object A, overlapped and displayed upon the trajectory 1001. In FIG. 10A, each capturing period line is automatically assigned a different color, and the same colors are assigned to the capturing period lines of the moving object A in the time chart 902. Although the capturing period lines are described as being "overlapped and displayed upon the trajectory 1001", this essentially means that the portions of the trajectory 1001 that correspond to capturing periods are displayed in a manner that enables them to be distinguished from other portions of the trajectory 1001. In other words, the display format of the capturing period lines is not intended to be limited to the specific examples given herein.

The screen illustrated in FIG. 10A is in a digest reproduction (continuous reproduction) mode. Accordingly, the characters "START" and "END" are displayed at the IN point of the first capturing period line 1002 and the OUT point of the last capturing period line 1004, respectively, of the stated three capturing period lines. Furthermore, dotted lines that connect these three capturing period lines are also displayed.

Buttons 1005 are used to reproduce, pause, or stop the video. As illustrated in FIG. 10A, the buttons 1005 function as buttons for controlling digest reproduction (continuous reproduction) when they are displayed in the vicinity of the selected moving object icon 905.

Numeral 1006 is a reproduction position pointer indicating the current reproduction position in the video data. In FIG. 10A, the reproduction position pointer is stopped at the position of the IN point of the first capturing period (that is, the "START" position). In other words, the client 3 includes a pointer display unit.

The line corresponding to the selected moving object A is displayed in the time chart 902 in a manner that makes it possible to distinguish it from other lines. Furthermore, selection of the moving object can also be carried out by using the mouse pointer 904 to specify the line of a desired moving object in the time chart 902. When a certain moving object is selected in the time chart 902, the corresponding moving object icon 905 is displayed on the monitored space map 901 in a manner that makes it distinguishable from other moving object icons 905, and the trajectory 1001, buttons 1005, and so on are also displayed. In other words, the selection of the moving object in the monitored space map 901 is reflected in the time chart 902, and vice versa.

The same colors assigned to the capturing period lines in the monitored space map 901 are assigned to the corresponding capturing period lines on the line of the moving object selected in the time chart 902. Moreover, as with the trajectory 1001, the characters "START" and "END" are displayed at the first IN point and the last OUT point, respectively, of the three capturing period lines in the time chart 902. Furthermore, dotted lines that connect the three capturing period lines are also displayed.

The digest reproduction buttons are also active (i.e., selectable) in the time chart 902.

A reproduction position pointer 1007 corresponds to the reproduction position pointer 1006. In FIG. 10A, the reproduction position pointer is stopped at the position of the IN point of the first capturing period (that is, the "START" position).

In such a state, a frame (still image) indicated by the position of the reproduction position pointer 1007 (or 1006) in the video data is displayed in the reproduction window 903 (in FIG. 10A, moving objects A, C, and F are present in this frame).

Accordingly, the user can efficiently confirm multiple capturing periods of the selected moving object, with respect to both the capturing location and the capturing time.

When Play Button is Selected

Figure 11A:
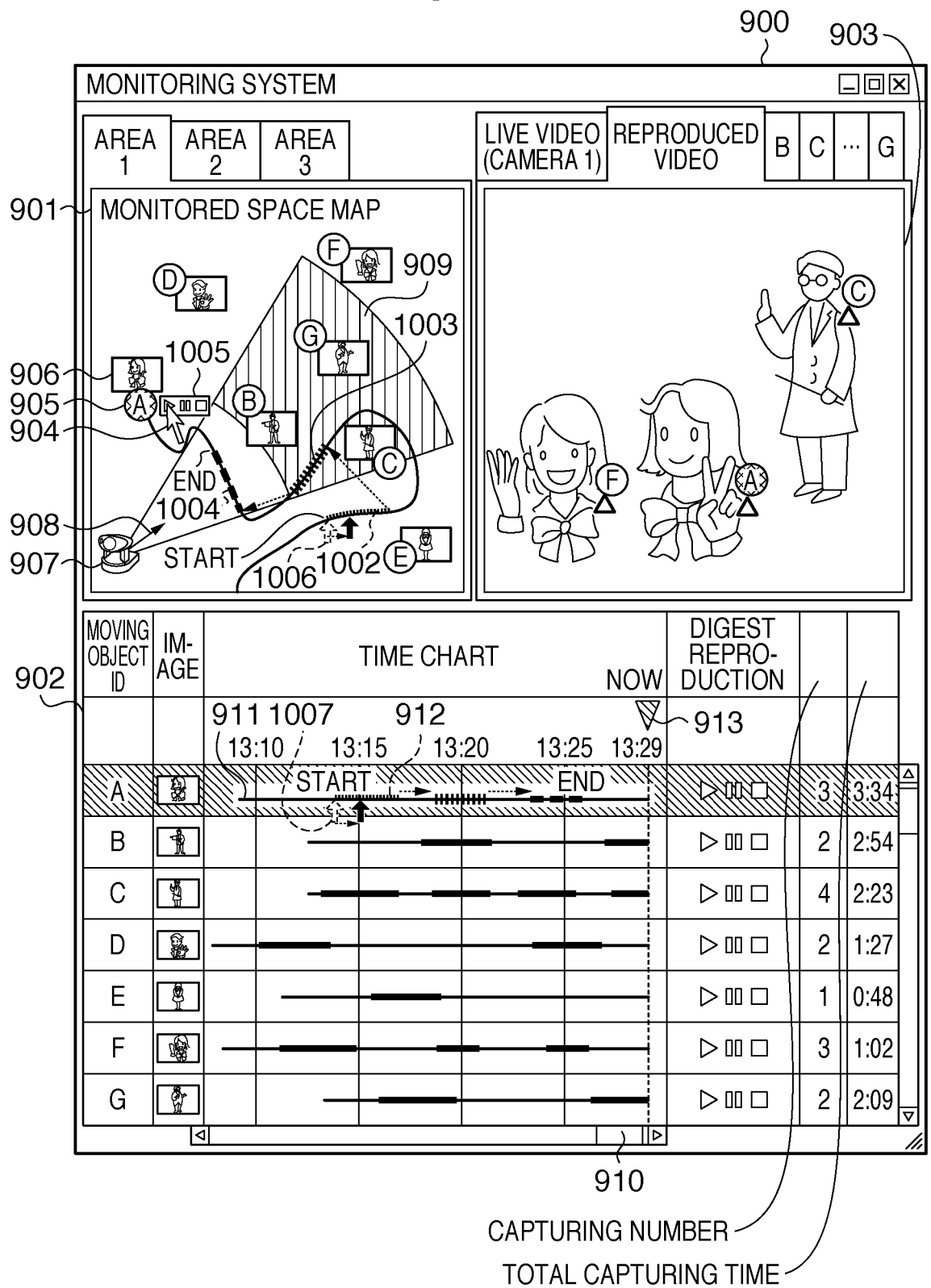
FIG. 11A shows an overview of a monitoring screen when a play button has been selected, according to the first embodiment of the present invention.

FIG. 11A shows an overview of the monitoring screen 900 when a play button has been selected. The play button is included in the buttons 1005 in the vicinity of the selected moving object icon, or in the digest reproduction buttons in the time chart 902. In FIG. 11A, elements identical to those in FIG. 10A are given identical reference numerals, and descriptions thereof shall be omitted herein.

When the play button is selected (clicked), the reproduction position pointers 1006 and 1007 located at the IN point position ("START" position) in the monitored space map 901 and time chart 902, respectively, simultaneously commence moving along their respective capturing period lines.

Then, upon reaching the OUT point of the first capturing period line, the reproduction position pointers 1006 and 1007 then move from the IN point of the second capturing period line to the OUT point of that line, and then finally move from the IN point of the third capturing period line to the OUT point of that line ("END" position), ultimately stopping thereafter. In this manner, the reproduction position pointers 1006 and 1007 automatically move through the three capturing periods in a continuous (seamless) manner.

While these two reproduction position pointers 1006 and 1007 are moving, the frames at which the reproduction position pointers 1006 and 1007 are located are displayed sequentially in the reproduction window 903 (in FIG. 11A, moving objects A, C, and F are present).

Accordingly, the user can easily view the video (moving image) in which the three capturing periods showing the selected moving object A are automatically played continuously (i.e., reproduced through digest reproduction).

When Capturing Period is Selected

Figure 12A:
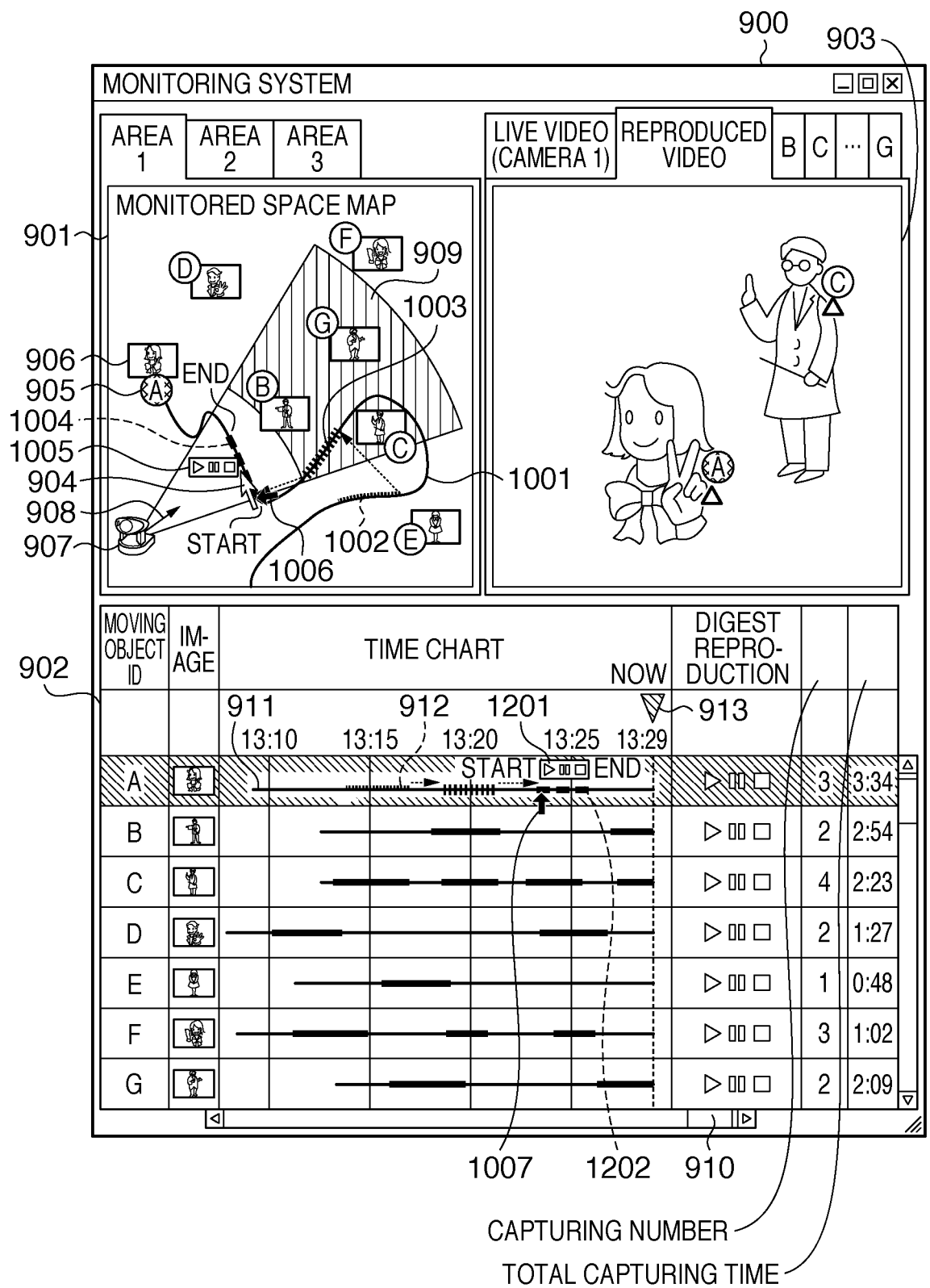
FIG. 12A shows an overview of a monitoring screen when a capturing period has been selected upon a trajectory, according to the first embodiment of the present invention.

FIG. 12A shows an overview of the monitoring screen 900 when a capturing period has been selected on the trajectory 1001. In FIG. 12A, elements identical to those in FIG. 10A are given identical reference numerals, and descriptions thereof shall be omitted herein.

Here, it is assumed that a single capturing period line, such as, for example, the capturing period 1004, has been selected upon the trajectory 1001 of the selected moving object A or in the time chart 902, using the mouse pointer 904. Such being the case, the buttons 1005 and 1201 are displayed in the monitored space map 901 and the time chart 902 in a position corresponding to the selected capturing period line 1004. The reproduction position pointers 1006 and 1007 also move to the corresponding positions. At this time, the digest reproduction buttons are in a non-active state in the time chart 902. The characters "START" and "END" are also displayed at the position of IN points and the OUT points, respectively, of the capturing period lines 1004 and 1202.

In such a state, a frame (still image) indicated by the position of the reproduction position pointers 1006 and 1007 is displayed in the reproduction window 903 (in FIG. 12A, moving objects A and C are present in this frame). In other words, the client 3 includes a first selection unit, and a first reproduction display unit that reproduces video in accordance with the selection of a capturing period performed by the first selection unit.

Accordingly, the user can easily select and specify an arbitrary capturing period of the moving object, with respect to both the capturing location and the capturing time. In other words, the client 3 includes a second selection unit that selects a capturing period in the time axis in the time chart 902, and a second reproduction display unit that reproduces video in accordance with the selection of a capturing period performed by the second selection unit.

When Play Button is Selected after Capturing Period has been Selected

Figure 13A:
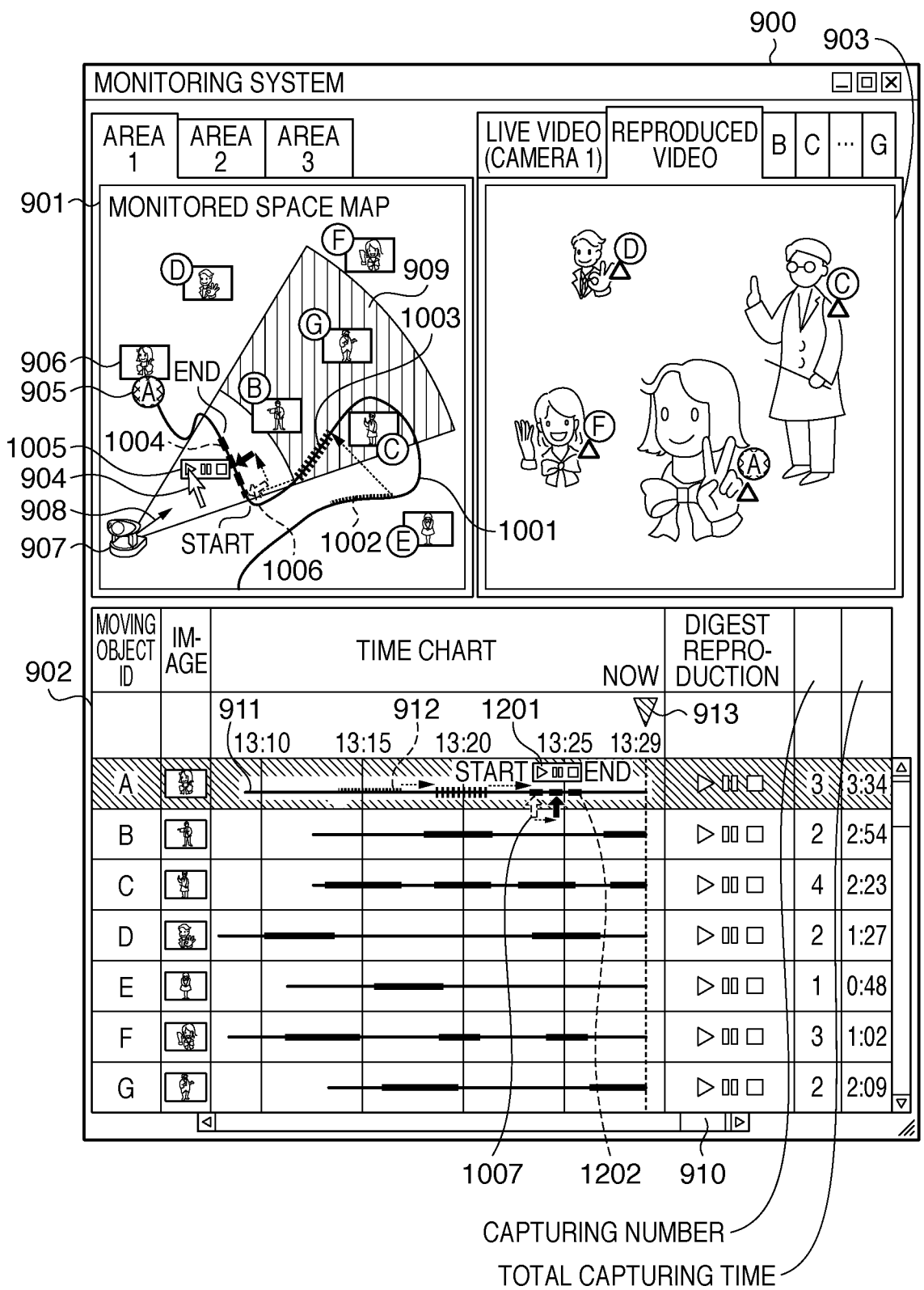
FIG. 13A shows an overview of a monitoring screen when a play button has been selected, according to the first embodiment of the present invention.

FIG. 13A shows an overview of the monitoring screen 900 when a play button has been selected (clicked). When the play button included in either of the buttons 1005 and 1201 is selected, the two reproduction position pointers 1006 and 1007, which are in the position of the IN points of the capturing period lines 1004 and 1202 ("START" position), commence movement.

When the reproduction position pointers 1006 and 1007 reach the OUT points of the capturing period lines 1004 and 1202 ("END" position), reproduction is stopped. While the two reproduction position pointers 1006 and 1007 are moving, the frames at which the reproduction position pointers 1006 and 1007 are located are read out from the video storage server 2 and displayed sequentially in the reproduction window 903 (in FIG. 13A, moving objects A, C, D, and F are present).

Accordingly, the user can easily view the video (moving image) of a desired capturing period showing the selected moving object A.

Note that it is also possible for the client 3 to reproduce and display the video data corresponding to the selected capturing period upon that capturing period being selected, without the play button being pressed.

When Reproduction Position Pointer is Dragged

Figure 14A:
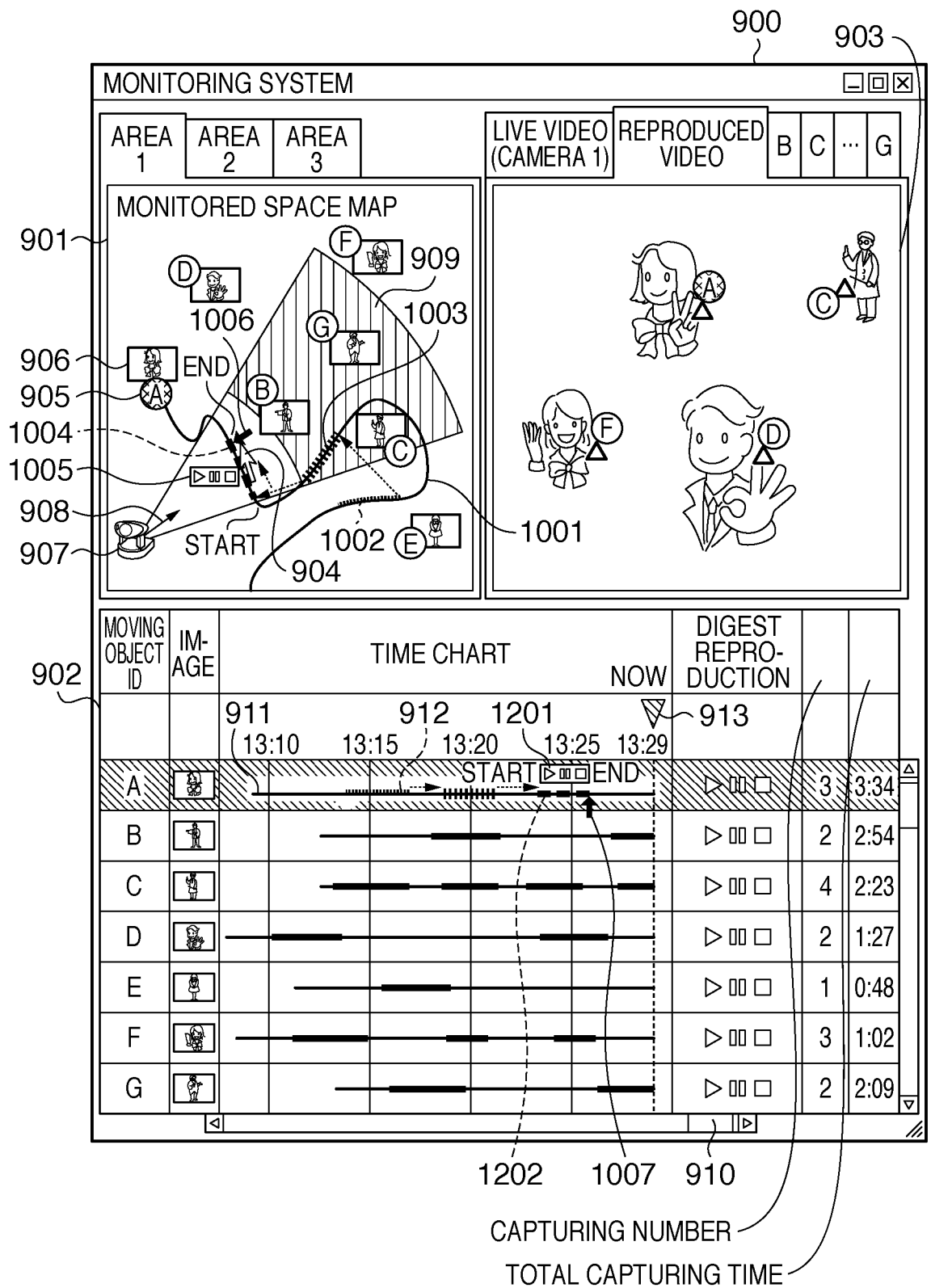
FIG. 14A shows an overview of a monitoring screen when a reproduction position pointer has been dragged along a capturing period line, according to the first embodiment of the present invention.

FIG. 14A shows an overview of the monitoring screen 900 when the reproduction position pointer is dragged along a capturing period line.

The reproduction position pointer 1006 or 1007 in the selected capturing period line 1004 or 1202 is (temporally) dragged forward/backward by the mouse pointer 904. Accordingly, the reproduction position pointers 1006 and 1007 slide along the capturing period lines 1004 and 1202. During this sliding, the frames at which the reproduction position pointers 1006 and 1007 are located are read out from the video storage server 2 and displayed in the reproduction window 903 (in FIG. 14A, moving objects A, C, D, and F are present). In other words, the client 3 includes a pointer movement unit.

In this manner, the user can easily specify and confirm the frames of a desired time in a capturing period of a specific moving object.

<GUI (Monitoring Screen) Rendering Data>

FIG. 8A is a diagram illustrating GUI rendering data used by the client 3 in order to render the monitoring screen. Note that GUI rendering data 801 shown in FIG. 8A is generated by the client 3 receiving monitoring data from the video storage server and processing the received monitoring data using an arbitrary method.

The GUI rendering data 801 includes the moving object number Nobj, moving object rendering data Obj(i), the video type, an automatic reproduction flag, a reproduction target moving object ID, and a reproduction position pointer variable tp.

Each piece of moving object rendering data Obj(i) 802 holds rendering data for each moving object, and thus includes the moving object ID, a selection flag, a location information table PTab(i) 803, and a reproduction period table STab(i) 804.

The "video type" is a flag indicating whether the video is live video or stored video, and is either 0 (for live video) or 1 (for stored video).

The automatic reproduction flag is a flag indicating whether the video is to be automatically reproduced or manually reproduced, and is either 0 (for automatic reproduction) or 1 (for manual reproduction).

The reproduction target moving object ID holds the ID (one of 0 to Nobj-1) of the moving object to be reproduced.

The reproduction time pointer tp holds time information indicating the current reproduction time.

The moving object ID holds an index number (one of 0 to Nobj-1) for each moving object.

The selection flag indicates whether or not the moving object it belongs to is selected, and is either 0 (not selected) or 1 (selected).

The three-dimensional coordinate data $Pti(xi,yi,zi,ts)$ and the existence flag $ef(i,cid,ts)$, which include the timestamp ts and have been read out from the video storage server 2, are stored in the location information table PTab(i) 803.

A table in which a reproduction flag column has been added to the capturing period table ETab(i,cid) for each moving object, which has been read out from the video storage server 2, is stored in the reproduction period table STab(i) 804. It should be noted that the reproduction flag is a flag indicating whether or not to reproduce the video in the period indicated by that line, and is a value of either 0 (reproduce) or 1 (do not reproduce).

<Processing Performed by Client 3>

FIGS. 4 and 5A to 5H each illustrate processing performed by the client 3.

Main Routine

Figure 4:
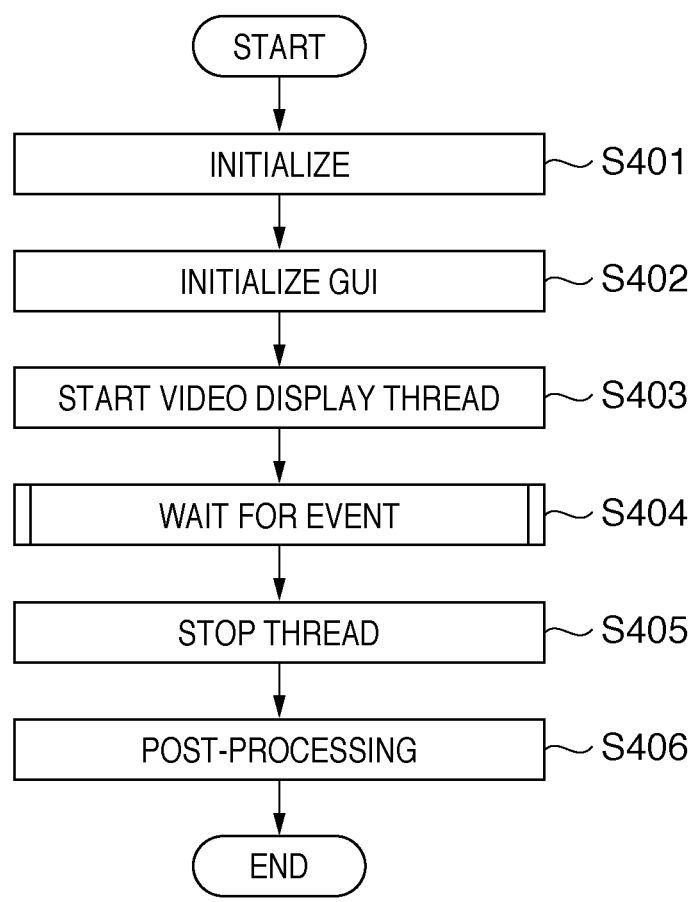
FIG. 4 is a flowchart illustrating the main routine of processing performed by the client.

FIG. 4 is a flowchart illustrating the main routine of processing performed by the client 3. The processing illustrated in this flowchart commences upon the user inputting a command to start an application program for displaying the monitoring screen 900 via the input unit 244 or the like.

In S401, the CPU 241 executes various initialization processes. Specifically, the CPU 241 loads, for example, an application program for the monitoring screen 900 of the client 3 into the RAM 242. The CPU 241 then initializes variables within the program, including the aforementioned GUI rendering data 801, the communication path, and so on. At this point in time, a path for communication with the camera control server 1, the video storage server 2, and so on is established.

In S402, the CPU 241 initializes and displays the GUI (the monitoring screen 900). By displaying the GUI, various information, starting with the GUI, is displayed in the display device 247 of the client 3.

Figure 5A:
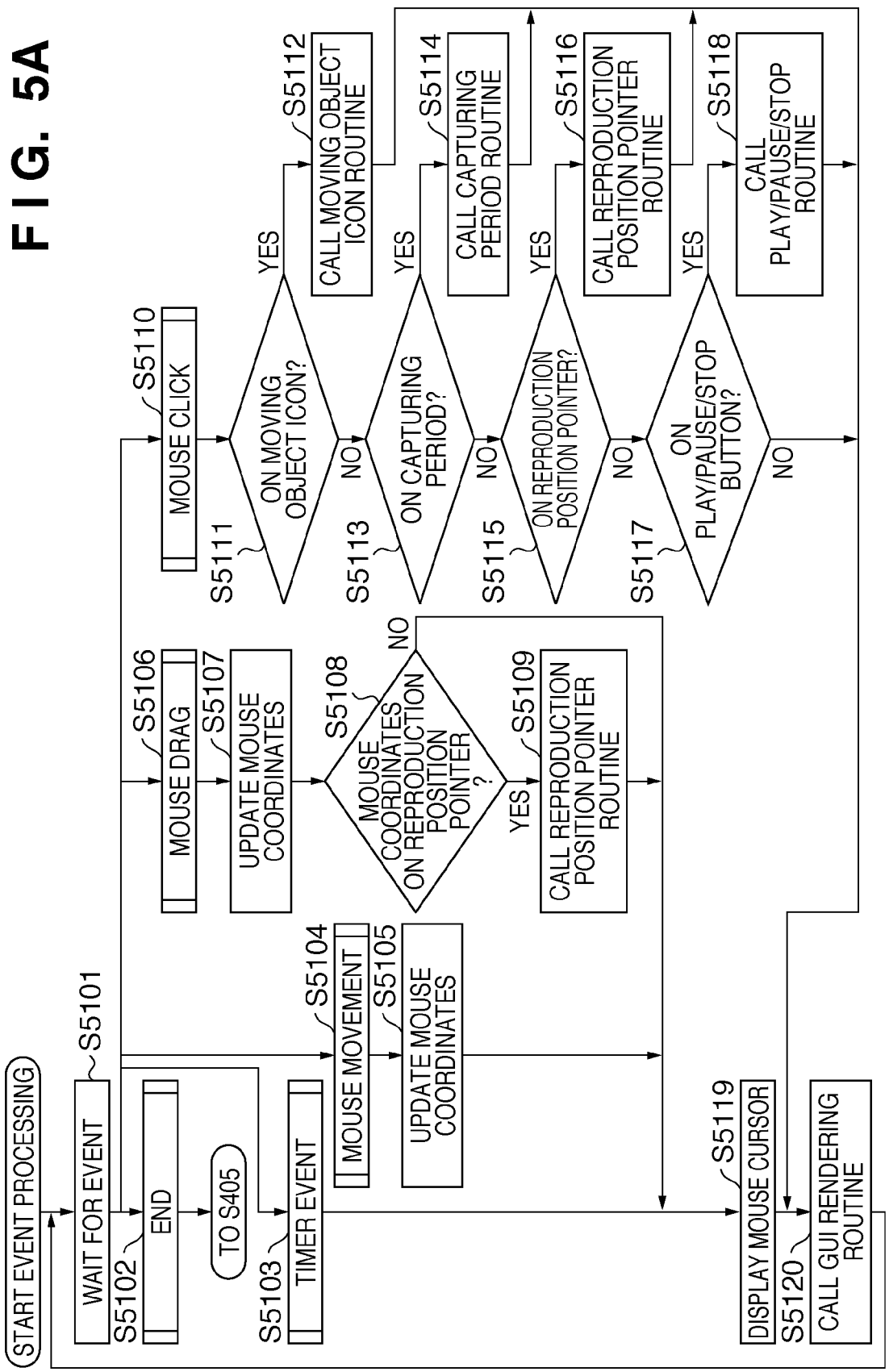
FIG. 5A is a flowchart illustrating the flow of event processing in the main routine according to the first embodiment of the present invention.
Figure 5B:
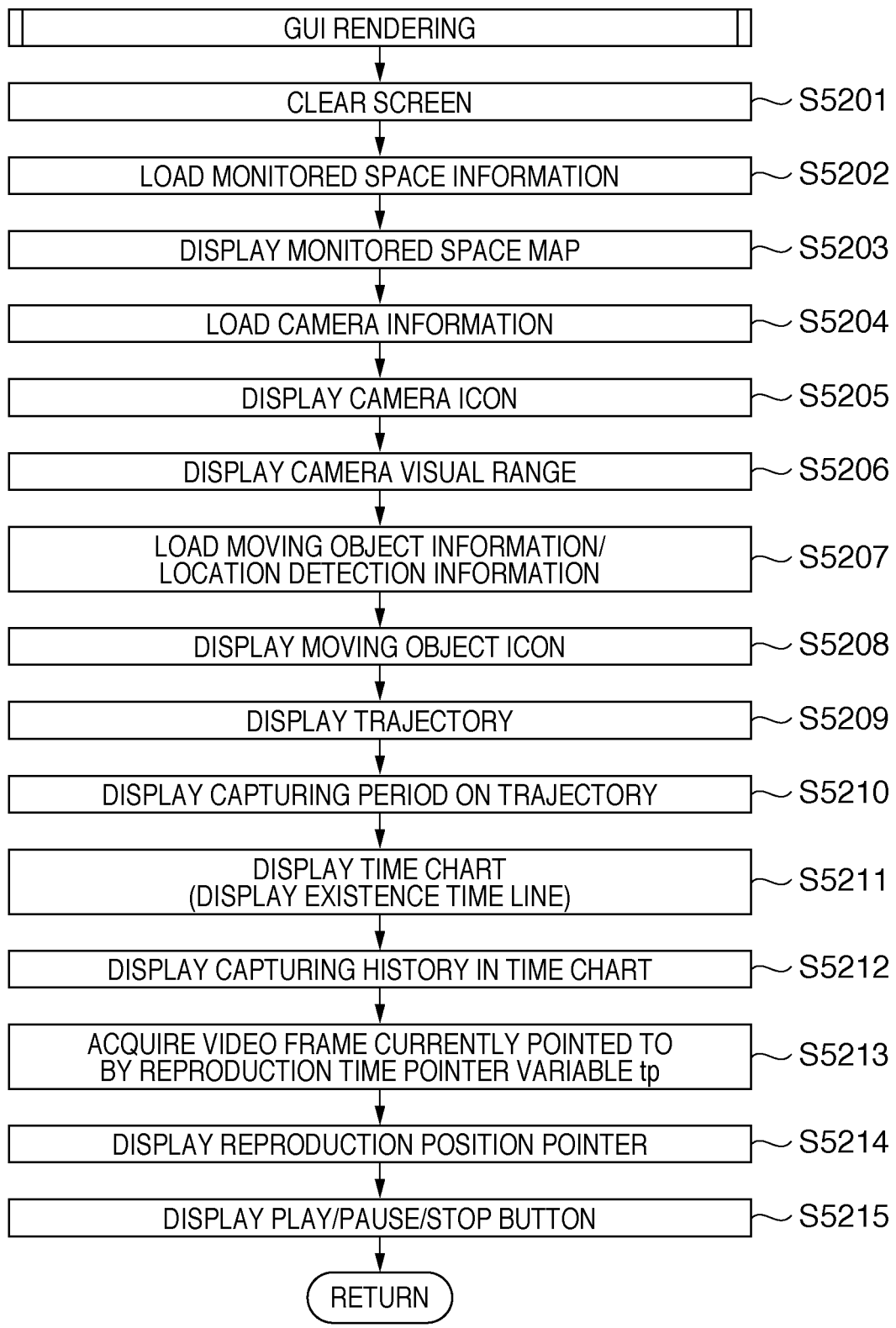
FIG. 5B is a flowchart illustrating the flow of processing in a GUI rendering processing routine according to the first embodiment of the present invention.
Figure 5C:
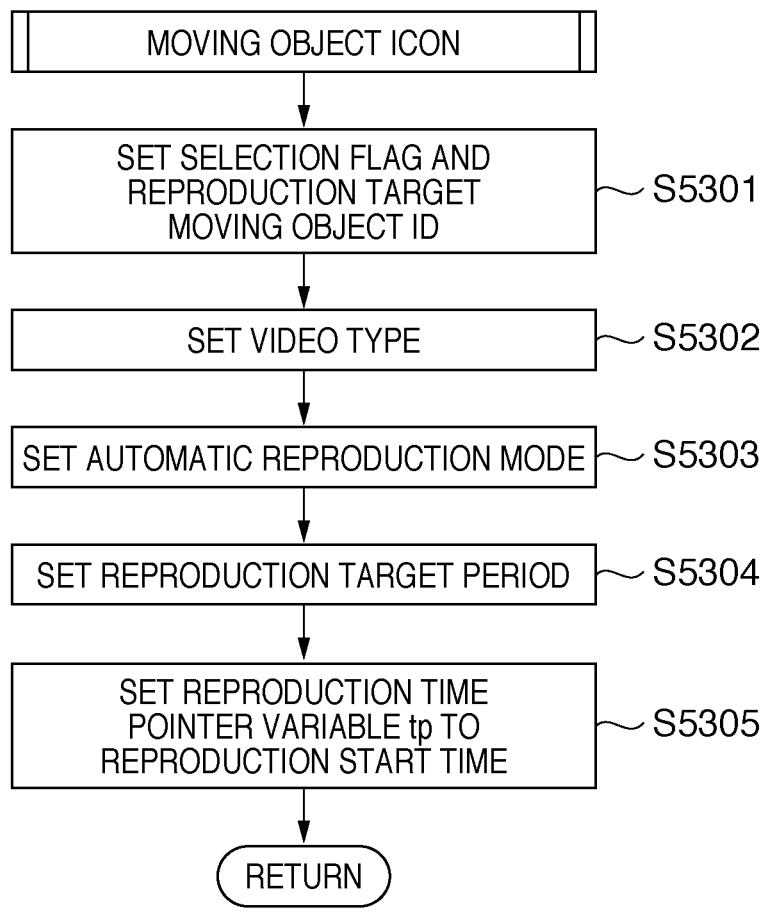
FIG. 5C is a flowchart illustrating the flow of processing in a moving object icon processing routine according to the first embodiment of the present invention.
Figure 5D:
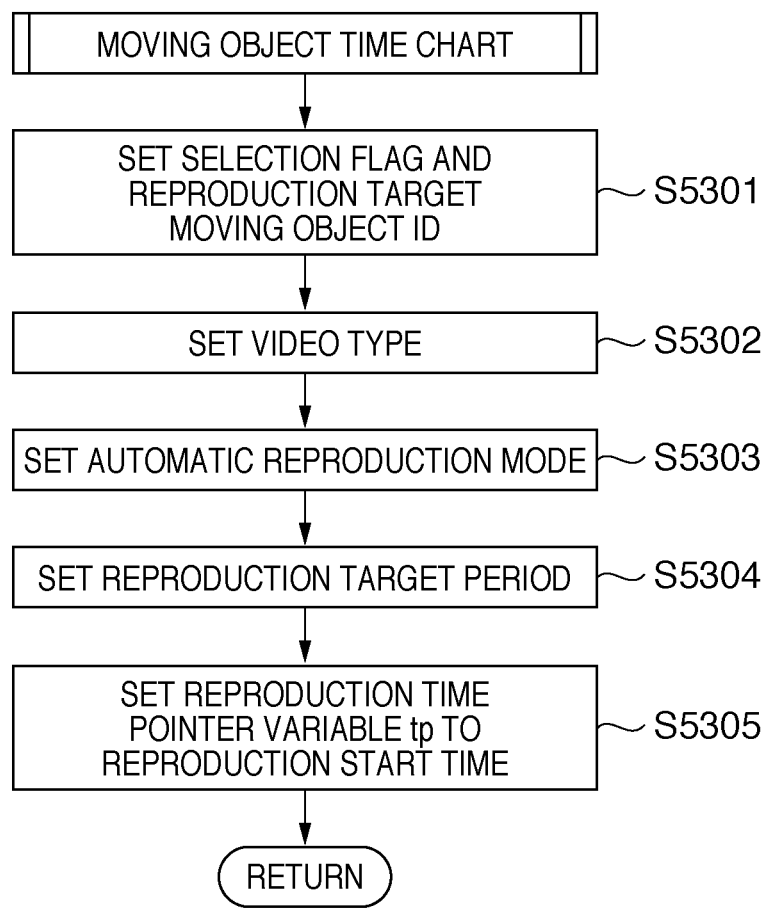
FIG. 5D is a flowchart illustrating the flow of processing in a moving object time chart processing routine according to the first embodiment of the present invention.
Figure 5E:
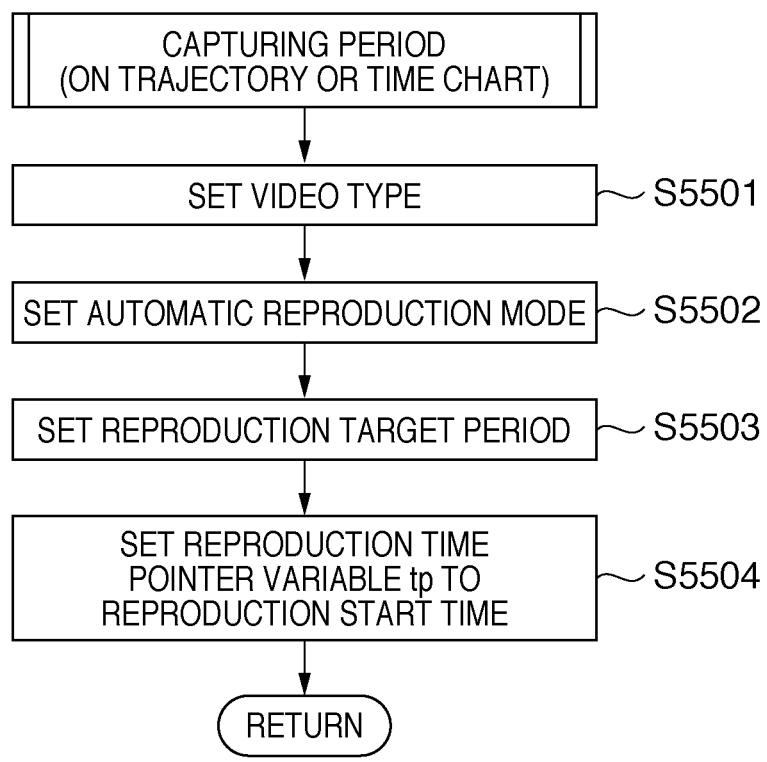
FIG. 5E is a flowchart illustrating the flow of processing in a capturing period processing routine according to the first embodiment of the present invention.
Figure 5F:
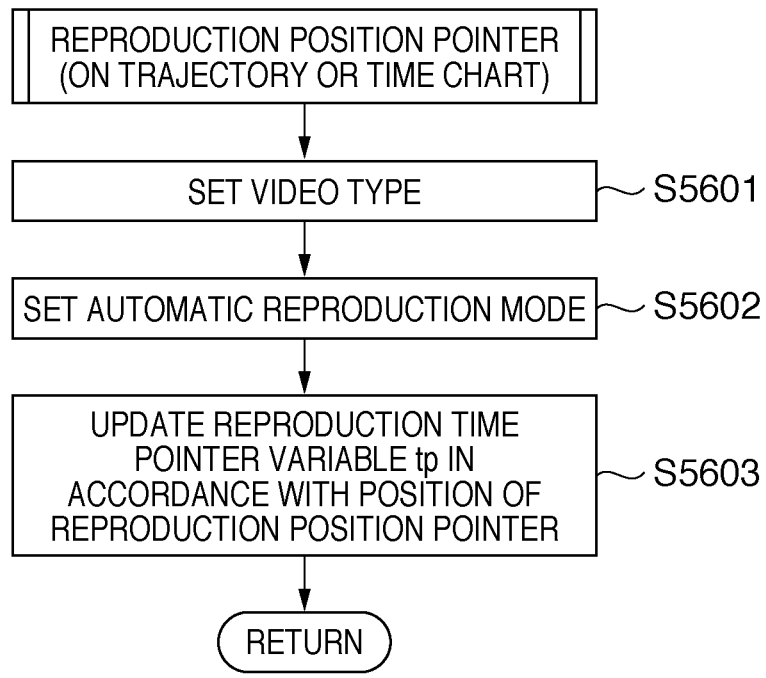
FIG. 5F is a flowchart illustrating the flow of processing in a reproduction position pointer processing routine according to the first embodiment of the present invention.
Figure 5G:
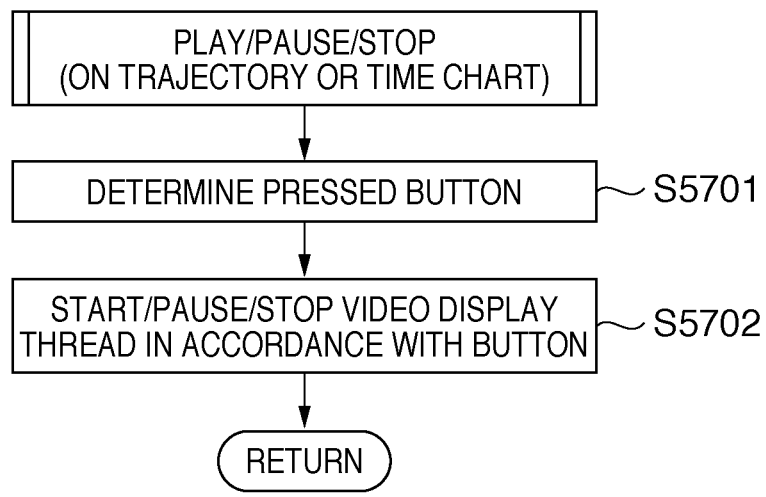
FIG. 5G is a flowchart illustrating the flow of processing in a play/pause/stop processing routine according to the first embodiment of the present invention.
Figure 5H:
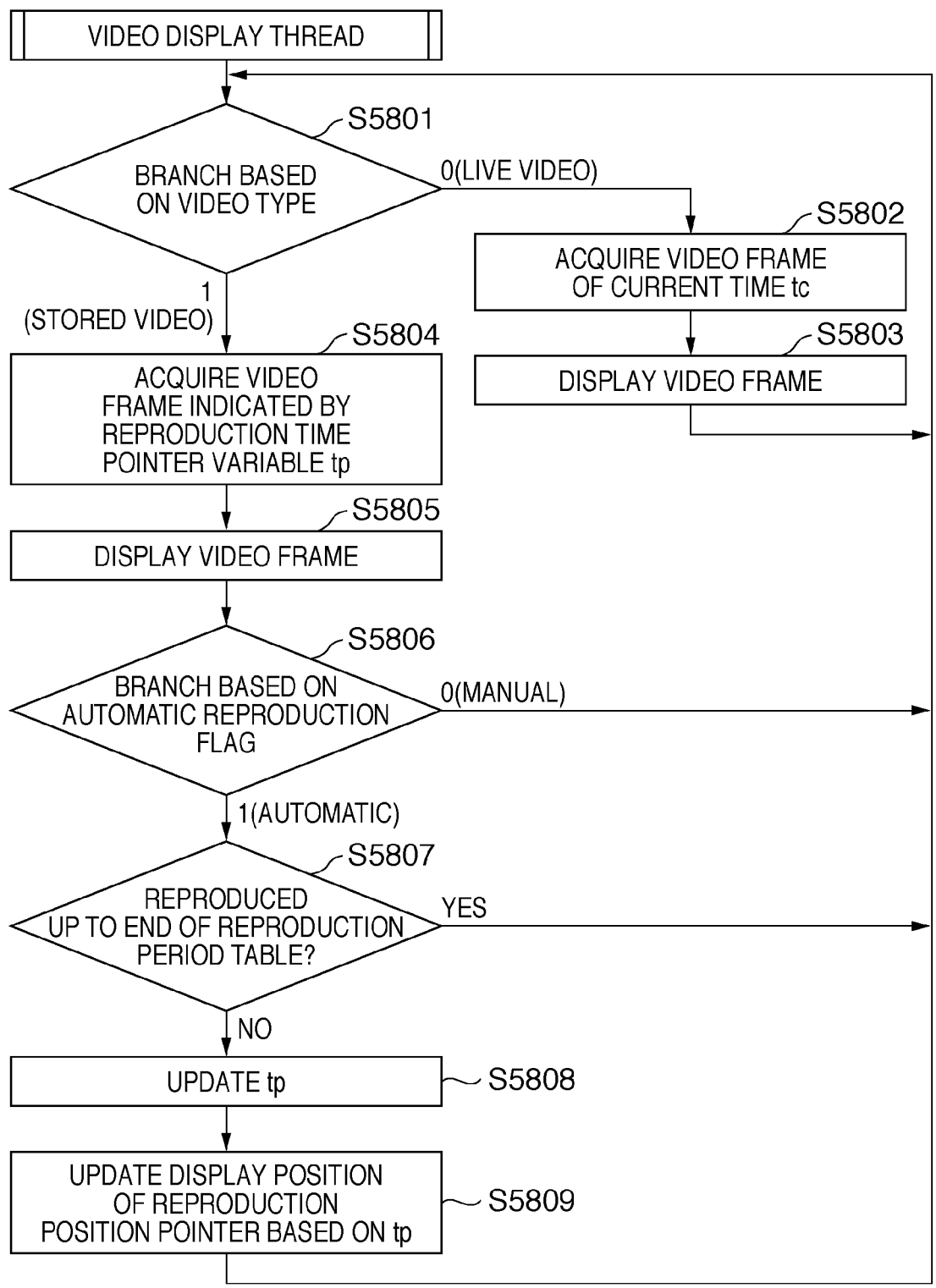
FIG. 5H is a flowchart illustrating the flow of processing in a video display thread according to the first embodiment of the present invention.

In S403, the CPU 241 starts a video display thread (FIG. 5H). The video display thread realizes moving image reproduction for display in the monitoring screen 900 by displaying video that is being captured, or monitoring data of a specified time that is being downloaded from the video storage server 2, in the display device 247 and advancing the reference time. It should be noted that the client 3 may acquire the stored monitoring data in advance (for example, in S401). Furthermore, the video display thread can also acquire monitoring data that is being newly stored as time passes.

In S404, the CPU 241 waits for an event to occur, and then performs a process based on the event that has occurred (these processes shall be discussed later with reference to FIGS. 5A through 5G). In other words, the architecture of the application program for displaying the monitoring screen 900 is basically event-driven. If an event for ending the application program occurs and is processed in S404, the procedure moves to S405.

In S405, the CPU 241 ends the video display thread.

In S406, the CPU 241 executes post-processing such as disconnecting the path of communication with the camera control server 1, the video storage server 2, and so on. After this, the process ends.

Event Processing in Main Routine

FIG. 5A is a flowchart illustrating the flow of event processing in the main routine. Each step in FIGS. 5A to 5H can be implemented through operations performed by the CPU 241 and GUI rendering unit 250 of the client 3 in accordance with the application program.

In S5101, the CPU 241 waits for an event to occur. Thread end, a timer event, mouse movement, a mouse drag, a mouse click, and so on are examples of events that can occur.

If a thread end event has occurred in S5101, the procedure moves to S5102, where the CPU 241 ends the event processing and returns to S405 of FIG. 4.

If a timer event has occurred in S5101, the procedure moves to S5103. A "timer event" refers to an event that occurs automatically, without any particular action taking place, at a given interval (for example, every 0.5 seconds).

If a mouse movement event has occurred in S5101, the procedure moves to S5104. Then, in S5105, the CPU 241 updates the coordinates of the mouse pointer 904 (see FIG. 9A) (called "mouse coordinates" hereinafter). The mouse coordinates are stored in, for example, the RAM 242.

If a mouse drag event has occurred in S5101, the procedure moves to S5106. Then, in S5107, the CPU 241 updates the mouse coordinates, in the same manner as in S5105. If the mouse coordinates are on the reproduction position pointer 1006, 1007, or the like (see FIG. 10A) in S5108, the CPU 241 calls a reproduction position pointer processing routine (FIG. 5F) in S5109. If not, the procedure moves to S5119.

If a mouse click event has occurred in S5101, the procedure moves to S5110. Thereafter, processes for determining which GUI object provided by the GUI (for example, the moving object icon 905 and so on shown in FIG. 9A) has been clicked are executed (S5111, S5113, S5115, and S5117).

If a moving object icon has been clicked, the CPU 241 calls a moving object icon processing routine (FIG. 5C) in S5112.

If a capturing period line has been clicked, the CPU 241 calls a capturing period processing routine (FIG. 5E) in S5114.

If a reproduction position pointer has been clicked, the CPU 241 calls the reproduction position pointer processing routine (FIG. 5F) in S5116.

If a play/pause/stop button (for example, a button included in the buttons 1005 shown in FIG. 10A) has been clicked, the CPU 241 calls a play/pause/stop processing routine (FIG. 5G) in S5118.

Finally, although not shown in the diagrams, if the line corresponding to a predetermined moving object is clicked in the time chart 902, the CPU 241 calls a moving object time chart processing routine (FIG. 5D).

Thus, because the video display thread is event-driven, the behavior of the mouse pointer 904 is determined along with what object that event is being affected upon, and processing is executed in accordance with the results of that determination.

Following the processing for a timer event, mouse movement event, and mouse drag event, the CPU 241 displays the mouse pointer 904 in S5119.

After S5119, or after the end of processing for a mouse click event, the CPU 241 calls the GUI rendering processing routine (FIG. 5B) in S5120.

The procedure then returns to S5101, and the same processes are repeated until an end event has occurred.

GUI Rendering Processing Routine

FIG. 5B is a flowchart illustrating the flow of processing in the GUI rendering processing routine.

In S5201, the screen is cleared.

In S5202, the monitored space information 305 is loaded through communication with the video storage server 2, and in S5203, the monitoring screen 900 is rendered in the monitored space map 901 based on shape data included in the monitored space information 305.

In S5204, the camera information 302 is loaded through communication with the video storage server 2; in S5205, a camera icon is displayed, and in S5206, the visual range of the camera is displayed.

In S5207, necessary data within the moving object information 304 and location information 303 is loaded through communication with the video storage server 2, and is stored in an appropriate location within the moving object rendering data Obj(i) 802 in the GUI rendering data 801. More specifically:

the capturing period table ETab(i,cid) (within the moving object information 304) is stored in the reproduction period table STab(i) 804 (within Obj(i) 802); and the detection location information Pti(xi,yi,zi,ts) and existence flag ef(i,cid,ts) (within the location information 303) are stored in the location information table PTab(i) 803 (within Obj(i) 802).

In S5208, each moving object icon is displayed on the monitored space map 901 based on the location information table PTab(i) 803.

In S5209, the trajectory 1001 for moving objects for which the selection flag in Obj(i) 802 is 1 is rendered on the map by, for example, connecting each of the location coordinates in PTab(i) 803 with straight lines.

In S5210, multiple capturing periods of the moving object are superimposed and rendered upon the trajectory 1001, for each moving object for which the selection flag is 1, by connecting, with a bold line, the location coordinates of portions having successive is in the existence flag column of the location information table PTab(i) 803. Different colors are, however, assigned to each continuous segment of bold line.

In S5211, existence lines 911 are rendered on the time chart 902 for each moving object, based on PTab(i) 803.

In S5212, the (multiple) capturing periods of the moving object are rendered over the existence line 911 as a bold line (in, for example, black), based on the STab(i) 804. However, note that as this time, bold lines in the time chart 902, indicating capturing periods of a moving object for which the selection flag is 1, are assigned the same colors as the bold lines of the capturing periods rendered on the trajectory 1001 rendered in S5210.

In S5213, the video frame currently pointed to by the reproduction time pointer variable tp (within in the GUI rendering data 801) is acquired through communication with the video storage server 2.

If there is a moving object for which the selection flag is currently 1 in S5214, the reproduction position pointer is rendered in an appropriate position, indicated by tp, within the trajectory of the moving object on the map indicated by the reproduction target moving object ID (within the GUI rendering data 801).

In S5215, the play/pause/stop button is displayed in an appropriate position on the trajectory of the moving object.

Moving Object Icon Processing Routine

FIG. 5C is a flowchart illustrating the flow of processing in the moving object icon processing routine.

In S5301, the selection flag is set to 1 (indicating that the moving object has been selected), and the ID of the selected moving object is set as the reproduction target moving object ID.

In S5302, 1 is set for the video type (indicating stored video).

In S5303, 1 is set for the automatic reproduction mode (indicating that the video is to be automatically reproduced).

In S5304, 1 is substituted for the reproduction flags in all lines of the table indicated by STab (the reproduction target moving object ID) 804.

In S5305, the time information of the first IN point in the line for reproduction checked in S5304 is set for the reproduction time pointer variable tp.

Moving Object Time Chart Processing Routine

FIG. 5D is a flowchart illustrating the flow of processing in the moving object time chart processing routine.

As the processes of the steps in FIG. 5D are identical to the processes of the steps in FIG. 5C, the same reference numerals shall be applied thereto, and descriptions thereof shall be omitted.

Capturing Period Processing Routine

FIG. 5E is a flowchart illustrating the flow of processing in the capturing period processing routine. Note that the following descriptions assume that the capturing period (the capturing period indicated as the target$^{th}$) displayed on either the trajectory of the moving object or the time chart has been clicked.

In S5501, 1 is set for the video type (indicating stored video).

In S5502, 1 is set for the automatic reproduction mode (indicating that the video is to be automatically reproduced).

In S5503, 1 is substituted for the reproduction flag indicated as the target$^{th}$, whereas 0 is substituted for the other reproduction flags, in the table indicated by STab (the reproduction target moving object ID) 804.

In S5504, the time information of the first IN point in the line for reproduction checked in S5503 is set for the reproduction time pointer variable tp.

Reproduction Position Pointer Processing Routine

FIG. 5F is a flowchart illustrating the flow of processing in the reproduction position pointer processing routine.

In S5601, 1 is set for the video type (indicating stored video).

In S5602, 0 is set for the automatic reproduction mode (indicating that the video is to be manually reproduced).

In S5603, the value of the reproduction time pointer variable tp is updated by increasing/decreasing the value thereof as appropriate, in accordance with the position of the reproduction position pointer on the trajectory or the time chart.

Play/Pause/Stop Processing Routine

FIG. 5G is a flowchart illustrating the flow of processing in the play/pause/stop processing routine.

The type of button pressed is determined in S5701, and the startup/termination of the video display thread is controlled in response to the pressed button in S5702.

Such a process makes it possible for the user to reproduce and stop the video with freedom.

Video Display Thread

FIG. 5H is a flowchart illustrating the flow of processing in the video display thread. The video display thread is processed in parallel with the main thread (the main routine).

In S5801, the procedure moves to S5802 or S5804 depending on whether the video type in the GUI rendering data 801 is 0 (live video) or 1 (stored video).

In S5802, the video frame of the current time is read out from the video storage server 2, and the read-out video frame is then displayed in S5803.

However, in S5804, the video frame indicated by the reproduction time pointer variable tp is read out from the video storage server 2, and the read-out video frame is then displayed in S5805.

The procedure then branches in S5806 depending on whether the automatic reproduction mode is 1 (automatic reproduction) or 0 (manual reproduction), moving to S5807 if the automatic reproduction mode is 1, and returning to S5801 if the automatic reproduction mode is 0.

In S5807, it is determined, based on the table information in STab (the reproduction target moving object ID) 804 and tp, whether the period to be reproduced as included in the table information has been reproduced to the end; if so, the procedure returns to S5801, and if not, the procedure moves to S5808.

In S5808, the time indicated by tp is advanced a predetermined amount, after which, in S5809, the positions at which the reproduction position pointer is rendered upon the trajectory of the moving object and the time chart in the screen are respectively changed in accordance with the time indicated by tp.

The process is repeated thereafter, whereby video (moving images) is displayed.

The video display thread loops indefinitely thereafter. Starting, stopping, and pausing of the thread are controlled through the main thread. This makes it possible to play, stop, and pause the video.

(Variation 1-1)

In the first embodiment, a plan view is used for the monitored space map 901, showing the monitored space 11 as seen from above, but the embodiment is not intended to be limited thereto. For example, a panoramic image of the monitored space 11, which synthesizes images within the visible range of the monitored space 11, may be used as the monitored space map, and information such as the icons of the moving objects, the trajectories, and the capturing periods may be superimposed and displayed on the monitored space panoramic image.

Hereinafter, descriptions shall be given regarding a variation 1-1 on the first embodiment, with reference to FIG. 15.

Figure 15:
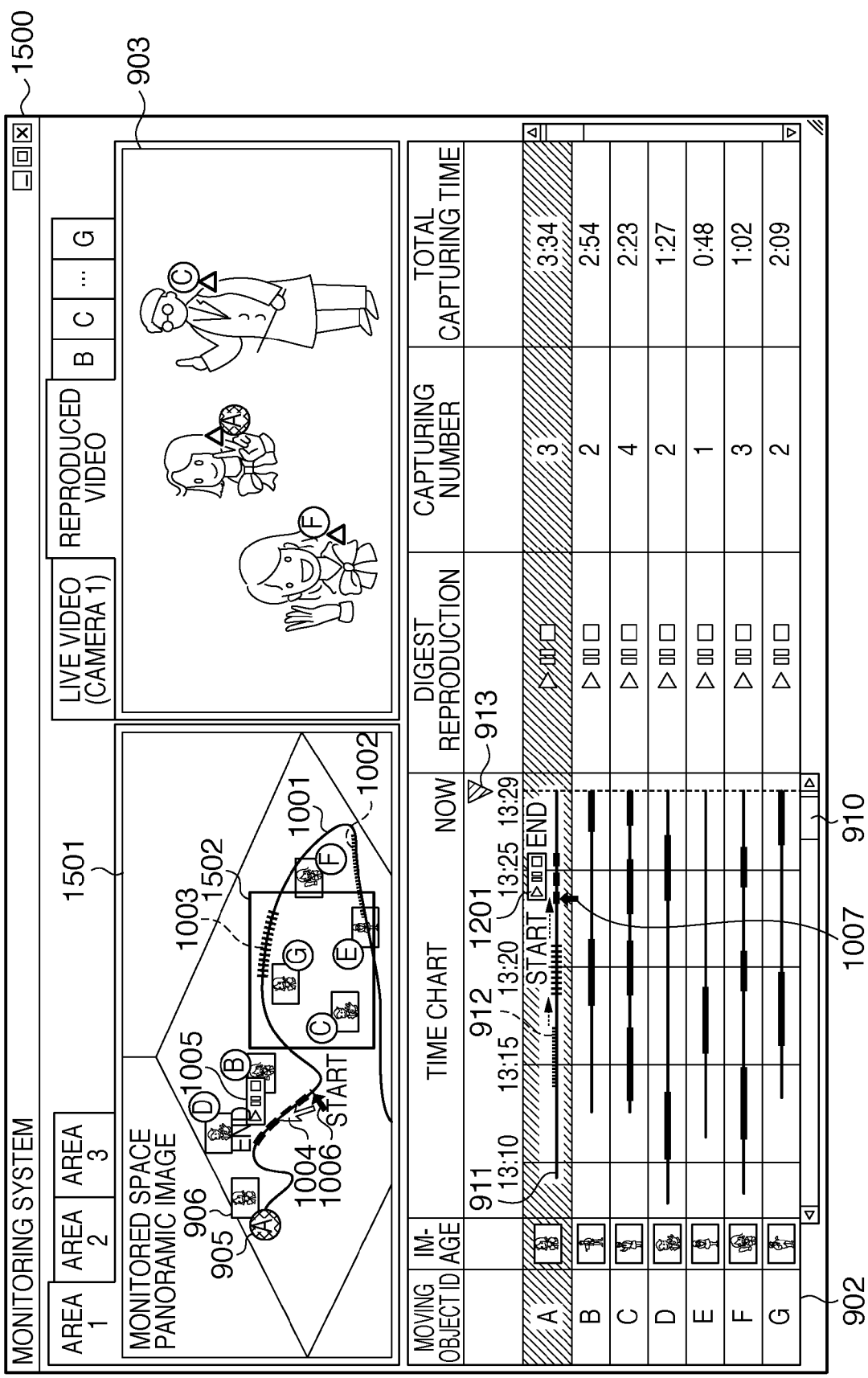
FIG. 15 shows an overview of a monitoring screen when a capturing period line has been selected upon a trajectory in a panoramic image of a monitored space, according to a variation on the first embodiment of the present invention.

FIG. 15 shows an overview of a monitoring screen when a capturing period line has been selected upon a trajectory in the panoramic image of the monitored space 11. In FIG. 15, elements identical to those in FIGS. 10A and 12A are given identical reference numerals, and descriptions thereof shall be omitted herein.

Numeral 1500 indicates a monitoring screen displayed in the display device 247.

Numeral 1501 indicates a map that surveys the entirety (or a portion) of the monitored space 11, as in the first embodiment; however, in the present variation, this map is a panoramic image which synthesizes images within the visible range of the camera device 4 in the monitored space 11.

While the monitored space panoramic image 1501 is similar to the monitored space map 901, a rectangle indicating a captured frame 1502, which the camera device 4 is currently capturing, has been added to the monitored space panoramic image 1501 and is displayed therein.

Other aspects, such as the display of the trajectory 1001 of the selected moving object A, are the same as in the monitored space map 901.

Accordingly, the user can efficiently confirm the capturing period of a moving object with respect to both the path on which the moving object has moved during capturing and the times at which the moving object was captured, similarly to when the monitored space panoramic image 1501 is used instead of the monitored space map 901. The user can also specify an arbitrary capturing period and reproduce the stored video from that period with ease.

Furthermore, a three-dimensional CG map (three-dimensional monitored space map) (not shown) may be used instead of the monitored space map 901. Note, however, that "three-dimensional monitored space map" refers to the following: a three-dimensional image of the monitored space, calculated by applying a perspective projection conversion method or the like to an image in which a three-dimensional form model of the monitored space arranged in a three-dimensional virtual space (an example of this being the shape/size information included in the monitored space information 305 in the video storage server 2) is viewed from a virtual viewpoint.

The icons, trajectories, and capturing histories of moving objects are rendered in appropriate positions on the three-dimensional monitored space map based on the location information, capturing history information, and the like of the moving object acquired from the actual monitored space. The viewing position, direction, and so on are then varied by performing perspective conversion (moving the point of view, rotation, pan, tilt, zoom). The same effects as described above can be attained by specifying a desired capturing period of a specific moving object on the three-dimensional map and reproducing the stored video thereof, while executing the operations described above. In this case, the trajectories of the moving objects and the capturing periods superimposed on those trajectories can be observed while freely altering the direction from which the space is viewed, making it possible to clearly check the paths of movement of the moving objects at the time at which they were captured, from a variety of angles.

Finally, although the thicknesses of the capturing period lines displayed on the trajectories and time charts are constant in the first embodiment, the attributes of the lines, such as the thickness, brightness, and so on, may be altered in accordance with, for example, the distance between the camera and the moving object when the moving object is being captured (in other words, the ratio with respect to the screen). Doing so is advantageous in that times in the capturing periods at which the moving objects are clearly visible can be accurately determined based on the attributes of the line (such as the thickness, brightness, and so on), making it easier to specify the capturing period.

According to the present embodiment as described thus far, the client 3 displays the monitoring screen 900, such as that shown in FIG. 9A, in the display device 247, based on the monitoring data.

Accordingly, the capturing periods of each moving object can be easily confirmed, along with the movement paths (trajectories) during capturing and the capturing time, in a visually accessible manner. Moreover, a desired capturing period can be specified and the stored video thereof can be reproduced with ease.

(Second Embodiment)

The second embodiment differs from the first embodiment in that two camera devices are installed in the monitored space. The monitoring screen is also configured to make it easy to edit video data.

In the field of video editing, the process of extracting necessary portions of a video while omitting unnecessary portions of the video by specifying the IN point (reproduction start point) and the OUT point (reproduction end point) of a video clip is usually called "trimming". As opposed to this, the process of extracting partial regions of still image data is referred to as "cropping". Accordingly, instances of the term "trimming" in the present embodiment are to be understood as referring to the process of trimming in the context of video editing.

<Monitoring System 10*b*>

Figure 1B:
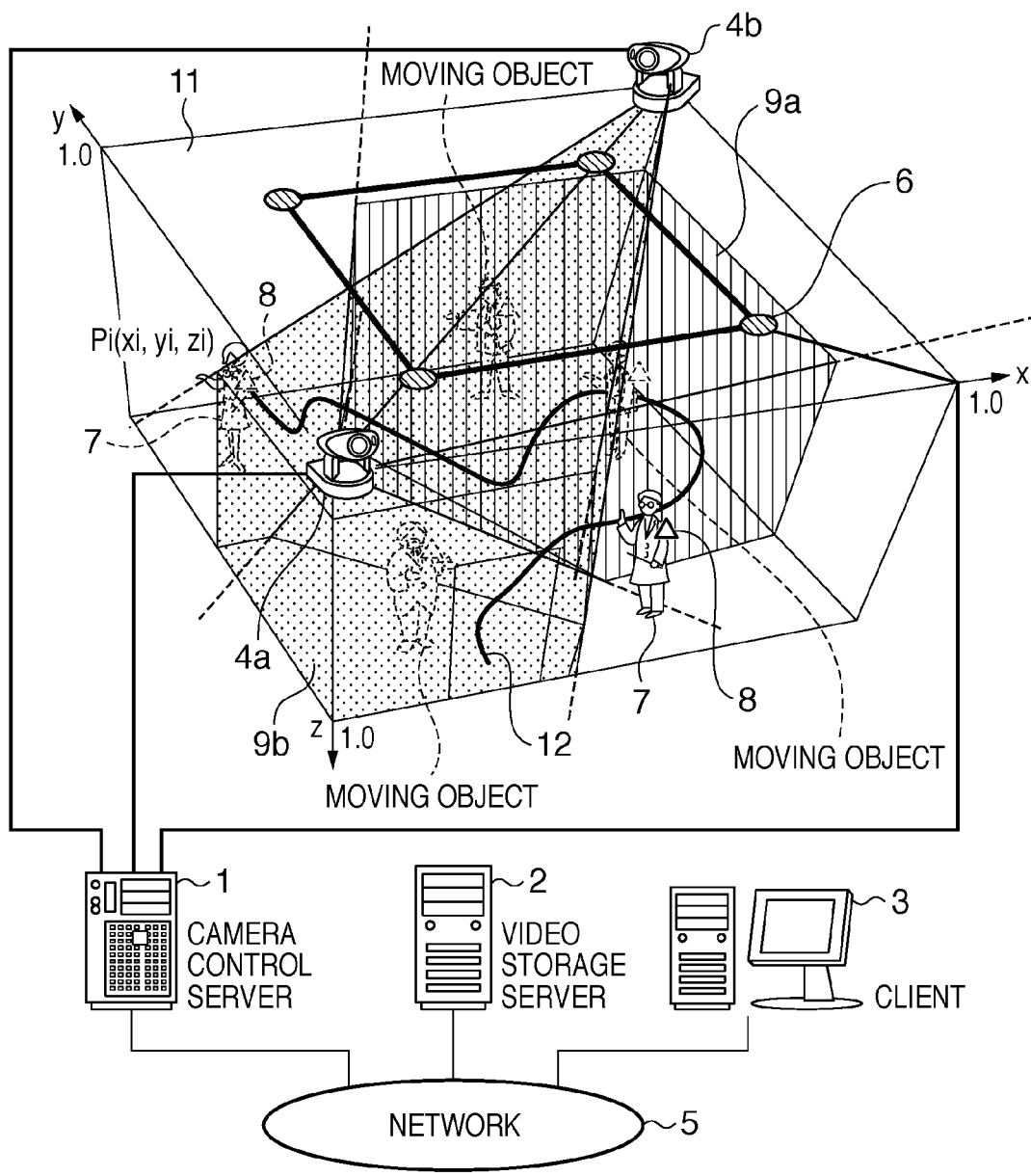
FIG. 1B is a schematic diagram illustrating one type of a monitoring system according to a second embodiment of the present invention.

FIG. 1B is a schematic diagram illustrating one type of a monitoring system 10*b* according to the second embodiment of the present invention. In FIG. 1B, constituent elements identical to those in the first embodiment (see FIG. 1A) are given identical reference numerals, and descriptions thereof shall be omitted herein.

Unlike the system of the first embodiment, the monitoring system 10*b* is provided with a plurality of camera devices (two, or camera devices 4*a* and 4*b*, in the present embodiment). Visual ranges 9*a* and 9*b*, which correspond to the camera devices 4*a* and 4*b* respectively, are thus also present. The configurations of the camera devices 4*a* and 4*b* are identical to that of the camera device 4 shown in FIG. 1A.

Meanwhile, when a capturing period has been selected in the monitoring screen, the client 3 acquires a representative video frame of the video data to be reproduced and displayed (see the first embodiment), generates a reduced still image therefrom, and displays this image in the monitoring screen.

<Camera Control Server 1>

Figure 2B:
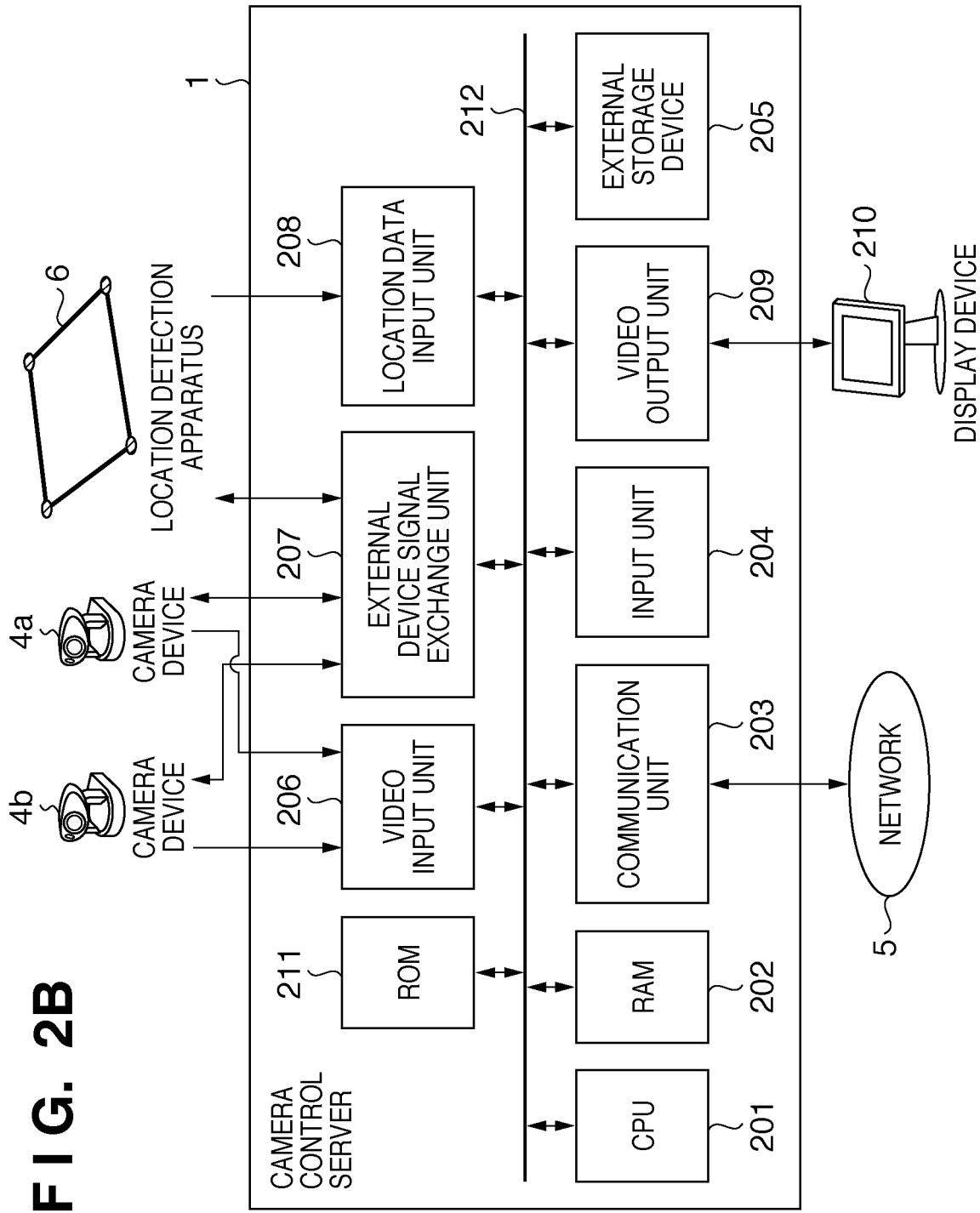
FIG. 2B is a function block diagram illustrating the configuration of a camera control server according to the second embodiment of the present invention.

FIG. 2B is a function block diagram illustrating the configuration of a camera control server 1 according to the second embodiment of the present invention. In FIG. 2B, constituent elements identical to those in the first embodiment (see FIG. 2A) are given identical reference numerals, and descriptions thereof shall be omitted herein. While the configuration of the camera control server 1 itself is identical to that of the first embodiment, the two camera devices 4*a* and 4*b* are connected to the video input unit 206 and the external device signal exchange unit 207, unlike the first embodiment.

<Video Storage Server 2>

The configuration of the video storage server 2 is identical to that of the first embodiment (see FIG. 2D). However, because there are two camera devices, 4*a* and 4*b*, in the second embodiment, the capturing period determination unit 228 finds the capturing periods for the video data captured by both the camera devices 4*a* and 4*b*.

<Client 3>

The configuration of the client 3 is also the same as that of the first embodiment (see FIG. 2E). However, in the second embodiment, the GUI rendered by the GUI rendering unit 250 is a GUI for the monitoring system 10*b* (see FIG. 1B).

<Processing of Camera Control Server 1>

The processing performed by the camera control server 1 is also identical to that of the first embodiment (see FIGS. 16 and 7). However, because there are two camera devices, 4*a* and 4*b*, this processing is changed so that, for example, the video data is processed for each of the camera devices 4*a* and 4*b*.

<Information Stored by Video Storage Server 2>

The information stored in the external storage device 225 by the video storage server 2 in the second embodiment is identical to that in the first embodiment (see FIG. 3A). However, because two camera devices, 4*a* and 4*b*, are used in the second embodiment, the stored video information 301, existence flag ef(i,cid,ts), and so on described in the first embodiment are recorded for each of the camera devices 4*a* and 4*b*.

<Processing Performed by Video Storage Server 2>

Figure 18B:
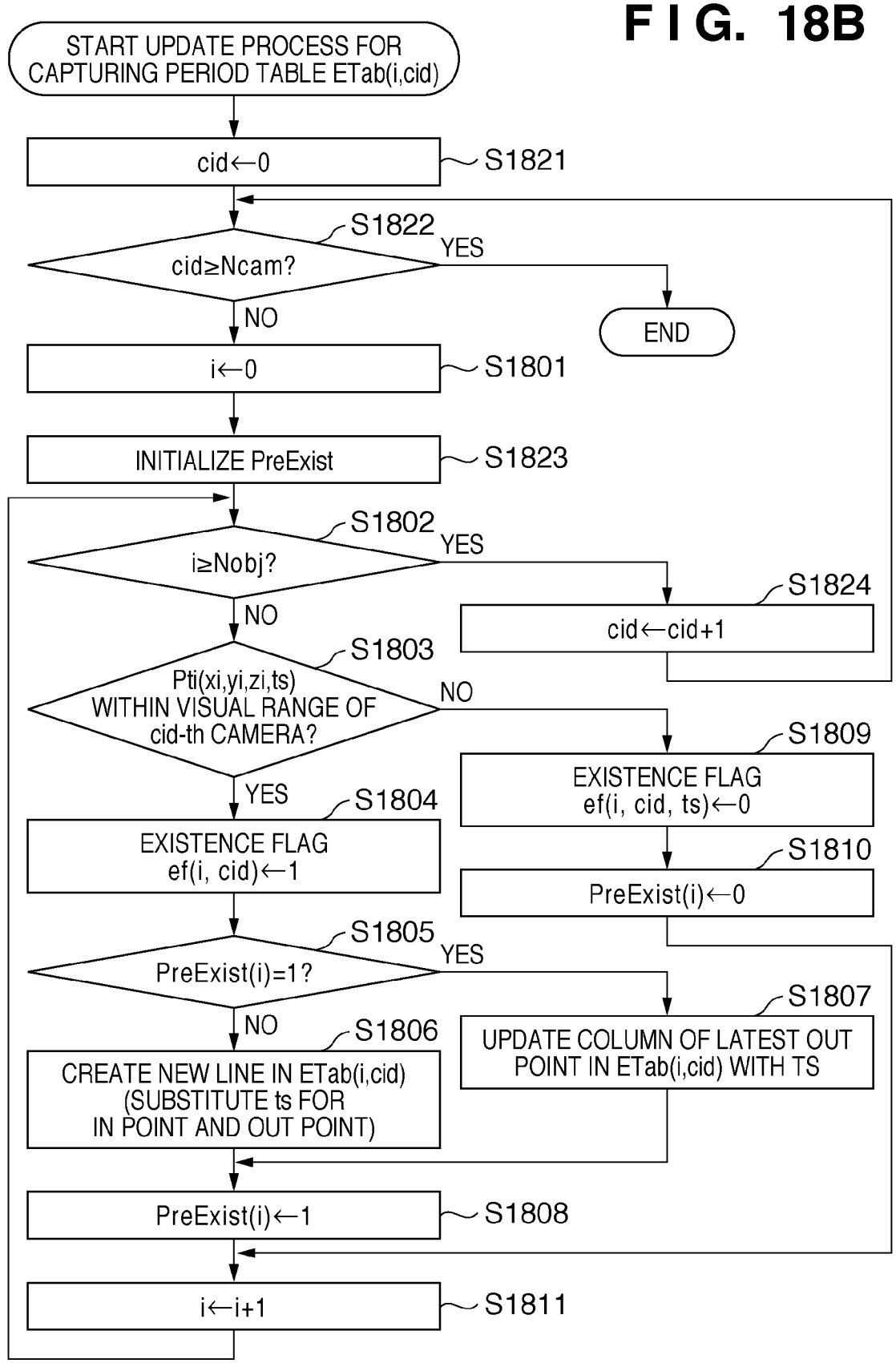
FIG. 18B is a flowchart illustrating the details of the flow of processing for updating a capturing period table, according to the second and third embodiments of the present invention.

The processing performed by the video storage server 2 is identical to that of the first embodiment (see FIG. 17). However, because two camera devices, 4a and 4b, are used in the second embodiment, the configuration of the capturing period table ETab(i,cid) differs from that of the first embodiment, and is structured, for example, as shown in FIG. 19B. The process executed by the capturing period determination unit 228 for updating the capturing period table ETab(i,cid) is also different. This shall be described hereinafter with reference to FIG. 18B. In FIG. 18B, steps that execute the same processes as in the first embodiment shall be given identical reference numerals, and descriptions thereof shall be omitted.

In S1821, the capturing period determination unit 228 substitutes "0" for the variable cid.

In S1822, the capturing period determination unit 228 determines whether or not the variable cid is greater than or equal to Ncam (where Ncam is the number of camera devices). The process ends if the result of the determination is "true". However, the process moves to S1801 if the result of the determination is "false". In other words, in the present embodiment, a process identical to the process described in the first embodiment with reference to FIG. 18A is repeated the same number of times as there are camera devices.

In S1823, the capturing period determination unit 228 initializes PreExist, or in other words, substitutes 0 for PreExist (i) (where i=0, ... , Nobj−1).

In S1824, the capturing period determination unit 228 increments the value of cid by 1, and the procedure then returns to S1822. In other words, although in the first embodiment, the process ended when the determination results of S1802 were true, in the second embodiment, the process is repeated for all camera devices.

<Monitoring Screen>

A monitoring screen for the monitored space 11, displayed in the display device 247 of the client 3, shall be described hereinafter with reference to FIGS. 9B to 12B.

In the following description, it is assumed that the camera devices 4a and 4b continue capturing video (that is, the camera control server 1 continuously acquires monitoring data and transmits it to the client 3 via the video storage server 2) when the user is browsing the monitoring screen (when monitoring is being carried out). However, according to the present embodiment, the configuration of the monitoring screen and its rendering technique can be employed by the user to confirm monitoring data already stored in the video storage server 2, even after the camera devices 4a and 4b have stopped capturing video.

Immediately Following Startup

Figure 9B:
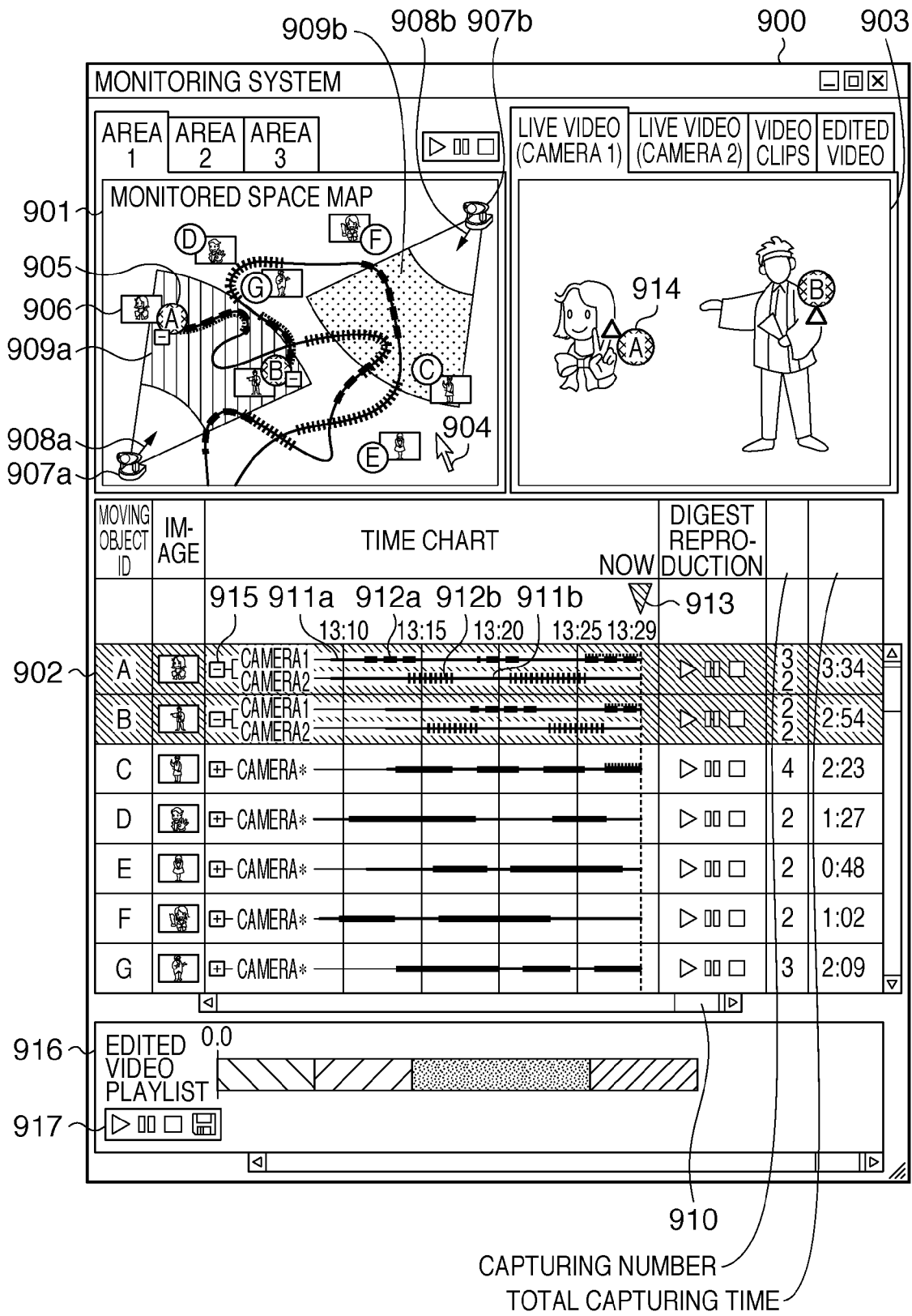
FIG. 9B shows an overview of a monitoring screen displayed in a display device immediately after the client starts an application program for displaying the monitoring screen, according to the second embodiment of the present invention.

FIG. 9B shows an overview of a monitoring screen 900 displayed in the display device 247 immediately after the client 3 starts an application program for displaying the monitoring screen. In FIG. 9B, elements identical to those in the first embodiment (FIG. 9A) are given identical reference numerals, and descriptions thereof shall be omitted herein.

Because two camera devices, 4a and 4b, are used in the second embodiment, two camera icons 907a and 907b, two directions 908a and 908b, and two visual ranges 909a and 909b, which correspond to the respective camera devices, are displayed.

Furthermore, existence lines 911a and 911b and capturing period lines 912a and 912b are also displayed in the time chart 902 for the respective camera devices. However, the lines of the camera device can be merged and displayed by clicking an icon 915 and changing the sign included therein from a "−" to a "+" (see, for example, the line for the moving object C). In other words, as can be seen in FIG. 9B, the capturing periods are displayed in the time chart 902 in a manner that makes it possible not only to distinguish the moving objects from one another on the time axis but also to identify which camera device each capturing period was captured by on the time axis.

In the second embodiment, the capturing period line at the current time 913 is displayed thicker than the other capturing period lines, making it possible to distinguish the former from the latter.

The trajectories on which the selected moving objects (moving objects A and B, in FIG. 9B) have moved is also displayed in the monitored space map 901.

Furthermore, the monitoring screen 900 includes an edited video playlist 916, for editing the video in the capturing period specified in the monitored space map 901, and buttons 917 for playing/stopping/saving the edited video, and so on. In other words, the client 3 according to the second embodiment includes a playlist display unit.

Finally, the video currently being captured by the selected camera is displayed in the reproduction window 903.

When Moving Object Icon is Selected

Figure 10B:
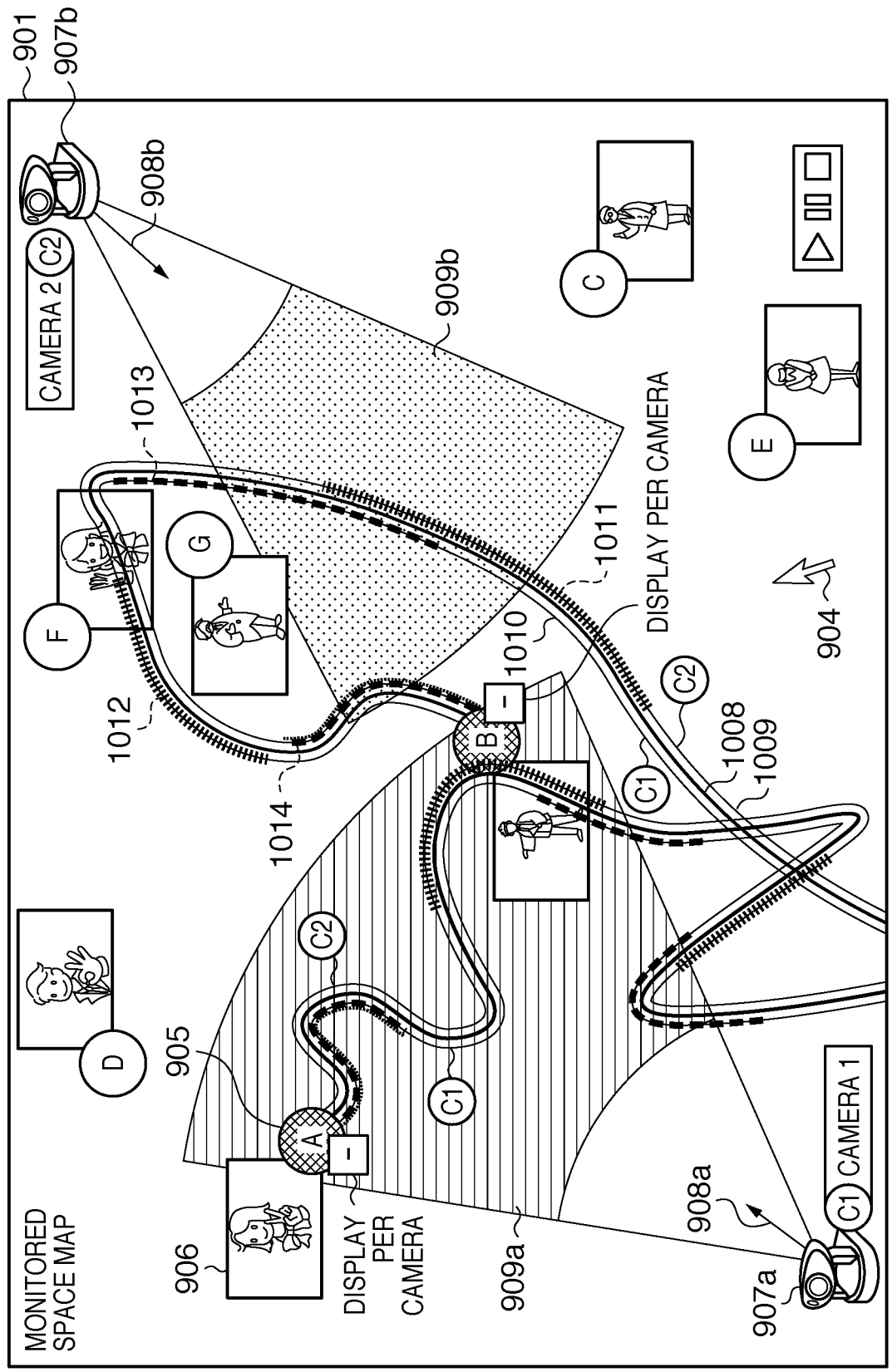
FIG. 10B shows an enlarged overview of a monitored space map in a monitoring screen when a moving object icon has been selected, according to the second embodiment of the present invention.

FIG. 10B shows an enlarged overview of the monitored space map 901 in the monitoring screen 900 when a moving object icon has been selected. In FIG. 10B, elements identical to those in FIGS. 9A and 9B are given identical reference numerals, and descriptions thereof shall be omitted herein.

In FIG. 10B, it is assumed that the two camera icons 907a and 907b are selected at the same time. Multiple camera icons can be selected in this manner. Meanwhile, moving object icons A and B are displayed so as to be distinguishable from other moving object icons when the icons A and B are selected. Multiple moving object icons can therefore also be selected in this manner.

The following descriptions focus on the moving object icon B as an example.

Numeral 1008 is the trajectory of the selected moving object icon B. When the trajectory 1008 is displayed, it gradually grows in length as the position of the selected moving object icon B changes over time, tracing the location of that moving object icon B.

Support lines 1009 and 1010 are displayed on both sides of the trajectory 1008 (along the solid line of the trajectory 1008). The support lines 1009 and 1010 indicate the capturing periods of the moving object B with respect to the camera icon 907a (the camera device 4a) and the camera icon 907b (the camera device 4b) respectively. Capturing period lines 1011 and 1012 indicate the capturing periods in which the camera device 4a captured the moving object B. Meanwhile, capturing period lines 1013 and 1014 indicate the capturing periods in which the camera device 4b captured the moving object B. In other words, when a trajectory is assumed to include the support lines, the trajectory is displayed in a manner in which it is possible to identify which camera device captured each of the capturing periods.

Note that in FIG. 10B, the capturing period display method is "separate" (that is, the "−" mark on the moving object icon), and thus the capturing periods are displayed on separate support lines. However, the capturing period display method is changed to "merged" upon selecting the "−" mark with the mouse pointer 904 and changing it to a "+" mark, and the capturing periods captured by multiple camera devices are merged together and displayed upon a single line (not shown).

In this manner, according to the present embodiment, it is possible to display capturing periods, in which a moving object was captured by multiple camera devices, simultaneously on the trajectory of that moving object.

When Capturing Period is Selected

Figure 11B:
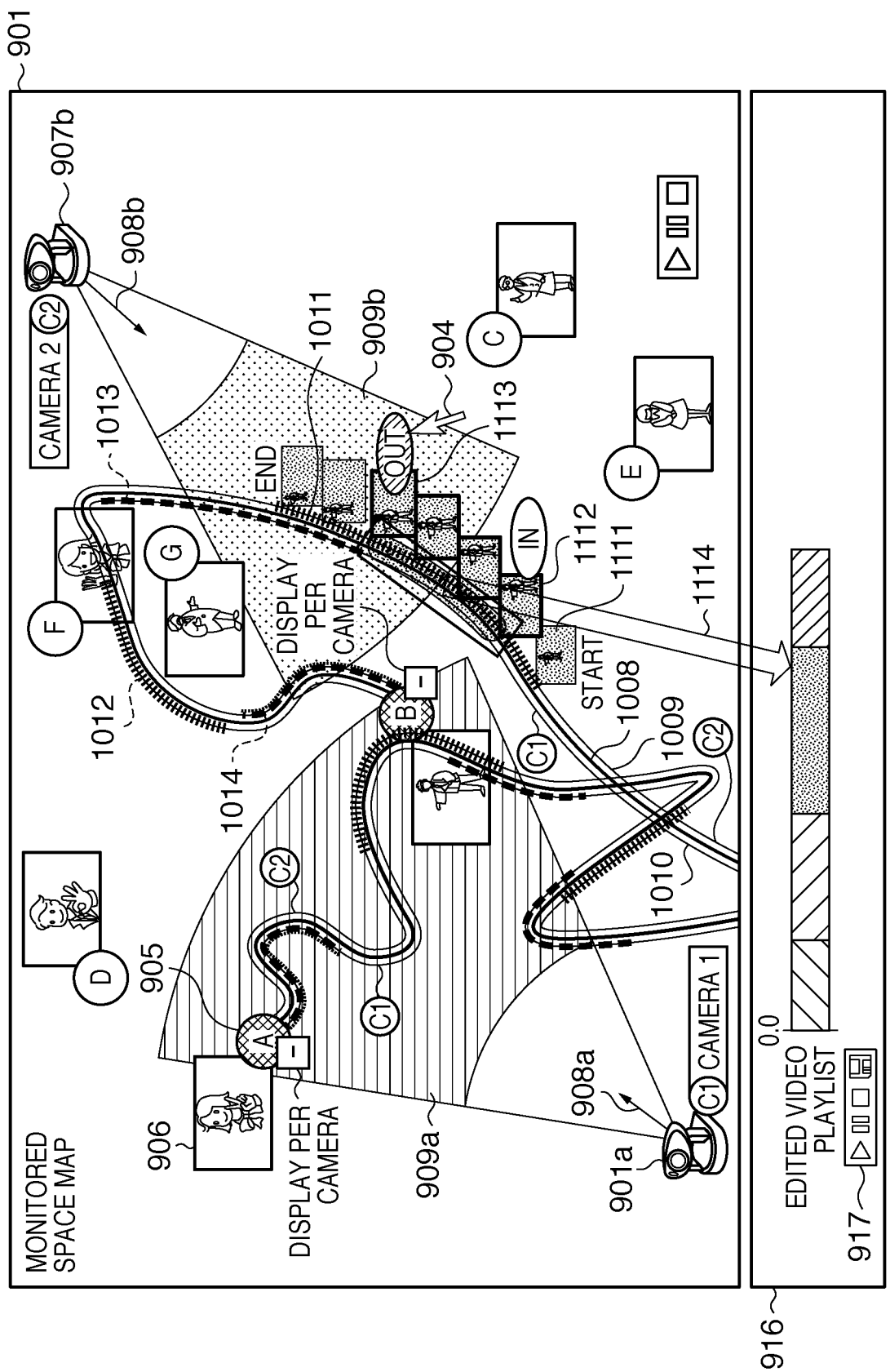
FIG. 11B shows an enlarged overview of a monitored space map and an edited video playlist when a capturing period line has been selected for a selected moving object as captured by a camera device, according to the second embodiment of the present invention.

FIG. 11B shows an enlarged overview of the monitored space map 901 and the edited video playlist 916 when the capturing period line 1011 has been selected for the selected moving object B as captured by the camera device 4*b*. However, it is assumed that, like FIG. 10B, the camera devices 4*a* and 4*b* and the moving objects A and B are in a selected state. In FIG. 11B, elements identical to those in FIG. 10B are given identical reference numerals, and descriptions thereof shall be omitted herein.

Numeral 1111 indicates reduced still images of representative video frames extracted at a predetermined interval from the selected capturing period. Note that each of the reduced still images 1111 are, as shown in FIG. 11B, arranged so as to overlap with the trajectory of the selected capturing period at appropriate locations (in association with the location of the moving object when the representative video frame was captured). In other words, the client 3 includes an image display unit.

Numerals 1112 and 1113 indicate images at the IN point (reproduction start point) and the OUT point (reproduction end point) selected from the reduced still images 1111 by the mouse pointer 904 (in other words, the client 3 includes an image selection unit). The selected reduced still images 1112 and 1113 are, as shown in FIG. 11B, provided with "IN" and "OUT" marks, respectively. However, although the images of the IN point and OUT point specified in a single capturing period are treated as a single set in FIG. 11B, it is also possible to specify a plurality of sets of IN points and OUT points in a single capturing period.

Accordingly, the content of the video in the capturing period line of the selected moving object can be understood in an intuitive manner while also confirming the capture location. In addition, selecting the images at the IN point and the OUT point while viewing the overall content of the video of the selected capturing period makes it easy to carry out trimming.

The partial area specified in this manner (the area specified by the IN point and the OUT point shown with the reduced still images 1112 and 1113) can be dragged and dropped to an arbitrary position within the edited video playlist 916 using the mouse pointer 904, as indicated by an arrow 1114. This makes it possible to edit the video data. Here, if a plurality of partial areas have been inserted at a certain position all at once, the partial areas are arranged within the playlist in order starting with, for example, the earliest capturing start time. At this time, portions of the partial areas that overlap with one another may be deleted or the like and then arranged.

The complete video content can be reproduced in the reproduction window 903, converted into a predetermined video data format and saved in the external storage device 246, or the like, by using the buttons 917.

Figure 12B:
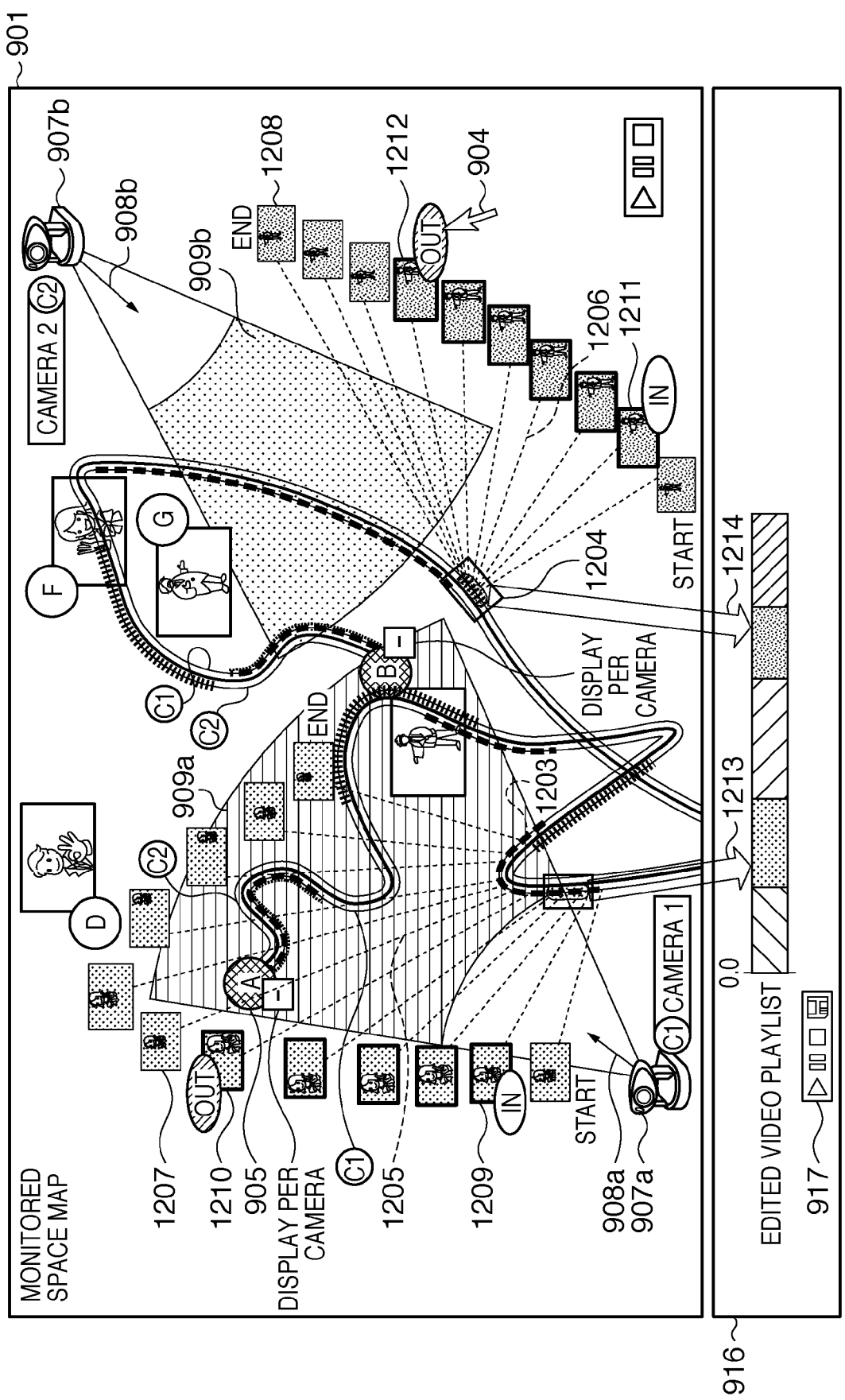
FIG. 12B shows an enlarged overview of a monitored space map and an edited video playlist when the length of a capturing period line selected upon the trajectory of a moving object is short, according to the second embodiment of the present invention.

FIG. 12B shows an enlarged overview of the monitored space map 901 and the edited video playlist 916 when the length of the capturing period line selected upon the trajectory of a moving object is short. Note that it is assumed that, like FIG. 11B, the camera devices 4*a* and 4*b* and the moving objects A and B are in a selected state. In FIG. 12B, elements identical to those in FIG. 10B are given identical reference numerals, and descriptions thereof shall be omitted herein.

Numerals 1203 and 1204 indicate two capturing period lines selected upon the trajectories of the moving objects A and B, respectively.

Numerals 1205 and 1206 indicate multiple outgoing lines drawn radiating from the capturing period lines 1203 and 1204. However, although the endpoints of the outgoing lines fan out to a shape similar to that of the capturing period line, the present invention is not intended to be limited thereto, and the endpoints may be rendered so as to be arranged on a straight line.

Numeral 1207 indicates a group of reduced still images of the representative video frames, extracted at predetermined intervals from the portion of video indicated by the capturing period line 1203 (which corresponds to the camera device 4*a*) arranged on the endpoints of the outgoing lines 1205. Meanwhile, numeral 1208 indicates a group of reduced still images of the representative video frames, extracted at predetermined intervals from the portion of video indicated by the capturing period line 1204 (which corresponds to the camera device 4*b*) arranged on the endpoints of the outgoing lines 1206. In other words, the client 3 includes an outgoing line display unit that displays outgoing lines connecting the reduced still images to the position of the moving object at the time at which the representative video frame corresponding to the reduced still image was captured. The reduced still images are displayed so that they do not overlap with one another.

The reduced still images 1209 and 1210 indicate the IN point (reproduction start point) and the OUT point (reproduction end point), respectively, selected from the reduced still image group 1207 at the endpoints of the outgoing lines 1205. Note that the selected reduced still images 1209 and 1210 are provided with an "IN" mark and an "OUT" mark, respectively. On the other hand, reduced still images 1211 and 1212 indicate the IN point (reproduction start point) and the OUT point (reproduction end point), respectively, selected from the reduced still image group 1208 at the endpoints of the outgoing lines 1206. Furthermore, although the IN point and OUT point specified in a single capturing period line are treated as a single set in FIG. 12B, it is also possible to specify a plurality of sets of IN points and OUT points in a single capturing period line.

The reduced still image are thus displayed in a radial manner using the outgoing lines, and thus the content of the video in the capturing period can be understood in an intuitive manner after confirming the capturing position, even if the capturing period line of the selected moving object is short. In addition, selecting the IN point and the OUT point while viewing the overall content of the video of the selected capturing period makes it easy to carry out trimming. Note that the above-described trimming method, which makes use of outgoing lines, is not intended to be limited to cases where the capturing period line is short, as described above; this method is also useful when a plurality of capturing period lines are clustered together in a narrow area.

The two sets of partial areas specified as above (that is, the partial area defined by the reduced still images 1209 and 1210, and the partial area defined by the reduced still images 1211 and 1212) can be inserted into the edited video playlist 916 by using the mouse pointer 904. To be more specific, the sets of partial areas can be inserted into the edited video playlist 916 in an arbitrary position through dragging/dropping, as indicated by arrows 1213 and 1214 in FIG. 12B. Here, if a plurality of partial areas have been inserted at a predetermined position all at once, the partial areas are arranged in order starting with, for example, the earliest capturing start time. At this time, portions of the partial areas that overlap with one another may be deleted or the like and then arranged.

The video content completed at the end of such an editing process can be reproduced in the reproduction window 903, converted into a predetermined video data format and saved in the external storage device 246, or the like, by using the buttons 917.

<GUI (Monitoring Screen) Rendering Data>

Figure 8B:
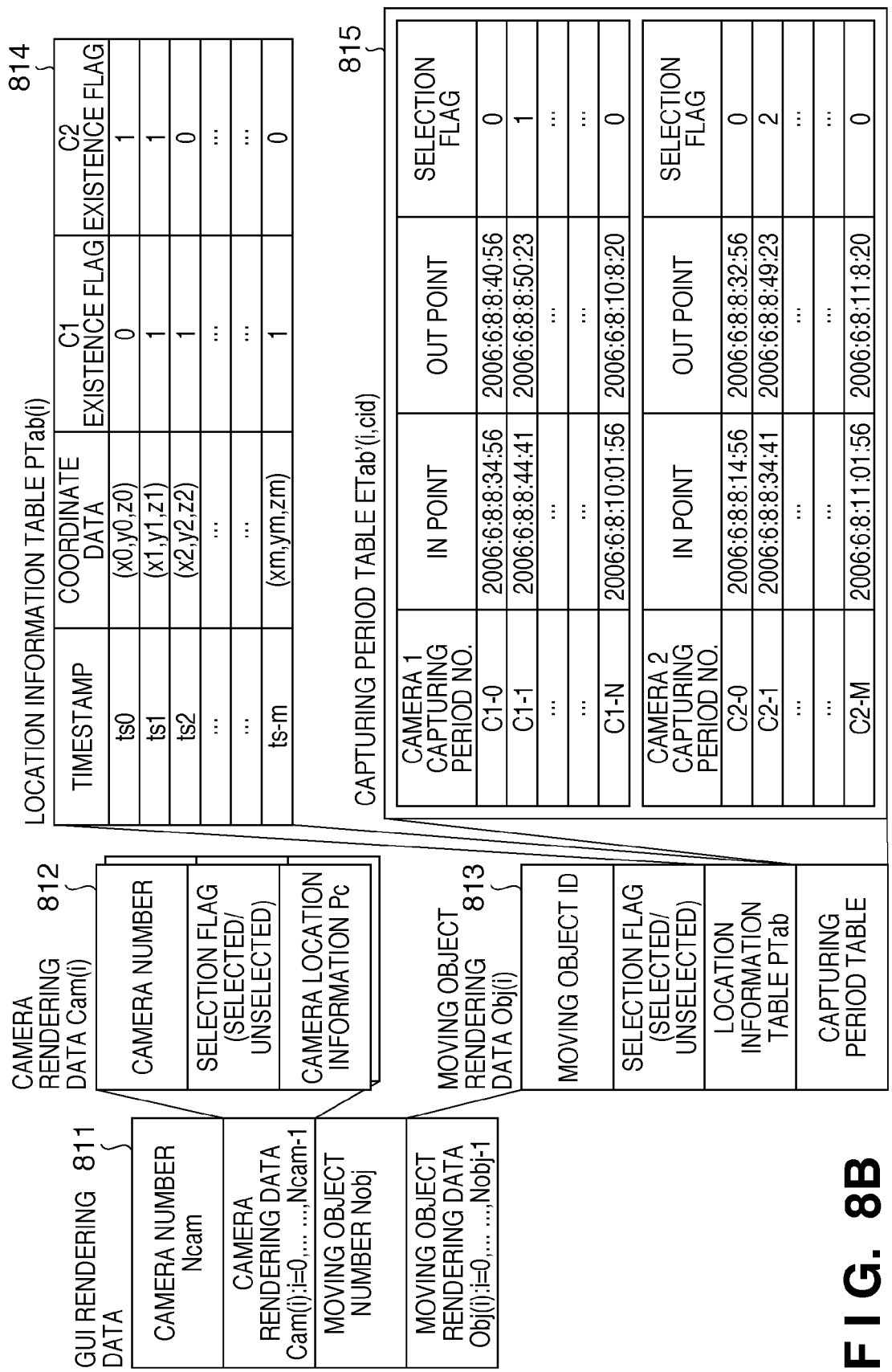
FIG. 8B is a diagram illustrating GUI rendering data used by the client in order to render a monitoring screen, according to the second embodiment of the present invention.

FIG. 8B is a diagram illustrating GUI rendering data used by the client 3 in order to render the monitoring screen. Note that GUI rendering data 811 shown in FIG. 8B is generated by the client 3 receiving monitoring data from the video storage server and processing the received monitoring data using an arbitrary method.

The GUI rendering data 811 includes the camera number Ncam, camera rendering data Cam(i) 812, the moving object number Nobj, and moving object rendering data Obj(i) 813.

The camera rendering data Cam(i) 812 holds rendering data for each camera, and includes a camera number (cid), a selection flag, and camera location information Pc.

The IDs of each of the cameras (1 and 2 in the present embodiment, indicating the camera devices 4a and 4b, respectively) are stored in the camera number.

The selection flag indicates whether or not the camera it belongs to is selected, and is either 0 (not selected) or 1 (selected).

The three-dimensional location coordinates (xc,yc,zc) of each camera in the monitored space 11 are stored in the camera location information Pc.

Each piece of moving object rendering data Obj(i) 813 holds rendering data for each moving object, and thus includes the moving object ID, a selection flag, a location information table PTab(i) 814, and a reproduction period table Etab'(i,cid) 815. Note that ETab'(i,cid) 815 is the same as the ETab(i,cid) table read out from the moving object information 304 in the video storage server 2, but with a column for a selection flag added thereto.

The moving object ID holds an ID (one of 0 to Nobj−1) for each moving object.

The selection flag indicates whether or not the moving object it belongs to is selected, and is either 0 (not selected) or 1 (selected).

The three-dimensional coordinate data Pti(xi,yi,zi,ts) and the existence flags ef(i,cid,ts) for each camera, which include the timestamp ts and have been read out from the video storage server 2, are stored in the location information table PTab(i) 814.

<Video-Related Data>

FIG. 8C is a diagram illustrating video-related data used by the client 3 in order to render a monitoring screen. Note that video-related data 821 indicated in FIG. 8C is generated by the client 3 receiving monitoring data from the video storage server and processing the received monitoring data using an arbitrary method.

The video-related data 821 includes a video channel, the current time tc, a partial area table PL-S, a reproduction position pointer variable tp_S, an edited video table PL-E, and a reproduction position pointer variable tp_E.

The video channel holds information regarding which video source to display. The video channel holding C1 or C2 indicates that live video from the cameras 1 and 2 (camera devices 4a and 4b) is to be displayed. However, the video channel holds S or E in the case where stored video is to be displayed; S and E indicate that the partial area table PL-S and the edited video table PL-E are to be reproduced, respectively.

A partial area table PL-S 822 holds information regarding the order in which one or more selected partial areas are to be reproduced.

The reproduction position pointer tp_S indicates the reproduction position in the PL-S 822.

An edited video table PL-E 823 holds information for the edited video playlist 916 in the monitoring screen 900 of the client 3.

The reproduction position pointer tp_E indicates the reproduction position in the PL-E 823.

<Processing Performed by Client 3>

Figures 1, 6A:
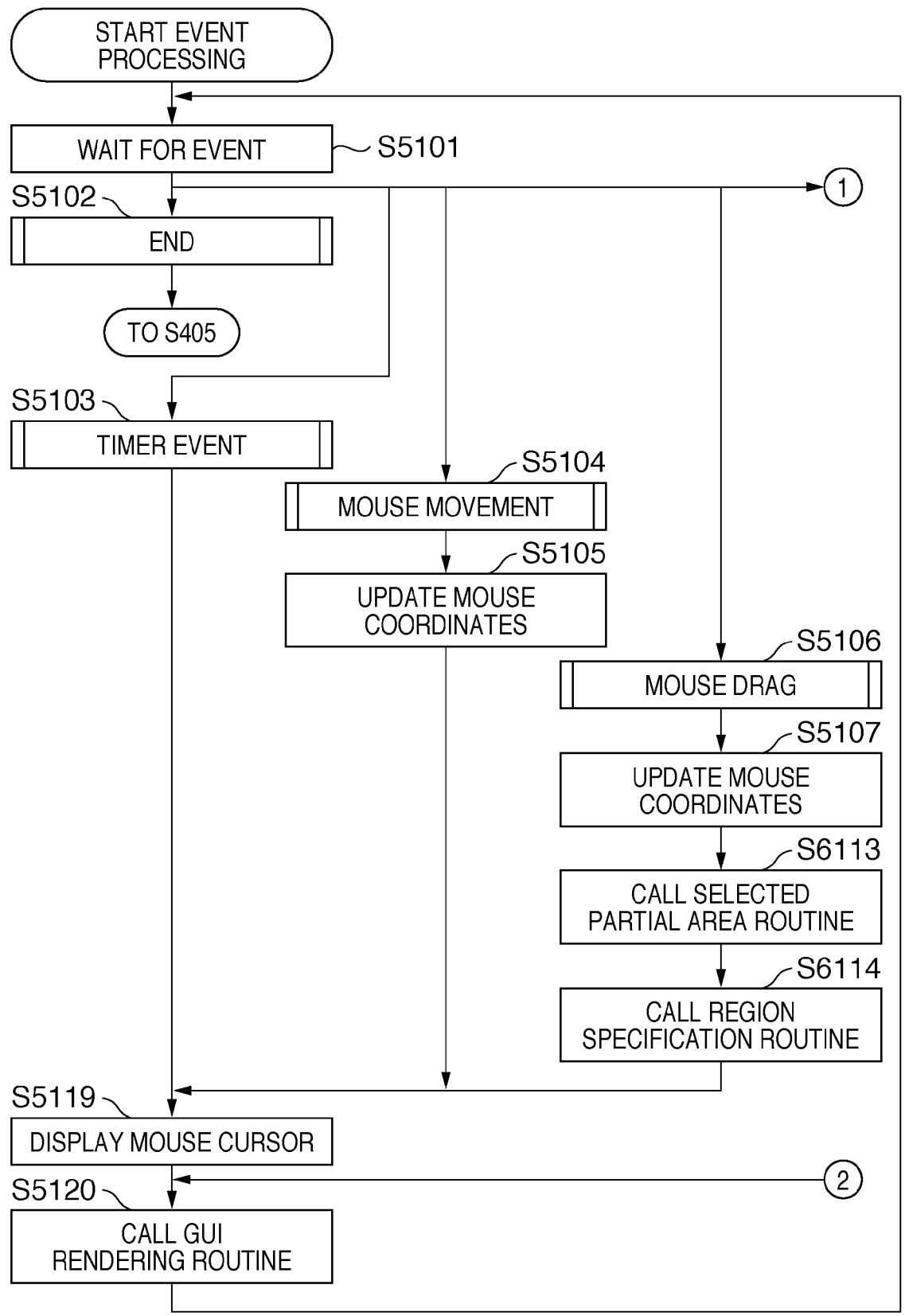
FIGS. 6A-1 and 6A-2 are flowcharts illustrating the flow of event processing in the main routine according to the second embodiment of the present invention.
Figures 2, 6A:
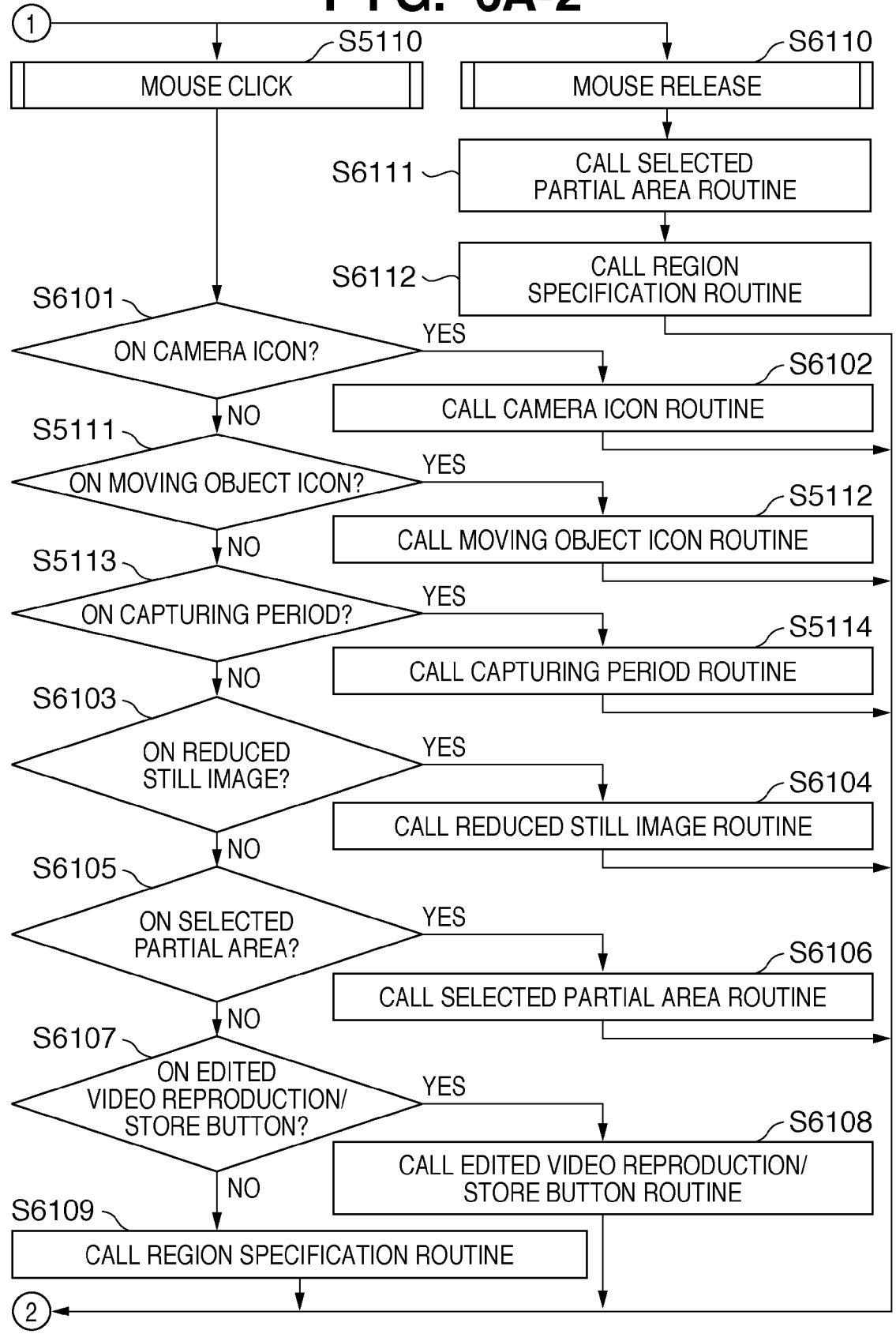

FIGS. 4 and 6A-1 to 6J each illustrate processing performed by the client 3. In FIGS. 6A-1 and 6A-2, steps that execute the same processes as in FIG. 5A shall be given identical reference numerals, and descriptions thereof shall be omitted.

Main Routine

The main routine is identical to that described in the first embodiment, and thus descriptions thereof shall be omitted (see FIG. 4).

Event Processing in Main Routine

FIGS. 6A-1 and 6A-2 are flowcharts illustrating the flow of event processing in the main routine. Each step in FIGS. 6A-1 to 6J can be implemented through operations performed by the CPU 241 and GUI rendering unit 250 of the client 3 in accordance with the application program.

The second embodiment adds a mouse release event to the event types described in the first embodiment. The processes involved in the mouse drag event and mouse click event also differ from those of the first embodiment.

If a mouse drag event has occurred in S5101, the procedure progresses through S5106 and S5107, and moves to S6113. The CPU 241 calls a selected partial area processing routine in S6113 (FIG. 6G), and calls a region specification processing routine in S6114 (FIG. 6I), after which the procedure moves to S5119.

If a mouse click event has occurred in S5101, the procedure moves to S5110. Thereafter, processing for determining which GUI object provided by the GUI (for example, the moving object icon 905 and so on shown in FIG. 9B) has been clicked is executed (S6101, S5111, S5113, S6103, S6105, and S6107).

If a camera icon has been clicked, the CPU 241 calls a camera icon processing routine (FIG. 6C) in S6102.

If a moving object icon has been clicked, the CPU 241 calls a moving object icon processing routine (FIG. 6D) in S5112.

If a capturing period line has been clicked, the CPU 241 calls a capturing period processing routine (FIG. 6E) in S5114.

If a reduced still image has been clicked, the CPU 241 calls a reduced still image processing routine (FIG. 6F) in S6103.

If a selected partial area has been clicked, the CPU 241 calls a selected partial area processing routine (FIG. 6G) in S6106.

If an edited video reproduction/store button has been clicked, the CPU 241 calls an edited video reproduction/store button processing routine (FIG. 6H) in S6108.

If the event is not one of the above, the CPU 241 calls a region specification processing routine (FIG. 6I) in S6109.

If a mouse release event has occurred in S5101, the procedure moves to S6110. The CPU 241 calls the selected partial area processing routine in S6111 (FIG. 6G), and calls the region specification processing routine in S6112 (FIG. 6I), after which the procedure moves to S5119.

Thus, because the video display thread is event-driven, the behavior of the mouse pointer 904 is determined along with what object that event is being affected upon, and processing is executed in accordance with the results of that determination.

GUI Rendering Processing Routine

Figure 6B:
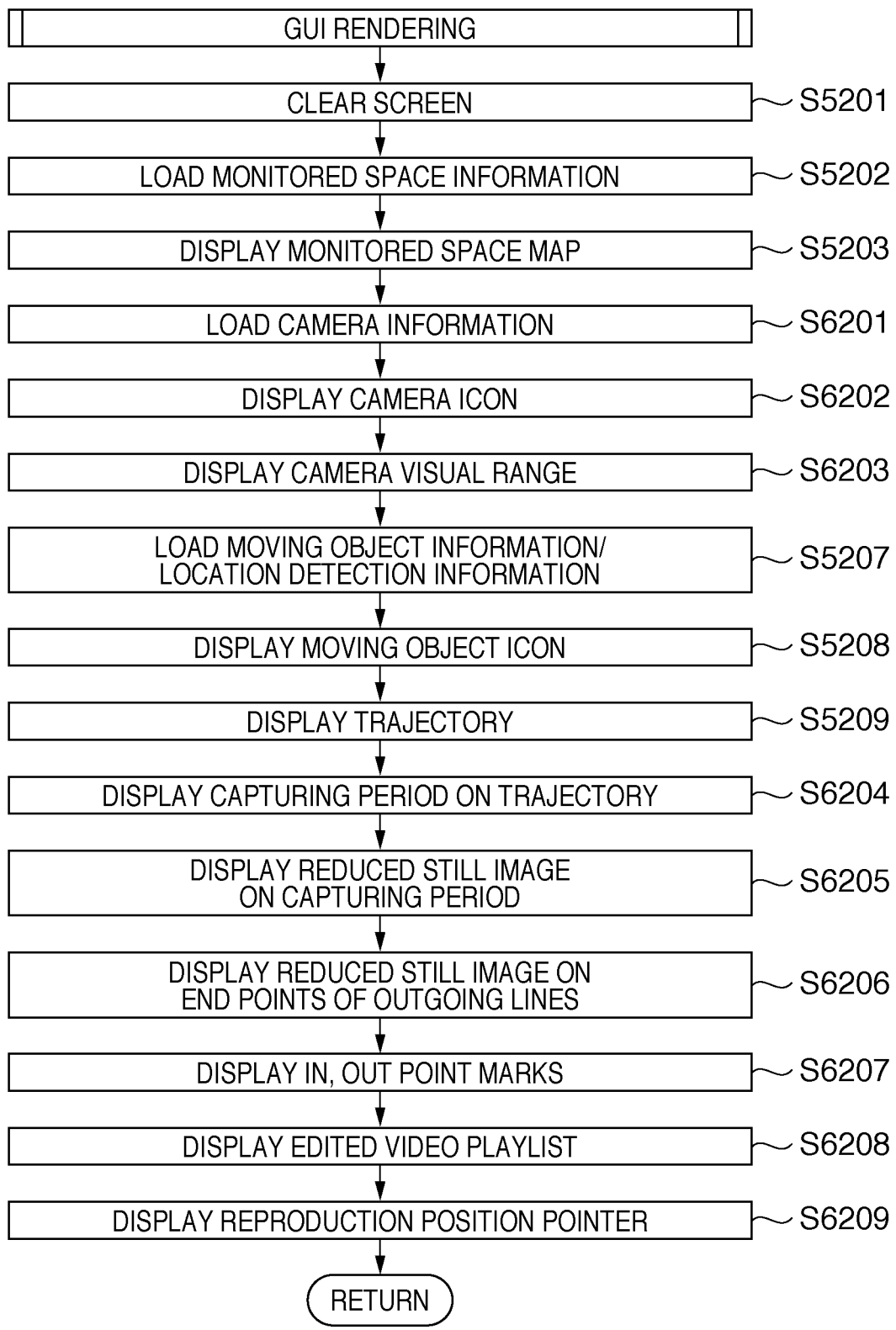
FIG. 6B is a flowchart illustrating the flow of processing in a GUI rendering processing routine according to the second embodiment of the present invention.

FIG. 6B is a flowchart illustrating the flow of processing in the GUI rendering processing routine. In FIG. 6B, steps that execute the same processes as in FIG. 5B shall be given identical reference numerals, and descriptions thereof shall be omitted.

In S6201, the camera information 302 is loaded through communication with the video storage server 2 and stored in an appropriate location within the camera rendering data Cam(i) 812. In S6202, a plurality of camera icons are displayed, and in S6203, the visual ranges of the cameras are displayed.

In S6204, location coordinates of portions in the location information table PTab(i) 814 in which the existence flags of the cameras are is in succession are connected with bold lines. This is performed for moving objects whose selection flag is 1. This makes it possible to display the capturing periods captured by each camera on the trajectory so that the capturing periods can be distinguished. In other words, for example, as shown in FIG. 10B, thin lines for displaying the capturing periods of the camera devices 4a and 4b are provided on both sides of the solid line indicating the trajectory of the selected moving object, and the capturing periods captured by each camera are superimposed on these thin lines, using the PTab (i,cid) 814.

In S6205, if there is a capturing period in which 1 has been substituted for the selection flag in the capturing period table ETab'(i,cid) 815, reduced still images of representative video frames acquired from the stored video at a predetermined interval are superimposed and displayed on the trajectory of the capturing period line (see FIG. 11B). Of course, this "predetermined interval" can be selected as appropriate from an interval based on the amount of movement of the moving object, a given time interval, an interval in which change points emerge in the video (an arbitrary algorithm can be used), or the like.

In S6206, if there is a capturing period in which 2 has been substituted for the selection flag in the capturing period table ETab'(i,cid) 815, representative video frames acquired from the stored video at a predetermined interval are selected. After this, outgoing lines, of a number equal to the number of representative video frames, are rendered radiating from the capturing period. Then, reduced still images of the representative video frames are arranged and displayed on the end points of the outgoing lines (see FIG. 12B).

A case can be considered in which the IN point (reproduction start point) or the OUT point (reproduction end point) has been specified in the reduced still images arranged on the capturing period line in S6207. In such a case, that image is provided with an IN point mark or an OUT point mark (see FIG. In S6208, the edited video playlist is displayed in a GUI window (see FIG. 9B), based on the edited video table PL-E in the video-related data 821.

In S6209, the reproduction position pointer is displayed.

Camera Icon Processing Routine

Figure 6C:
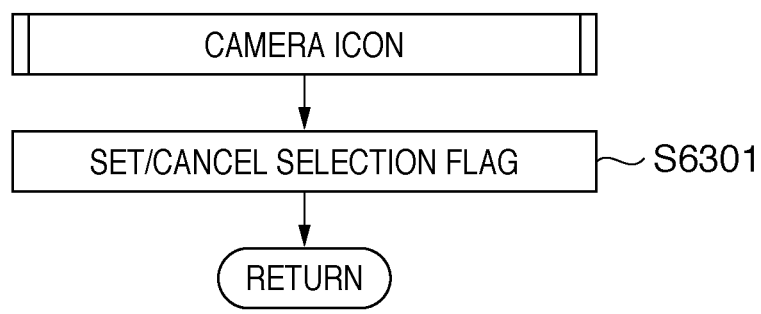
FIG. 6C is a flowchart illustrating the flow of processing in a camera icon processing routine according to the second embodiment of the present invention.

FIG. 6C is a flowchart illustrating the flow of processing in the camera icon processing routine.

In S6301, the selection flag in the camera rendering data Cam(i) 812 is set to 1 (indicating that the camera it belongs to is selected) (or, if already selected, the flag is set to 0).

Moving Object Icon Processing Routine

Figure 6D:
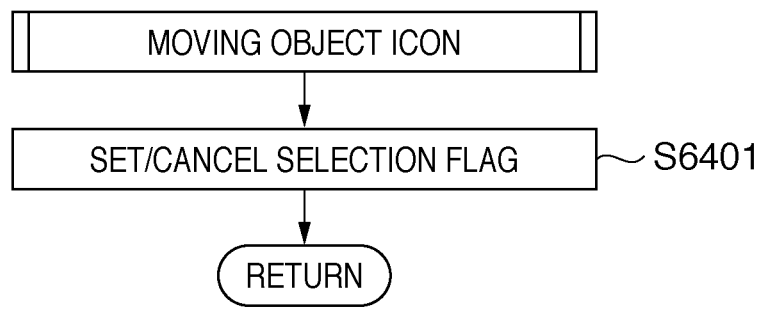
FIG. 6D is a flowchart illustrating the flow of processing in a moving object icon processing routine according to the second embodiment of the present invention.

FIG. 6D is a flowchart illustrating the flow of processing in the moving object icon processing routine.

In S6401, the selection flag in the moving object rendering data Obj(i) 813 is set to 1 (indicating that the moving object it belongs to is selected) (or, if already selected, the flag is set to 0).

Capturing Period Processing Routine

FIG. 6E is a flowchart illustrating the flow of processing in the capturing period processing routine.

In S6501, the shape/size of the trajectory in the capturing period portion is analyzed, and it is determined whether the trajectory is long or short (or whether trajectories are clustered together in a narrow area).

In the case of the former, 1 (displayed on the capturing period) is substituted for the selection flag of the clicked capturing period in the capturing period table ETab' (i,cid) 815 in S6502. On the other hand, in the case of the latter, 2 (displayed on the end point of the outgoing line) is substituted for the selection flag in S6502.

Reduced Still Image Processing Routine

FIG. 6F is a flowchart illustrating the flow of processing in the reduced still image processing routine.

In S6601, if an IN point has not yet been set, the IN point (reproduction start point) is set at the reduced still image that has been clicked.

In S6602, if an IN point has already been set, the OUT point (reproduction end point) is set at the reduced still image that has been clicked.

A partial area is specified within the capturing period through this IN-OUT point setting.

Note that although the pair of IN-OUT points specified in a single capturing period are treated as a single set in the present embodiment, it is also possible to specify a plurality of reduced still image sets used for the IN-OUT points in a capturing period line, and specify multiple partial areas thereby.

The one or more partial areas specified as described above are set as appropriate in the partial area table 822 of the video-related data 821. Note that the content of the partial area table 822 can be reproduced in a continuous manner in the reproduction window 903 by pressing the play/stop buttons.

Selected Partial Area Processing Routine

Figure 6G:
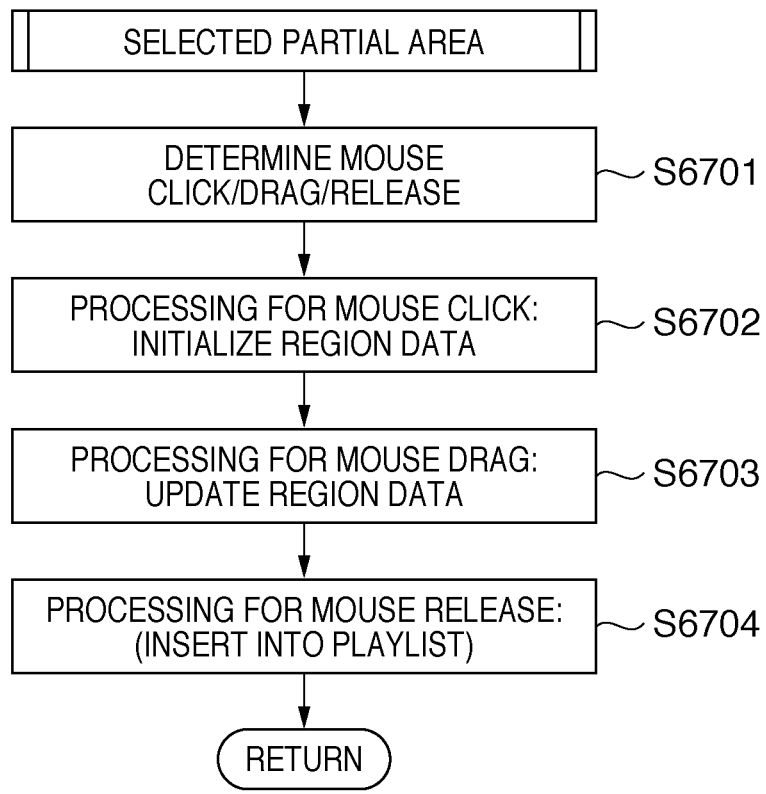
FIG. 6G is a flowchart illustrating the flow of processing in a selected partial area processing routine according to the second embodiment of the present invention.

FIG. 6G is a flowchart illustrating the flow of processing in the selected partial area processing routine.

In S6701, it is determined whether the type of event that has occurred is a mouse click, a mouse drag, or a mouse release.

Processing for a mouse click event is carried out in S6702. In other words, one or more selected partial areas are set as "insertion targets", and region data used in the display at the time of mouse dragging is initialized.

Processing for a mouse drag event is carried out in S6703. In other words, the region data is updated as appropriate based on the position of the mouse after the drag.

Processing for a mouse release event is carried out in S6704. First, if the mouse has been released on the edited video playlist 916, the one or more partial areas are inserted at the position of the release in an appropriate order, after which the "insertion target" setting is canceled. At this time, information of the one or more partial areas is inserted into the appropriate line in the edited video table 823 of the video-related data 821. Meanwhile, if the mouse release has occurred in a location aside from the edited video playlist 916, the "insertion target" setting is canceled without an update being made to the edited video playlist 916.

Edited Video Reproduction/Store Button Processing Routine

Figure 6H:
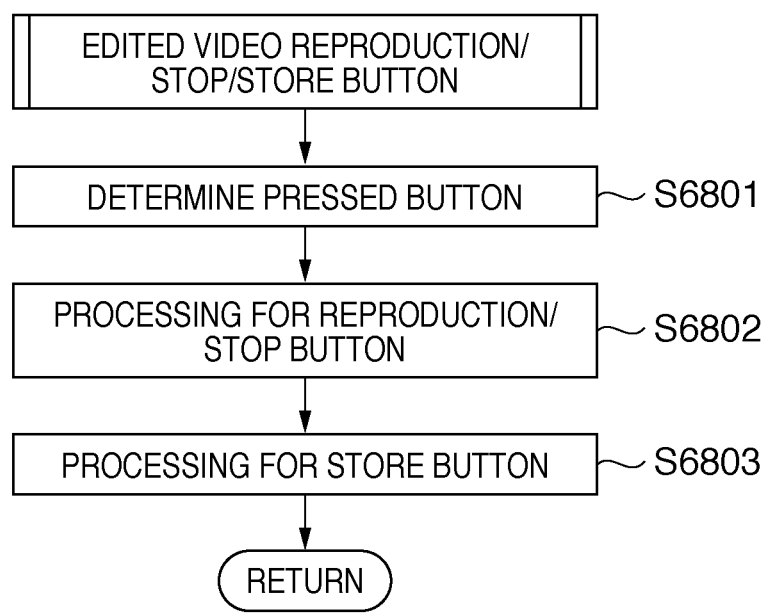
FIG. 6H is a flowchart illustrating the flow of processing in an edited video reproduction/store button processing routine according to the second embodiment of the present invention.

FIG. 6H is a flowchart illustrating the flow of processing in the edited video reproduction/store button processing routine.

In S6801, the button that has been pressed is identified.

In S6802, if the pressed button is identified as the play button, the content indicated by the current edited video playlist 916 is read out from the edited video table 823 and reproduced/displayed in the reproduction window 903 (if, however, the stop button has been pressed, video currently being reproduced is stopped).

In S6803, if the pressed button is identified as the store button, necessary portions are copied from the stored video from each camera, based on the current edited video playlist 916; the copied portions are then merged into video data of a single appropriate video format. The video data file created thus is then stored in an appropriate location within the external storage device 246.

Region Specification Processing Routine

This routine shall be discussed later in variation 2-1.

Video Display Thread

Figure 6I:
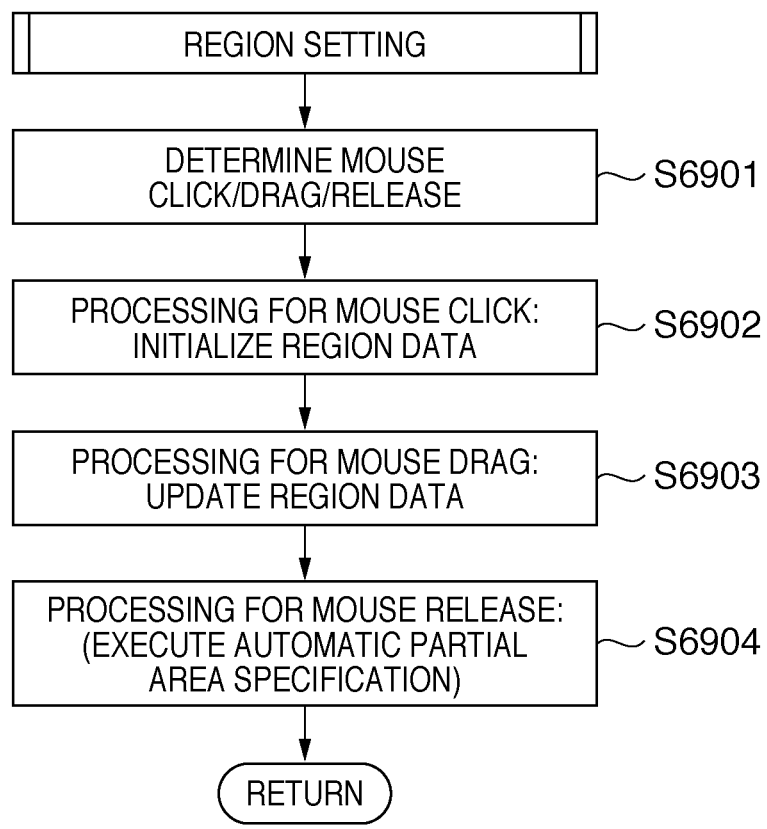
FIG. 6I is a flowchart illustrating the flow of processing in a region specification processing routine according to the second embodiment of the present invention.
Figure 6J:
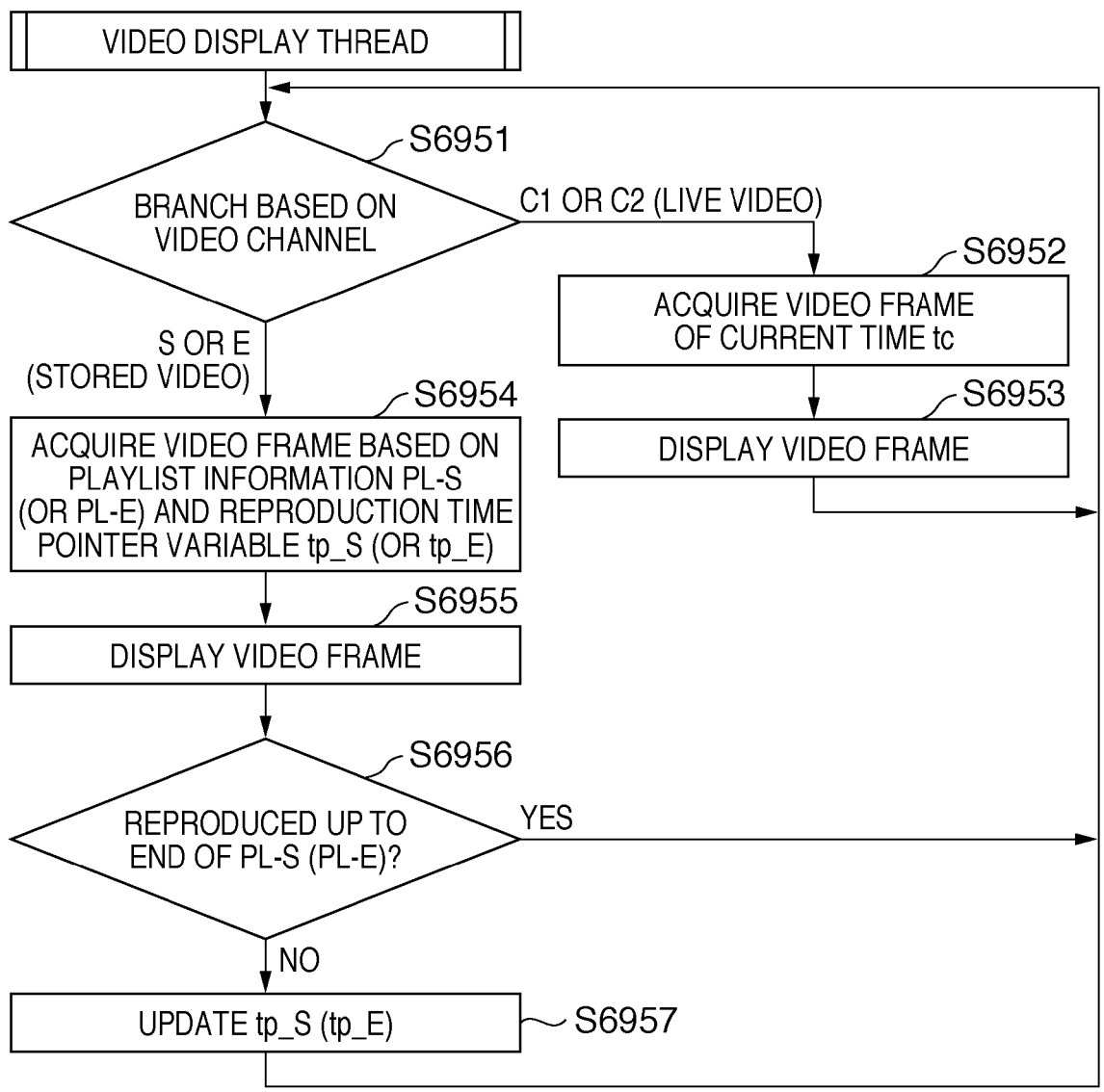
FIG. 6J is a flowchart illustrating the flow of processing in a video display thread according to the second embodiment of the present invention.

FIG. 6J is a flowchart illustrating the flow of processing in the video display thread. The video display thread is processed in parallel with the main thread (the main routine).

The procedure branches in S6951 based on the current video channel in the video-related data 821. In other words, the procedure moves to S6952 if the video channel is live video (i.e., C1 or C2), whereas the procedure moves to S6954 if the video channel is stored video (i.e., S or E).

C1 and C2 indicate live videos captured by the camera devices 4a and 4b, respectively. In this case, in S6952, the video frame of the camera device 4a or the camera device 4b at the current time tc is read out from the video storage server 2. Then, in S6953, the read-out video frame is displayed in the reproduction window 903.

Meanwhile, S and E indicate stored video. In this case, in S6954, the video frame at the position indicated by the reproduction time pointer variable tp_S (or tp_E) in the partial area table PL-S (or edited video table PL-E) is read out from the video storage server 2. Then, in S6955, the read-out video frame is displayed in the reproduction window 903.

It is then determined, in S6956, whether the video has been reproduced up to the end of the partial area table PL-S (or the edited video table PL-E) based on the current tp_S (or tp_E). If the video has been reproduced up to the end, the procedure moves to S6951, whereas if the video has not been reproduced up to the end, the procedure moves to S6957.

Then, in S6957, the time indicated by tp_S (or tp_E) is advanced by a predetermined amount, after which the procedure returns to S6951.

The process is repeated thereafter, whereby video (moving images) is displayed.

The video display thread loops indefinitely thereafter. Starting, stopping, and pausing of the thread are controlled through the main thread. This makes it possible to play, stop, and pause the video.

In the present embodiment, reduced still images of representative video frames selected at a predetermined interval from the stored video of capturing periods of each moving object are arranged upon the trajectories of those capturing period portions. However, it should be noted that the following actions may be taken when wishing to confirm the content of the stored video of the capturing periods in more detail, when carrying out trimming, and so on.

First, two adjacent images are selected separately from among the arranged reduced still images, using the mouse or the like. Then, a plurality of video frames are selected at an even finer interval from the stored video located between the two representative video frames, which correspond to the selected reduced still images; the selected video frames are then arranged in the vicinity of the reduced still images selected previously. Furthermore, IN point and OUT point images may then be selected from both the reduced still images arranged on the capturing period and the reduced still images used for the detailed display, and trimming may then be carried out.

<Variation 2-1>

In the second embodiment, the user specifies the partial area to be extracted from the video data. However, in variation 2-1, the user selects a desired region within the monitored space map 901, and the partial area is automatically specified based on the trajectory located within the selected region. This reduces the effort required by the user to specify the partial area. The standard for determining the partial area to be specified automatically may be any arbitrary standard. For example, all of the capturing period included in the region selected by the user may be taken as the partial area, or alternatively, it is possible to specify only part of the capturing period as the partial area, descriptions of which shall be given hereinafter.

Figure 13B:
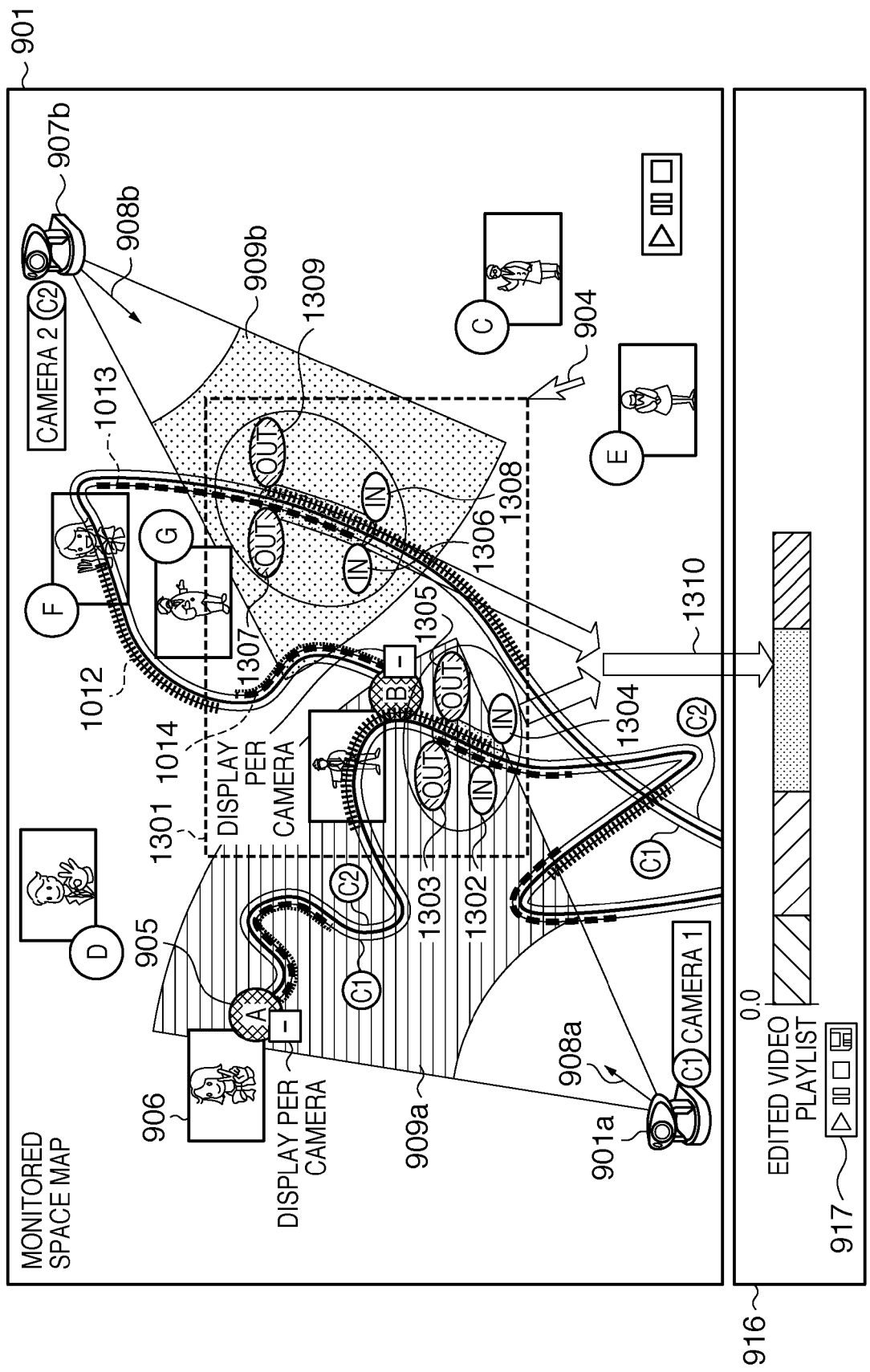
FIG. 13B is an overview of a state in which a user has selected a desired region in the monitored space map illustrated in FIG. 10B.

FIG. 13B is an overview of the monitored space map 901 of FIG. 10B, illustrating a state in which the user has selected a desired region. In FIG. 13B, it is assumed that, like FIG. 10B, the camera devices 4a and 4b and the moving objects A and B are in a selected state.

Numeral 1301 indicates a region of the monitored space map 901 selected by the mouse pointer 904. Note that although the region selected in FIG. 13B is a rectangle, the shape of the selection is not intended to be limited thereto; for example, a circular (ovular) shape, polygonal shape, freehand shape, or other arbitrary shape can be used for the selection.

Numerals 1302 and 1303, and numerals 1304 and 1305, are pairs of IN-OUT points assigned to a capturing period automatically extracted from the capturing period captured by the camera devices 4a and 4b for the moving object A, within the region 1301. Extraction of the capturing period is implemented by, for example, the CPU 241 executing an application program for the monitoring screen 900. In the present embodiment, the CPU 241 specifies capturing periods captured at the same time by the camera devices 4a and 4b.

Similarly, 1306 and 1307, and 1308 and 1309, are pairs of IN-OUT points assigned to a capturing period automatically extracted from the capturing period captured by the camera devices 4a and 4b for the moving object B, within the region 1301.

The result of the above is that, after specifying a moving object and multiple camera devices, trimming of the capturing periods captured simultaneously by all of the specified camera devices within the region specified arbitrarily in the monitored space map 901 can be carried out with ease.

The four sets of partial areas automatically specified in this manner can then be dragged, dropped, and inserted, using the mouse pointer 904, into the edited video playlist 916 at an arbitrary position, as indicated by an arrow 1310. Accordingly, if a plurality of partial areas have been inserted at a certain position all at once, the partial areas are arranged within the playlist in order starting with, for example, the earliest capturing start time. At this time, portions of the partial areas that overlap with one another may be deleted or the like and then arranged.

The video data completed at the end of such an editing process can be reproduced/stopped in the reproduction window 903, converted into an appropriate video data format and saved in the external storage device 246, or the like, by pressing the buttons 917.

In FIG. 13B, trimming of capturing periods within an arbitrary region specified in the monitored space map 901 is carried out automatically after multiple moving objects and multiple camera devices are specified. However, the present embodiment is not intended to be limited to this scheme. For example, a single camera device may be specified, and trimming may be carried out automatically based on the capturing period captured by that camera device.

Figure 14B:
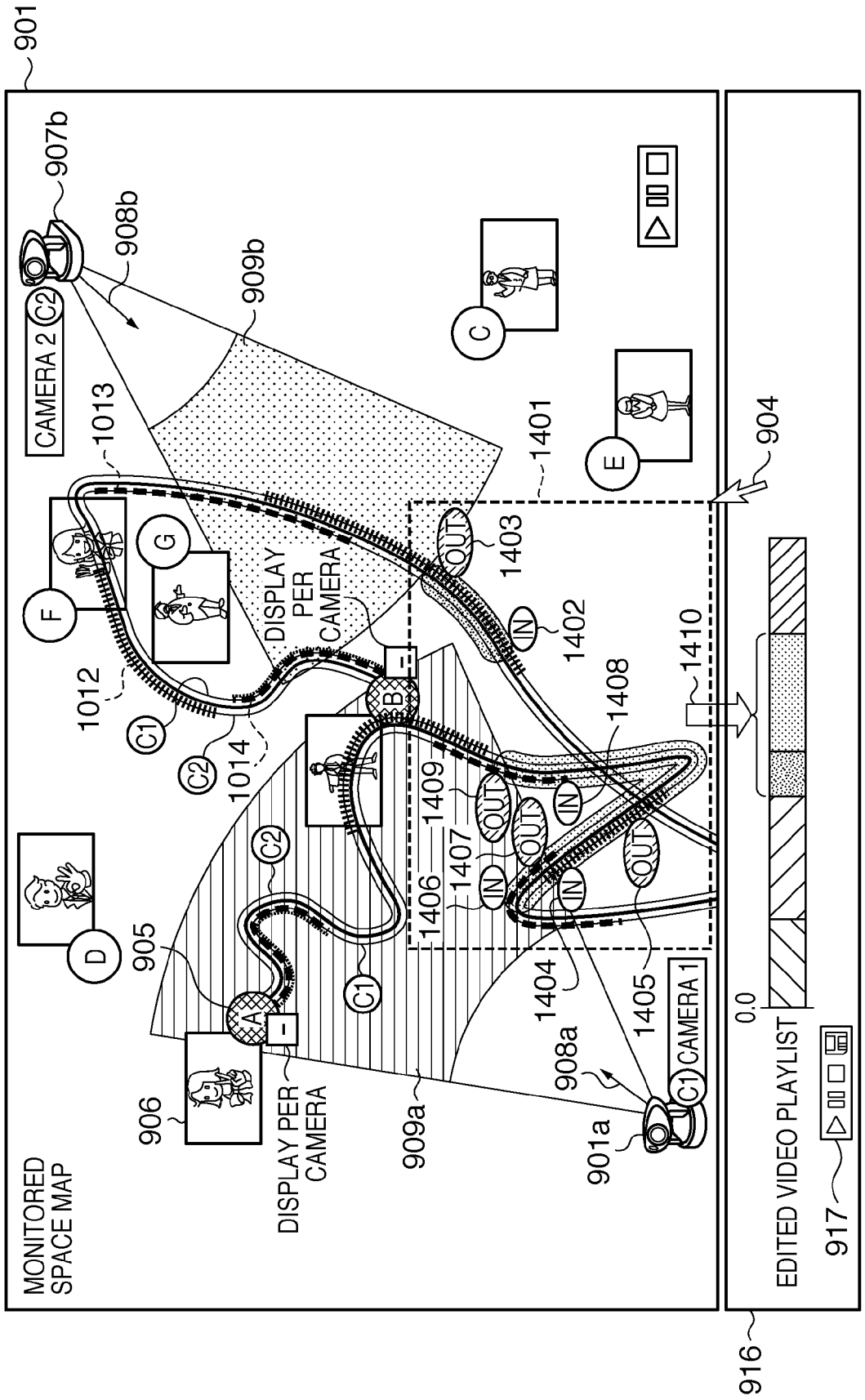
FIG. 14B is a diagram illustrating a situation where a user has selected a desired region within a monitored space map in a state where a predetermined partial area has been specified (either automatically or manually).

In FIG. 13B, the region 1301 is selected in the monitored space map 901 in a state in which the partial areas are not specified. FIG. 14B, however, illustrates a situation where the user has selected a desired region within the monitored space map 901 in a state where a predetermined partial area has been specified (either automatically or manually). In FIG.

14B, it is assumed that, like FIG. 10B, the camera devices 4*a* and 4*b* and the moving objects A and B are in a selected state.

Numerals 1402 and 1403 indicate a partial area (IN-OUT point pair) specified using an arbitrary method (either manually or automatically).

Numeral 1401 indicates a region of the monitored space map 901 specified by the mouse pointer 904. Note that although the region specified in FIG. 14B is a rectangle, the shape of the selection is not intended to be limited thereto; for example, a circular (ovular) shape, polygonal shape, freehand shape, or other arbitrary shape can be used.

Numerals 1404 and 1405, numerals 1406 and 1407, and numerals 1408 and 1409 indicate partial areas automatically specified within the region 1401. These partial areas are capturing periods captured during the same time period as the partial area specified first in the capturing period of the moving objects A or B (indicated by 1402 and 1403). Note that in FIG. 14B, there is no portion captured during the same time period as the area specified first in the capturing period of the moving object B. For this reason, only the capturing period of the moving object A has been automatically trimmed.

The result of the above is that, after specifying a moving object and multiple camera devices, trimming of the capturing periods within the region specified arbitrarily in the monitored space map 901, captured during the same time period as the partial area specified first, can be carried out with ease.

The three sets of partial areas automatically specified in this manner can then be dragged, dropped, and inserted, using the mouse pointer 904, into the edited video playlist 916 at an arbitrary position, as indicated by an arrow 1410. Accordingly, if a plurality of partial areas have been inserted at a certain position all at once, the partial areas are arranged within the playlist in order starting with, for example, the earliest capturing start time. At this time, portions of the partial areas that overlap with one another may be deleted or the like and then arranged.

The video data completed at the end of such an editing process can be reproduced/stopped in the reproduction window 903, converted into an appropriate video data format and saved in the external storage device 246, or the like, by pressing the buttons 917.

The process of specifying the regions 1301 and 1401 as described above with reference to FIGS. 13B and 14B is executed by the region specification processing routine illustrated in FIG. 6I. The region specification processing routine shall be described hereinafter.

In S6901, it is determined whether the type of event that has occurred is a mouse click, a mouse drag, or a mouse release.

Processing for a mouse click event is carried out in S6902. In other words, a first set of coordinates (reference coordinates) is set at the position that has been clicked.

Processing for a mouse drag event is carried out in S6903. In other words, a second set of coordinates, indicating a rectangular region, is set for the location coordinates of the mouse.

Processing for a mouse release event is carried out in S6904. In other words, first, the second set of coordinates is set at the release position, and the rectangular region formed by the first and second sets of coordinates is taken as the region on which automatic trimming is to be performed. After this, different automatic trimming processes (described below) are carried out depending on whether or not one or more partial areas (an area provided with IN-OUT points) have first been specified using an arbitrary method.

When Partial Area(s) have not been Specified

Portions captured in the same time period are automatically extracted from the past capturing periods captured by one or more camera devices that captured the moving objects, from the abovementioned region on which automatic trimming is to be performed. Then, the extracted portions are automatically provided with IN-OUT points, after which trimming is executed (see FIG. 13B). However, the processing performed at this time is not intended to be limited to this method. For example, all the capturing periods captured by a certain single camera device may be automatically extracted, and trimming may be performed automatically on the extracted portions.

When Partial Area(s) have been Specified

All portions captured in the same time period as the partial area first specified are automatically extracted from the past capturing periods captured by one or more camera devices that captured the moving objects, from the abovementioned region on which automatic trimming is to be performed. Then, the extracted portions are automatically provided with IN-OUT points, after which trimming is executed (see FIG. 14B).

The one or more partial areas automatically specified as described above are set as appropriate in the partial area table 822 of the video-related data 821. Note that the content of the partial area table 822 can be reproduced in a continuous manner in the reproduction window 903 by pressing the play button in the buttons 917, making it possible to confirm the content thereof.

<Variation 2-2>

In the second embodiment and variation 2-1, trimming is executed having displayed all the past capturing periods of the moving objects on the trajectories thereof in the monitored space map 901; however, the trimming method is not intended to be limited thereto. For example, one or more arbitrary past time periods (from a start time to an end time) may be specified, after which only the trajectories and capturing periods included in the one or more time periods are displayed in the monitored space map 901, and trimming is carried out only on the displayed capturing periods. Doing so makes it possible to perform trimming on trajectories of moving objects having specified a time period.

According to the present embodiment as described thus far, the client 3 displays the monitoring screen 900, such as that shown in FIG. 9B, in the display device 247, based on the monitoring data.

This makes it possible to edit the video data even more easily.

(Third Embodiment)

<Monitoring System 10*c*>

The third embodiment differs from the first and second embodiments in that an item used for location detection (e.g., an IC tag) is not attached to the moving objects. Accordingly, operations for attaching the IC tag to the moving objects to be monitored need not be executed beforehand, making it possible to utilize the monitoring system in a more flexible manner.

Figure 1C:
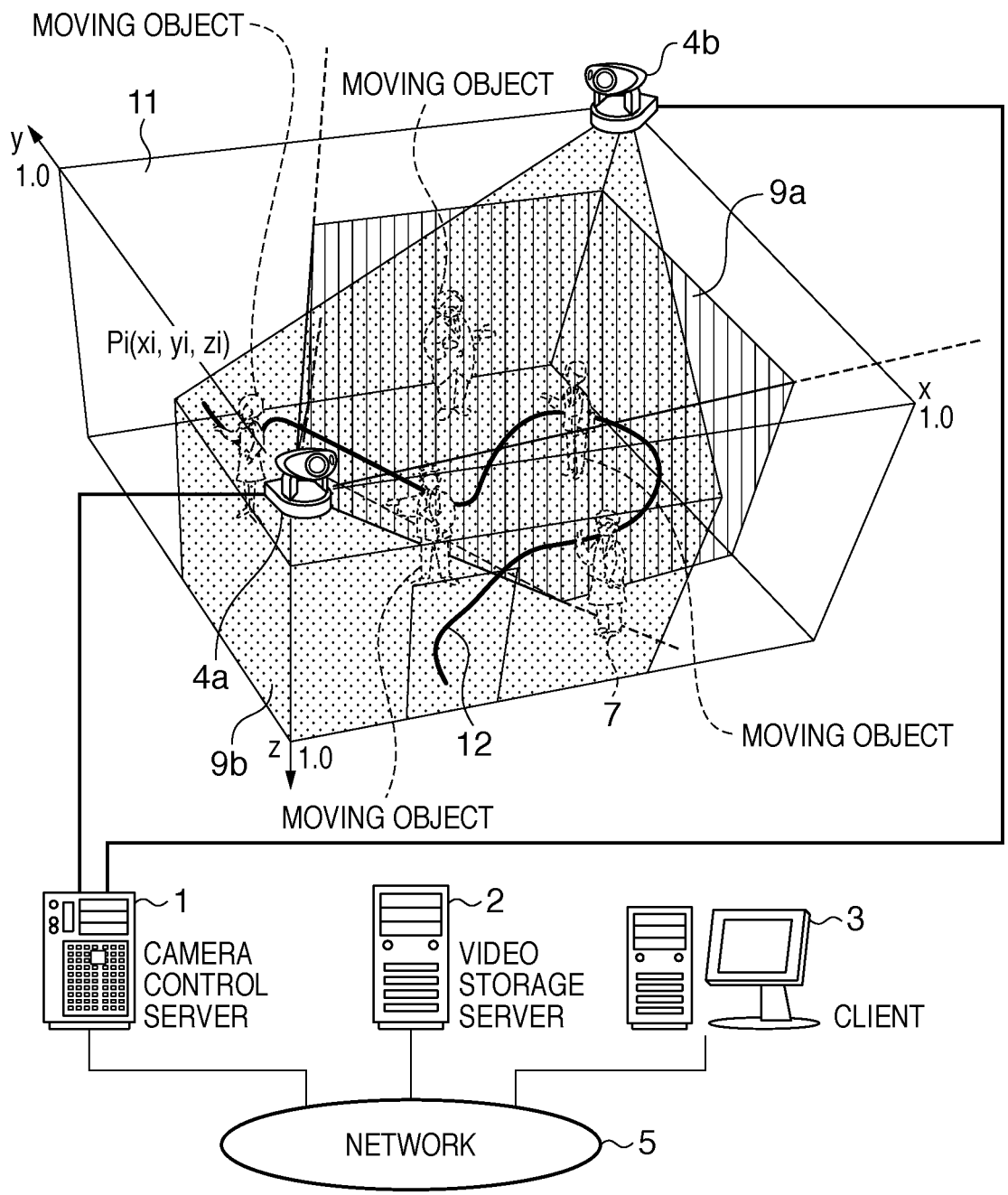
FIG. 1C is a schematic diagram illustrating one type of a monitoring system according to a third embodiment of the present invention.

FIG. 1C is a schematic diagram illustrating one type of a monitoring system 10*c* according to the third embodiment of the present invention. In FIG. 1C, constituent element identical to those described in the first embodiment and the second embodiment (see FIGS. 1A and 1B) shall be given identical reference numerals, and descriptions thereof shall be omitted herein.

The monitoring system 10*c* differs from the first and second embodiments in that it does not include a location detection apparatus 6 or IC tags 8. In the present embodiment, a location data processing unit 213 (see FIG. 2C) included in the camera control server 1 finds the location information of a moving object 7 using a technique such as that disclosed in, for example, Japanese Patent Laid-Open No. 2000-224457.

<Camera Control Server 1>

Figure 2C:
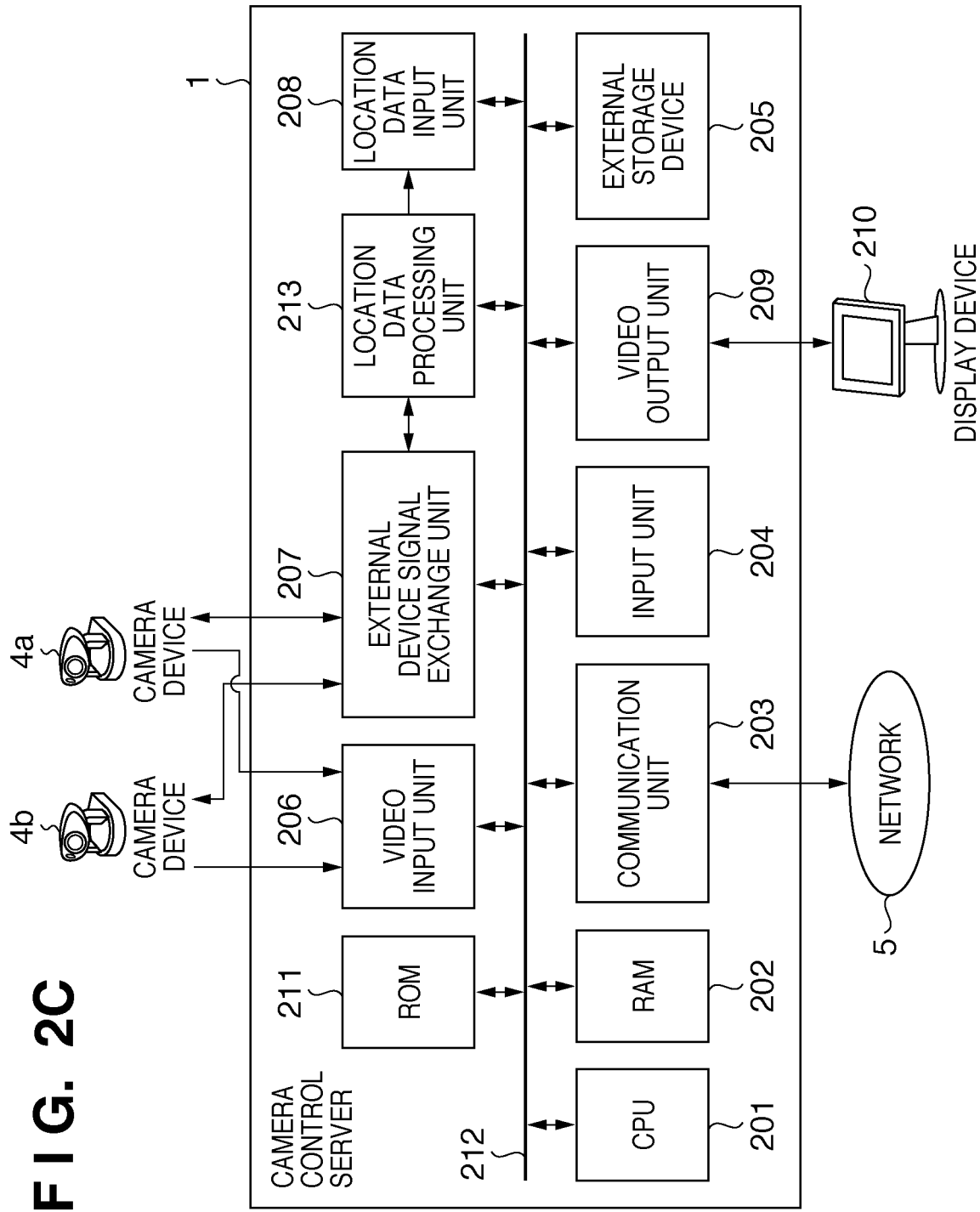
FIG. 2C is a function block diagram illustrating the configuration of a camera control server according to the third embodiment of the present invention.

FIG. 2C is a function block diagram illustrating the configuration of the camera control server 1 according to the third embodiment of the present invention. In FIG. 2C, constituent elements identical to those in the second embodiment (see FIG. 2B) are given identical reference numerals, and descriptions thereof shall be omitted herein.

The camera control server 1 includes the location data processing unit 213, which finds the location information of a moving object 7 recognized by the camera devices 4a and 4b in the monitored space 11. The location data input unit 208 is also input with the location information by the location data processing unit 213, which differs from the second embodiment.

<Video Storage Server 2>

The configuration of the video storage server 2 is identical to that of the first embodiment (see FIG. 2D). However, because there are two camera devices, 4a and 4b, in the third embodiment, the capturing period determination unit 228 finds the capturing periods for the video data captured by both the camera devices 4a and 4b.

<Client 3>

The configuration of the client 3 is also the same as that of the first embodiment (see FIG. 2E). However, in the third embodiment, the GUI rendered by the GUI rendering unit 250 is a GUI for the monitoring system 10c (see FIG. 1C).

<Processing of Camera Control Server 1>

The processing performed by the camera control server 1 is also identical to that of the first embodiment (see FIGS. 16 and 7). However, because there are two camera devices, 4a and 4b, processing is changed so that, for example, the video data is processed for each of the camera devices 4a and 4b.

In the present embodiment, an IC tag is not used for detection of the location information of the moving object 7. Accordingly, the camera devices 4a and 4b are provided with, for example, an AF function, and in S1604, the spatial location coordinates of the moving object 7 are detected using an automatic focal point detection function such as disclosed in, for example, Japanese Patent Laid-Open No. 2000-224457. Alternatively, three or more camera devices may be used, taking the intersecting point of straight lines extending in the capturing direction from the respective pan angles as the spatial location coordinates in the case where these lines intersect at one point, while taking the center of the three intersecting points as the spatial location coordinates in the case where the lines do not intersect at one point.

<Information Stored by Video Storage Server 2>

Figure 3B:
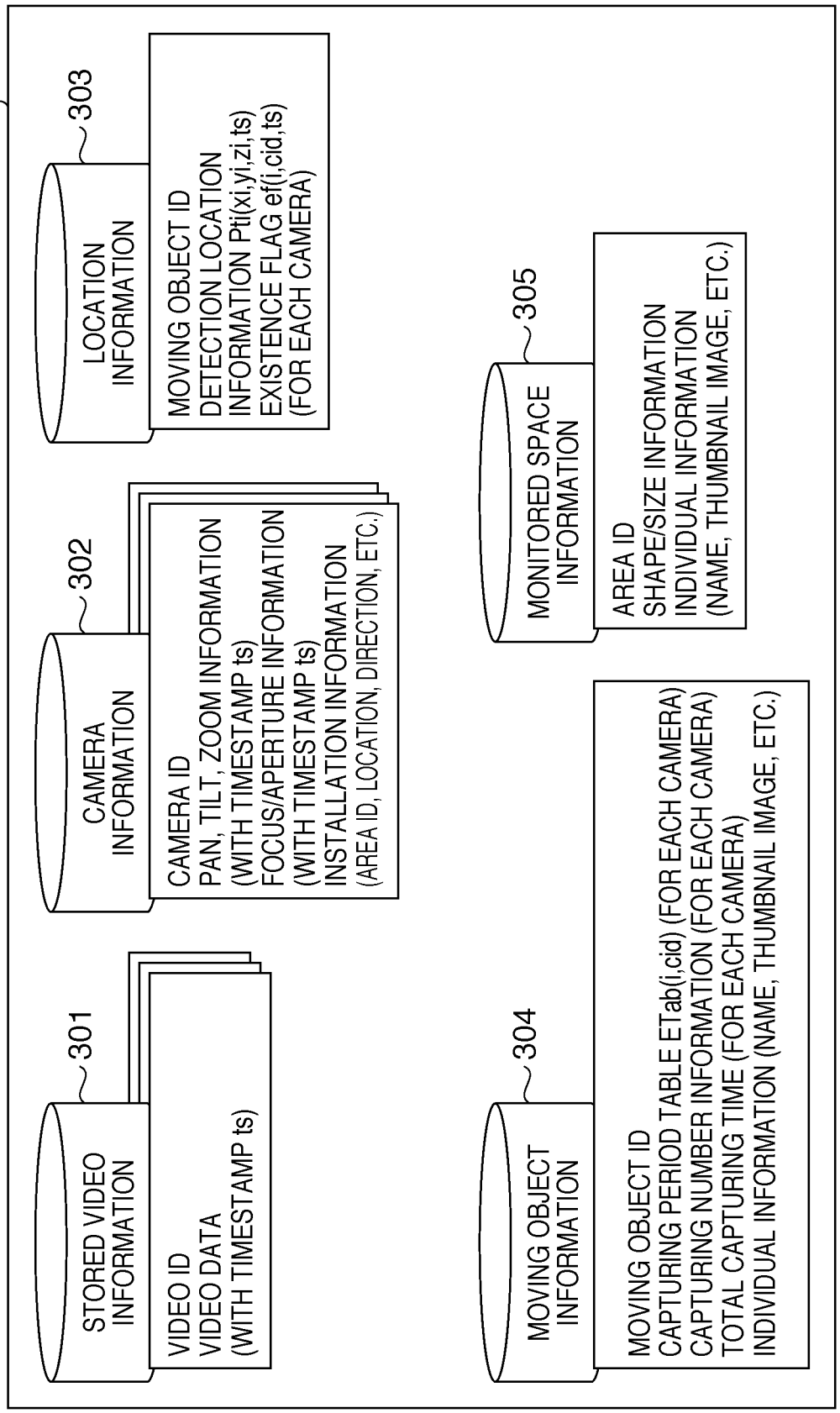
FIG. 3B is a diagram illustrating information stored in an external storage device by the video storage server according to the third embodiment of the present invention.

FIG. 3B is a diagram illustrating information stored in the external storage device 225 by the video storage server 2 according to the third embodiment of the present invention. The information stored in the external storage device 225 by the video storage server 2 in the third embodiment is identical to that of the second embodiment, with the exception of the location information 303.

In the present embodiment, an IC tag is not used for detection of the location information. For this reason, the following information is recorded as the location information 303:

moving object IDs (0 to Nobj−1);
detection location information Pti(xi,yi,zi,ts) (three-dimensional location coordinates for each moving object 7 output by the location data processing unit 213. Time-series information that includes the timestamp ts); and
existence flags ef (i,cid,ts) (for each camera) (flags indicating whether or not the coordinates Pti are within the visual range of the camera device. Time-series information that includes the timestamp ts.)

<Processing Performed by Video Storage Server 2>

The processing performed by the video storage server 2 is identical to that of the first embodiment (see FIG. 17). Furthermore, the configuration of the capturing period table ETab(i,cid) is identical to that in the second embodiment (see FIG. 19B), and the process executed by the capturing period determination unit 228 for updating the capturing period table ETab(i,cid) is also identical to that in the second embodiment (see FIG. 18B).

<Monitoring Screen>

A monitoring screen for the monitored space 11, displayed in the display device 247 of the client 3, shall be described hereinafter with reference to FIGS. 9C to 12C.

In the following descriptions, it is assumed that the camera devices 4a and 4b continue capturing video (that is, the camera control server 1 continuously acquires monitoring data and transmits it to the client 3 via the video storage server 2) when the user is browsing the monitoring screen (when monitoring is being carried out). However, according to the present embodiment, the configuration of the monitoring screen and its rendering technique can be employed by the user to confirm monitoring data already stored in the video storage server 2, even after the camera devices 4a and 4b have stopped capturing video.

Immediately Following Startup

Figure 9C:
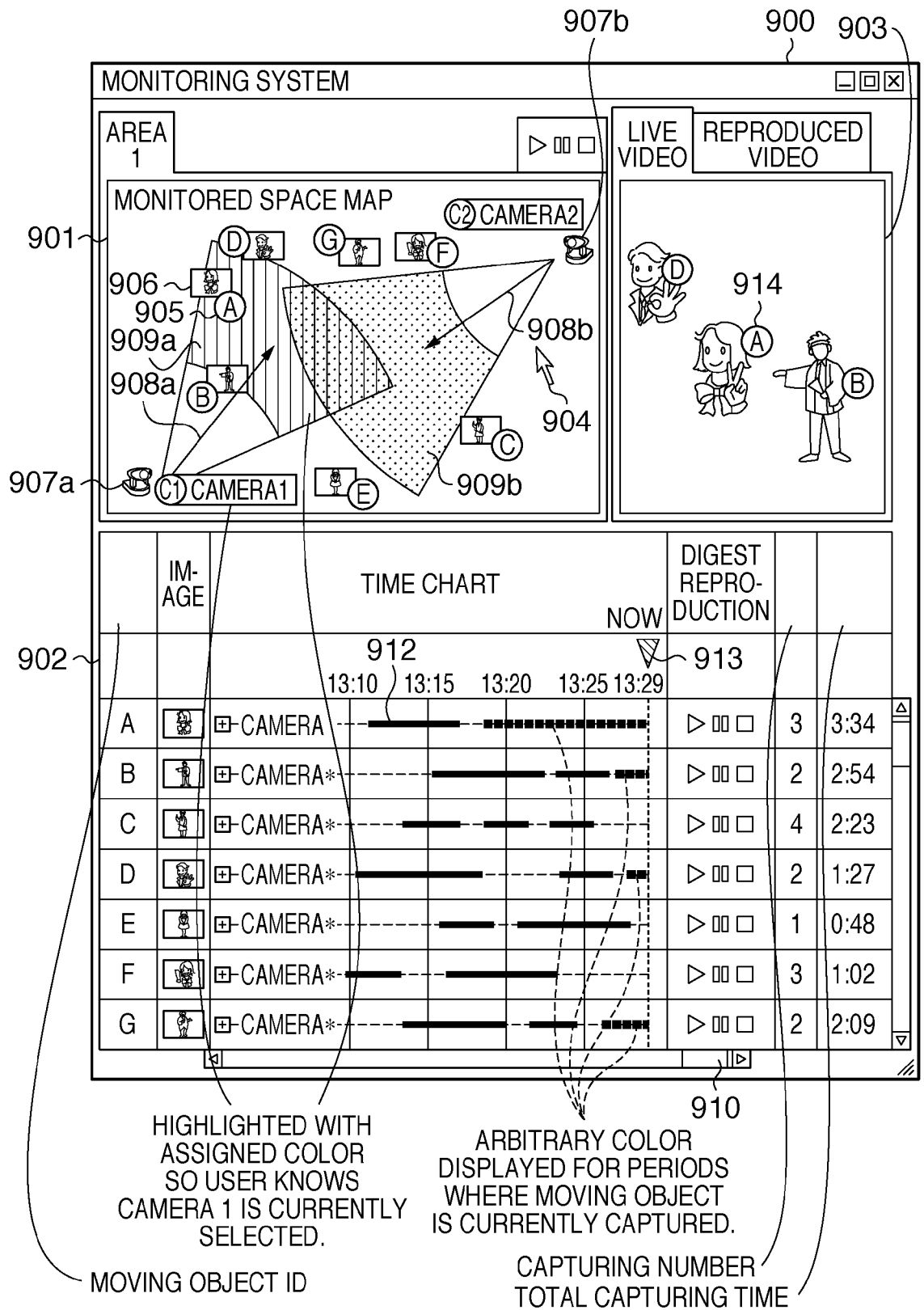
FIG. 9C shows an overview of a monitoring screen displayed in a display device immediately after the client starts an application program for displaying the monitoring screen, according to the third embodiment of the present invention.

FIG. 9C shows an overview of a monitoring screen 900 displayed in the display device 247 immediately after the client 3 starts an application program for displaying the monitoring screen. In FIG. 9C, elements identical to those in the first and second embodiments (FIGS. 9A and 9B) are given identical reference numerals, and descriptions thereof shall be omitted herein.

In the third embodiment, as described above, the location information of each moving object 7 is acquired by the camera devices 4a and 4b (which are provided with, for example, an AF function), and therefore the location information cannot be acquired outside of the capturing period. Therefore, although the capturing period line 912 is displayed, the existence line 911 is not displayed.

Furthermore, the visual range corresponding to the selected camera device (the visual range 909a, in FIG. 9C) is displayed so as to be distinguishable from the visual range 909b.

When Moving Object Icon is Selected

Figure 10C:
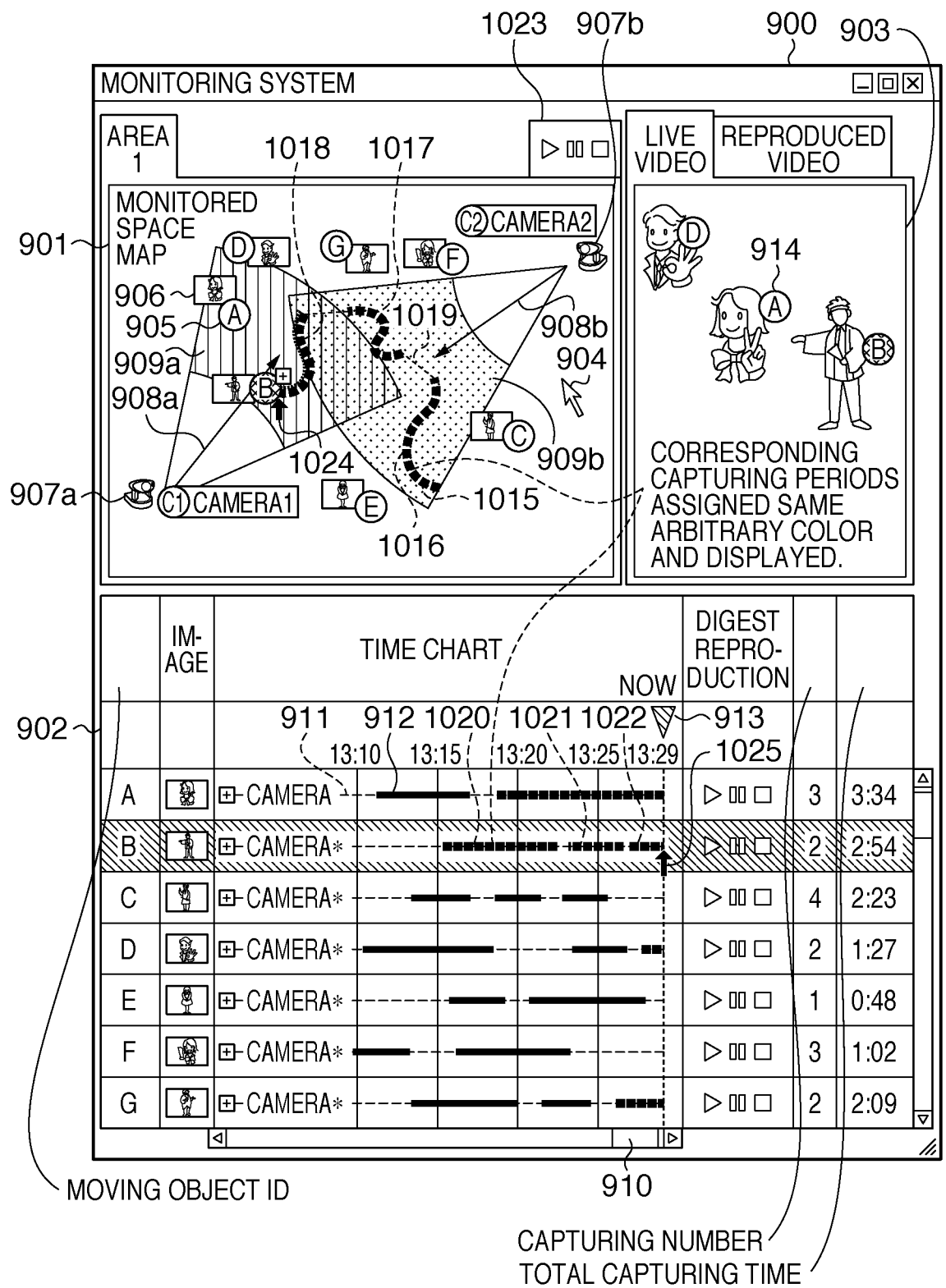
FIG. 10C shows an overview of a monitoring screen when a moving object icon has been selected, according to the third embodiment of the present invention.

FIG. 10C shows an overview of the monitoring screen 900 when a moving object icon has been selected. In FIG. 10C, elements identical to those in FIG. 9A are given identical reference numerals, and descriptions thereof shall be omitted herein.

While only the moving object B is selected in FIG. 10C, multiple moving objects can also be selected. The line corresponding to the selected moving object is displayed in the time chart 902 in a manner that makes it possible to distinguish it from other lines. Furthermore, selection of the moving object can also be carried out by using the mouse pointer 904 to specify the line of a desired moving object in the time chart 902, and the selection of the moving object in the monitored space map 901 is reflected in the time chart 902, and vice versa.

Numeral 1015 indicates the trajectory of the moving object, displayed in tandem with the selected moving object icon (note that portions of the trajectory outside of the capturing period are not displayed). When the trajectory 1015 is displayed, it gradually grows in length as the position of the selected moving object icon changes over time, tracing the location of that moving object icon. Numeral 1019 indicates a support line that connects cut-off portions of the trajectory 1015 arising in the case where the moving object exited the visual ranges 909a and 909b during capture.

Numerals 1016, 1017, and 1018 indicate capturing period lines of the moving object B, captured by the camera devices 4a and 4b and superimposed/displayed on the trajectory 1015. The capturing period lines 1016, 1017, and 1018 correspond to capturing period lines 1020, 1021, and 1022, respectively, in the time chart 902. Although different colors are assumed to have been automatically assigned to the respective capturing period lines, this is omitted from FIG. 10C. The same colors are assigned to capturing period lines that correspond to one another in the monitored space map 901 and the time chart 902. For example, the capturing period line 1018 in the monitored space map 901 and the capturing period line 1022 in the time chart 902 are displayed in the same red color. By the same token, the capturing period line 1017 in the monitored space map 901 and the capturing period line 1021 in the time chart 902 are displayed in the same blue color. Finally, the capturing period line 1016 in the monitored space map 901 and the capturing period line 1020 in the time chart 902 are displayed in the same green color.

If a plurality of moving objects has been selected, the capturing period lines are displayed in the same color for each moving object. For example, if the moving object B and moving object C have been selected, the capturing period lines for the moving object B are displayed in red in the monitored space map 901 and the time chart 902, whereas the capturing period lines for the moving object C are displayed in blue in the monitored space map 901 and the time chart 902.

Buttons 1023 are activated when the moving object B is selected. The buttons 1023 correspond to the digest reproduction buttons of the moving object B in the time chart 902. Digest reproduction shall be described later with reference to FIG. 12C.

Numerals 1024 and 1025 are reproduction position pointers indicating the current reproduction position in the video data. In FIG. 10C, the reproduction position pointers 1024 and 1025 indicate the latest position in the capturing period at the point in time when the moving object B was selected.

In such a state, a frame (still image) corresponding to the position of the reproduction position pointers 1024 and 1025 are displayed in the reproduction window 903 (in FIG. 10C, moving objects A, B, and D are present in this frame).

Accordingly, the user can efficiently confirm multiple capturing periods of the selected moving object, with respect to both the capturing location and the capturing time.

Capturing Period Lines per Camera Device

Figure 11C:
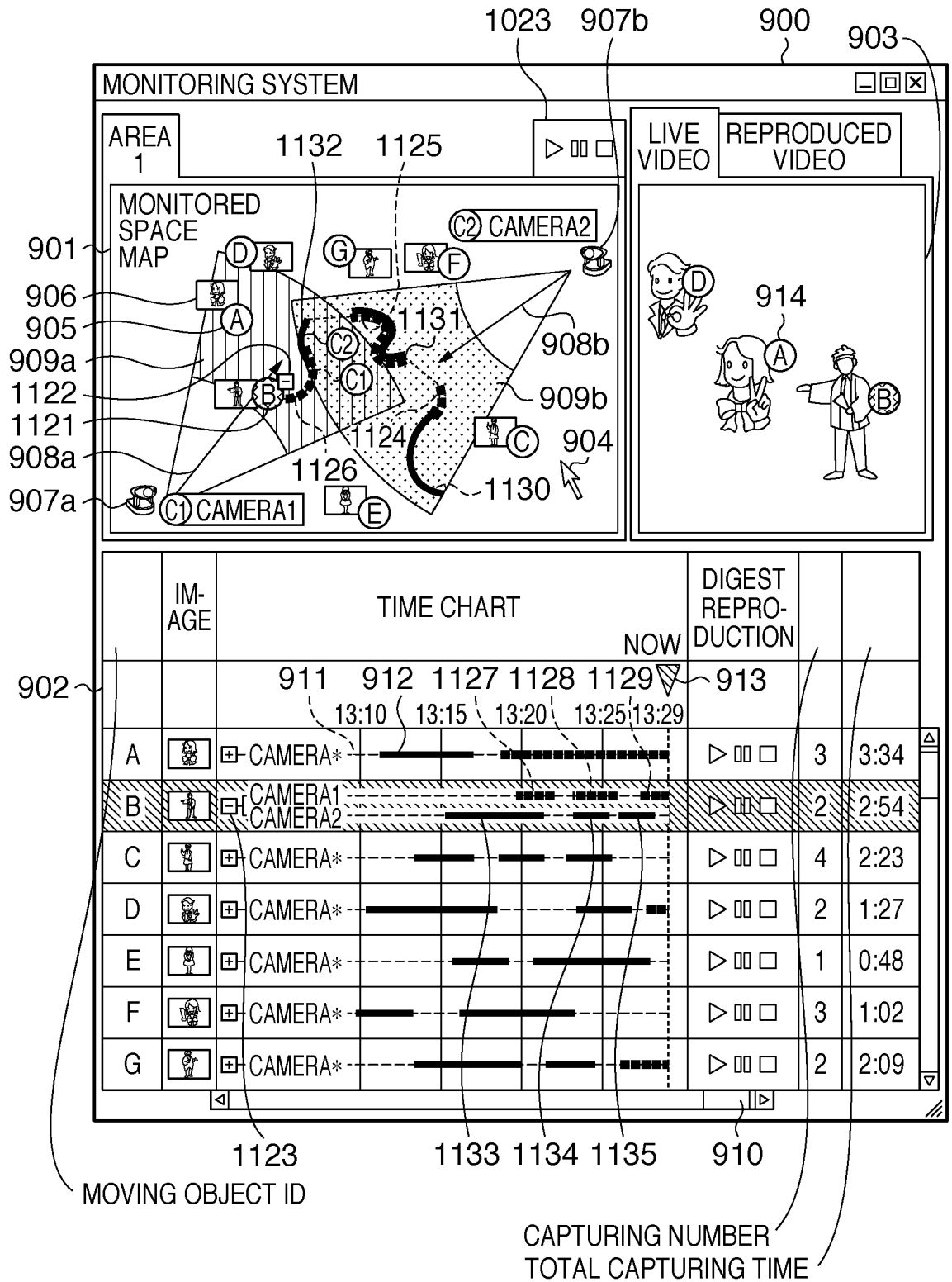
FIG. 11C shows an overview of a monitoring screen that displays the capturing period lines indicated in FIG. 10C on a camera device-by-camera device basis, according to the third embodiment of the present invention.

FIG. 11C shows an overview of the monitoring screen in which the capturing period lines shown in FIG. 10C are displayed on a camera-by-camera basis. In FIG. 11C, elements identical to those in FIG. 10C are given identical reference numerals, and descriptions thereof shall be omitted herein.

When a button 1122 (or a button 1123 in the time chart 902) in the vicinity of a moving object icon 1121 of the moving object B in the monitored space map 901 is selected using the mouse pointer 904, the buttons 1122 and 1123 change from a "+" mark to a "−" mark. The capturing period lines are then displayed on a camera-by-camera basis.

The visual range 909a of the camera device 4a is filled with a color assigned to the camera device 4a (gray, for example), and capturing period lines 1124, 1125, and 1126 of the moving object B, captured by the camera device 4a, are also colored with the same color in the monitored space map 901. Capturing period lines 1127, 1128, and 1129 are also colored with the same color in the time chart 902.

Meanwhile, the visual range 909b of the camera device 4b is filled with a color assigned to the camera device 4b (black, for example), and capturing period lines 1130, 1131, and 1132 of the moving object B, captured by the camera device 4b, are also colored with the same color in the monitored space map 901. Capturing period lines 1133, 1134, and 1135 are also colored with the same color in the time chart 902.

Note that selecting the buttons 1122 or 1123 again returns the state to that shown in FIG. 10C.

When Reproduction Period is Selected

Figure 12C:
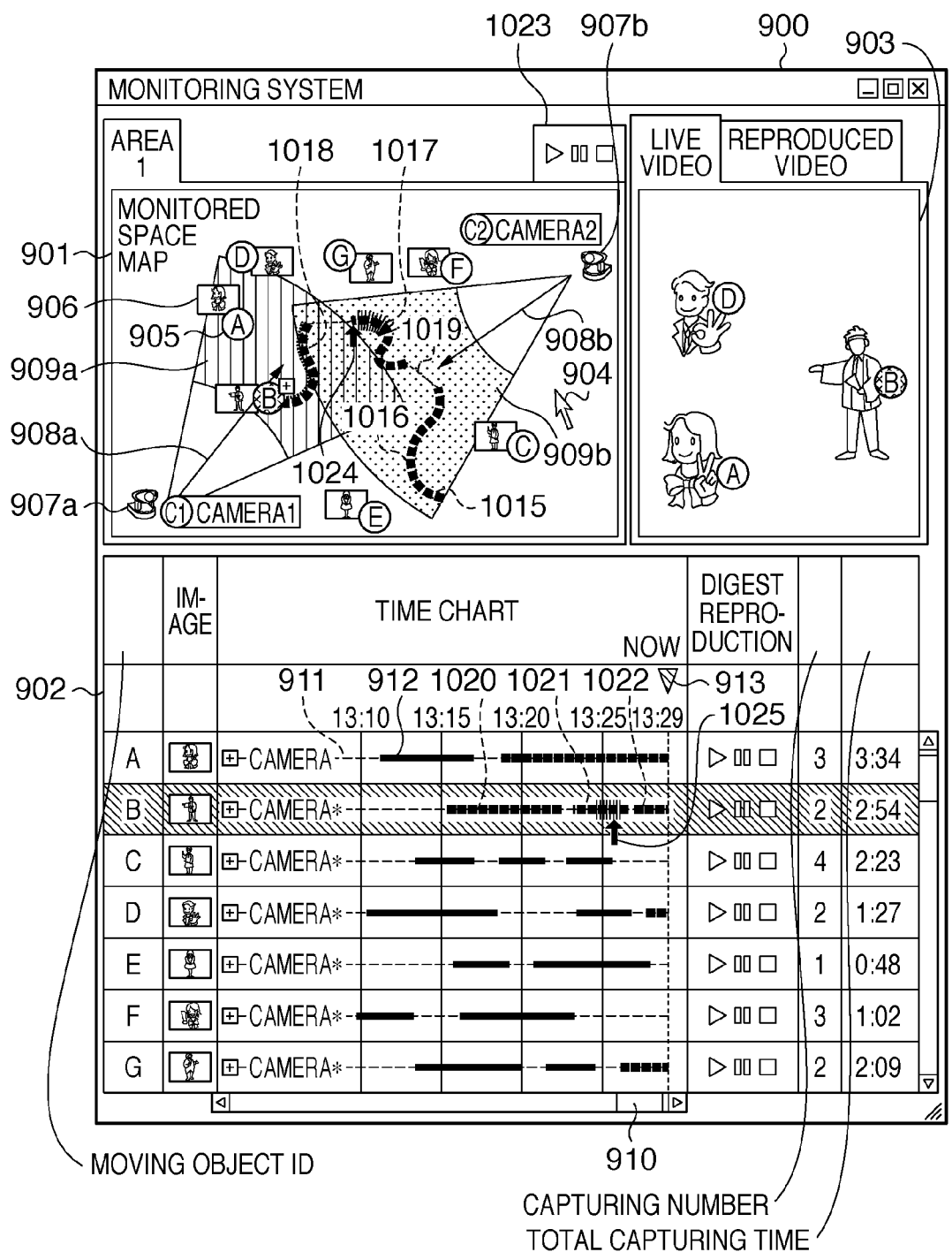
FIG. 12C shows an overview of a monitoring screen when a reproduction period has been selected within a capturing period line of a trajectory, according to the third embodiment of the present invention.

FIG. 12C shows an overview of the monitoring screen 900 when a reproduction period has been selected in a capturing period line on the trajectory 1015. In FIG. 12C, elements identical to those in FIG. 10C are given identical reference numerals, and descriptions thereof shall be omitted herein.

It is assumed that a single capturing period line (in FIG. 12C, the capturing period line 1017 or 1021) has been selected upon the trajectory 1015 of the selected moving object B or in the time chart 902, using the mouse pointer 904. When this selection takes place, the reproduction position pointers 1024 and 1025 move from the position shown in FIG. 10C to the position shown in FIG. 12C.

When the capturing period lines 1017 or 1021 are selected with the mouse pointer 904 and dragged as-is, the portion spanning to the position at which the dragging stopped is selected as the reproduction period. Then, frames corresponding to the positions the reproduction position pointers 1024 and 1025 pass through during the drag are displayed in the reproduction window 903.

If the capturing period lines 1017 or 1021 are double-clicked and selected, the reproduction position pointers 1024 and 1025 move to the position that was double-clicked, and furthermore, the entire capturing period that was double-clicked is selected as the reproduction period.

The selected reproduction period is highlighted by, for example, cross-hatching, and displayed. In FIG. 12C, the portions of the capturing period lines 1017 and 1021 selected through the dragging are highlighted and displayed. Furthermore, a frame (still image) indicated by the position of the reproduction position pointers 1024 and 1025 in the video is displayed in the reproduction window 903 (in FIG. 12C, moving objects A, B, and D are present in this frame).

Accordingly, the user can easily select and specify a reproduction period from an arbitrary capturing period of an arbitrary moving object within the monitored space map 901, with respect to both the capturing location and the capturing time. It is also possible to specify a plurality of capturing periods as reproduction periods by successively specifying capturing periods using this specification method. The capturing period lines in the time chart 902 can also be specified as reproduction periods using the same method.

If the digest reproduction button is selected in a state in which a single or multiple reproduction periods have been selected, the video of the selected reproduction period is consecutively read out from the video storage server and reproduced.

During reproduction, the reproduction position pointers 1024 and 1025 also move along the reproduction period in the monitored space map 901 and the time chart 902 in accordance with the reproduction progress.

<GUI (Monitoring Screen) Rendering Data>

Although the configuration of the GUI rendering data is identical to that of the first embodiment (see FIG. 8A), it can be changed as appropriate in light of two camera devices, 4a and 4b, being used.

<Processing Performed by Client 3>

The processing performed by the client 3 is identical to that in the first embodiment, and thus descriptions thereof shall be omitted herein (see FIGS. 4 and 5A to 5H). However, the processing can be changed as appropriate in light of the two camera devices, 4a and 4b, being used. A person skilled in the art can easily understand the details of such changes by referring to FIGS. 9C, 10C, 11C, 12C, and the descriptions that accompany those diagrams, as mentioned above.

As described thus far, according to the present embodiment an item used for location detection (e.g., an IC tag) need not be attached to the moving objects.

Accordingly, operations for attaching the IC tag to the moving objects to be monitored need not be executed beforehand, making it possible to utilize the monitoring system in a more flexible manner.

(Other Embodiments)

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-153391, filed on Jun. 8, 2007, which is hereby incorporated by reference herein in its entirety.

What is claimed is:

1. An information processing apparatus, comprising:
an obtaining unit that obtains video data captured by an image capturing apparatus disposed in a monitored space, and that obtains location information regarding a location of a moving object in the monitored space; and
a microprocessor machine that processes a display of a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other,
wherein the second portion of the trajectory is positioned between two first portions such that the second portion is connected to a tail end of a first of the two first portions and to a head end of a second of the two first portions.

2. An information processing method, comprising steps of:
obtaining video data captured by an image capturing apparatus disposed in a monitored space, and obtaining location information regarding a location of a moving object in the monitored space; and
displaying a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other,
wherein the second portion of the trajectory is positioned between two first portions such that the second portion is connected to a tail end of a first of the two first portions and to a head end of a second of the two first portions.

3. A non-transitory computer-readable storage medium storing a computer program for causing a computer to perform an information processing method comprising steps of:
obtaining video data captured by an image capturing apparatus disposed in a monitored space, and obtaining location information regarding a location of a moving object in the monitored space; and
displaying a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other,
wherein the second portion of the trajectory is positioned between two first portions such that the second portion is connected to a tail end of a first of the two first portions and to a head end of a second of the two first portions.

4. An information processing apparatus, comprising:
an obtaining unit that obtains video data captured by an image capturing apparatus disposed in a monitored space, and that obtains location information regarding a location of a moving object in the monitored space, wherein the moving object is monitored while in the monitored space; and
a microprocessor machine that processes a display of a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other, wherein the location of the moving object is monitored in the monitored space even in the second period during which the moving object is not captured by the image capturing apparatus.

5. The information processing apparatus according to claim 4, further comprising:
a moving object selection unit that selects a moving object, wherein the microprocessor machine processes a display of only the trajectory of the moving object selected by the moving object selection unit.

6. The information processing apparatus according to claim 4, further comprising:
a first selection unit that selects one of a plurality of periods during which the moving object is captured in the trajectory,
wherein the microprocessor machine reproduces a portion of the video data that corresponds to the one of the plurality of periods selected by the first selection unit.

7. The information processing apparatus according to claim 6, wherein the microprocessor machine processes a display of a pointer indicating a location of the moving object in the trajectory at the time at which the video data is captured.

8. The information processing apparatus according to claim 7, further comprising:
a pointer movement unit that moves the pointer along the trajectory,
wherein the microprocessor machine reproduces a portion of the video data captured when the moving object was present in a location in the monitored space that corresponds to a location indicated by the pointer moved by the pointer movement unit.

9. The information processing apparatus according to claim 4, wherein the microprocessor machine processes a display of the trajectory so that the image capturing apparatus that captured the first period during which the moving object is captured can be identified.

10. The information processing apparatus according to claim 4, wherein:
the microprocessor machine processes a display of a plurality of periods during which the moving object is captured on a time axis, and
the microprocessor machine reproduces a portion of the video data that corresponds to one of the plurality of the periods selected in the time axis.

11. The information processing apparatus according to claim 10, wherein the microprocessor machine processes a display of a plurality of periods during which moving objects are captured on the time axis so that the moving objects can be distinguished from one another.

12. The information processing apparatus according to claim 6, further comprising:
an extraction unit that extracts a representative video frame at a predetermined interval from a portion of the video data that corresponds to the one of the plurality of periods selected by the first selection unit,
wherein the microprocessor machine processes a display of an image based on the representative video frame in association with a location of the moving object in the trajectory at the time when the representative video frame is captured.

13. The information processing apparatus according to claim 12, wherein
the microprocessor machine processes a display of an outgoing line connecting the image based on the representative video frame to the location of the moving object in the trajectory at the time when the representative video frame is captured, and
the microprocessor machine processes a display of images based on the representative video frame so as not to overlap with one another.

14. The information processing apparatus according to claim 4, wherein the first portion of the trajectory and the second portion of the trajectory are displayed concurrently with each other.

15. The information processing apparatus according to claim 4, wherein the location of the moving object is monitored based on an electronic tag on the moving object.

16. An information processing method, comprising steps of:
obtaining video data captured by an image capturing apparatus disposed in a monitored space, and obtaining location information regarding a location of a moving object in the monitored space, wherein the moving object is monitored while in the monitored space; and
displaying a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other,
wherein the location of the moving object is monitored in the monitored space even in the second period during which the moving object is not captured by the image capturing apparatus.

17. The information processing method according to claim 16, further comprising steps of:
selecting one of a plurality of periods during which the moving object is captured in the trajectory; and
reproducing a portion of the video data that corresponds to the one of the plurality of periods selected in the selecting step.

18. The information processing method according to claim 16, wherein the first portion of the trajectory and the second portion of the trajectory are displayed concurrently with each other.

19. The information processing method according to claim 16, wherein the location of the moving object is monitored based on an electronic tag on the moving object.

20. A non-transitory computer-readable storage medium storing a computer program for causing a computer to perform an information processing method comprising steps of:
obtaining video data captured by an image capturing apparatus disposed in a monitored space, and obtaining location information regarding a location of a moving object in the monitored space, wherein the moving object is monitored while in the monitored space; and
displaying a trajectory of the moving object in the monitored space based on the location information, so that a first portion of the trajectory corresponding to a first period during which the moving object is captured by the image capturing apparatus is displayed in a first manner and a second portion of the trajectory corresponding to a second period during which the moving object is not captured by the image capturing apparatus is displayed in a second manner different from the first manner, and so that the first portion of the trajectory and the second portion of the trajectory are displayed visibly and distinguishably from each other, wherein the location of the moving object is monitored in the monitored space even in the second period during which the moving object is not captured by the image capturing apparatus.

21. The non-transitory computer-readable storage medium according to claim 20, wherein the information processing method further comprises steps of:
    selecting one of a plurality of periods during which the moving object is captured in the trajectory; and
    reproducing a portion of the video data that corresponds to the one of the plurality of periods selected in the selecting step.

22. The non-transitory computer-readable storage medium according to claim 20, wherein the first portion of the trajectory and the second portion of the trajectory are displayed concurrently with each other.

23. The non-transitory computer-readable storage medium according to claim 20, wherein the location of the moving object is monitored based on an electronic tag on the moving object.

24. An information processing apparatus, comprising:
    an obtaining unit that obtains video data captured by an image capturing apparatus disposed in a monitored space; and
    a microprocessor machine that processes a display of a time chart of a moving object detected in the monitored space, so that a first portion of the time chart corresponding to a first period during which the moving object is captured by the image capturing apparatus is displayed in a first manner and a second portion of the time chart corresponding to a second period during which the moving object is not captured by the image capturing apparatus is displayed in a second manner different from the first manner, and so that the first portion of the time chart and the second portion of the time chart are displayed visibly and distinguishably from each other,
    wherein the moving object is detected in the monitored space even in the second period during which the moving object is not captured by the image capturing apparatus.

25. The information processing apparatus according to claim 24, further comprising:
    a selection unit that selects one of a plurality of first portions of the time chart during which the moving object is captured,
    wherein the microprocessor machine reproduces a portion of the video data that corresponds to the one of the plurality of first portions of the time chart selected by the selection unit.

26. The information processing apparatus according to claim 24, wherein the moving object is detected based on an electronic tag on the moving object.

27. An information processing method, comprising steps of:
    obtaining video data captured by an image capturing apparatus disposed in a monitored space; and
    displaying a time chart of a moving object detected in the monitored space, so that a first portion of the time chart corresponding to a first period during which the moving object is captured by the image capturing apparatus is displayed in a first manner and a second portion of the time chart corresponding to a second period during which the moving object is not captured by the image capturing apparatus is displayed in a second manner different from the first manner, and so that the first portion of the time chart and the second portion of the time chart are displayed visibly and distinguishably from each other,
    wherein the moving object is detected in the monitored space even in the second period during which the moving object is not captured by the image capturing apparatus.

28. The information processing method according to claim 27, further comprising steps of:
    selecting one of a plurality of first portions of the time chart during which the moving object is captured; and
    reproducing a portion of the video data that corresponds to the one of the plurality of first portions of the time chart selected in the selecting step.

29. The information processing method according to claim 27, wherein the moving object is detected based on an electronic tag on the moving object.

30. A non-transitory computer-readable storage medium storing a computer program for causing a computer to perform an information processing method comprising steps of:
    obtaining video data captured by an image capturing apparatus disposed in a monitored space; and
    displaying a time chart of a moving object detected in the monitored space, so that a first portion of the time chart corresponding to a first period during which the moving object is captured by the image capturing apparatus is displayed in a first manner and a second portion of the time chart corresponding to a second period during which the moving object is not captured by the image capturing apparatus is displayed in a second manner different from the first manner, and so that the first portion of the time chart and the second portion of the time chart are displayed visibly and distinguishably from each other,
    wherein the moving object is detected in the monitored space even in the second period during which the moving object is not captured by the image capturing apparatus.

31. The non-transitory computer-readable storage medium according to claim 30, wherein the information processing method further comprises steps of:
    selecting one of a plurality of first portions of the time chart during which the moving object is captured; and
    reproducing a portion of the video data that corresponds to the one of the plurality of first portions of the time chart selected in the selecting step.

32. The non-transitory computer-readable storage medium according to claim 30, wherein the moving object is detected based on an electronic tag on the moving object.

* * * * *